United States Patent
Morimitsu

(10) Patent No.: US 11,652,204 B2
(45) Date of Patent: May 16, 2023

(54) METAL NEGATIVE ELECTRODE, METHOD FOR FABRICATING THE SAME AND SECONDARY BATTERY INCLUDING THE SAME

(71) Applicants: THE DOSHISHA, Kyoto (JP); DOWA HOLDINGS Co., Ltd., Tokyo (JP)

(72) Inventor: Masatsugu Morimitsu, Kyoto (JP)

(73) Assignees: THE DOSHISHA, Kyoto (JP); DOWA HOLDINGS Co., Ltd., Tokyo (JP)

( * ) Notice: Subject to any disclaimer, the term of this patent is extended or adjusted under 35 U.S.C. 154(b) by 0 days.

(21) Appl. No.: 17/753,694

(22) PCT Filed: Sep. 11, 2020

(86) PCT No.: PCT/JP2020/034456
§ 371 (c)(1),
(2) Date: Mar. 11, 2022

(87) PCT Pub. No.: WO2021/049609
PCT Pub. Date: Mar. 18, 2021

(65) Prior Publication Data
US 2022/0320488 A1  Oct. 6, 2022

(30) Foreign Application Priority Data

Sep. 12, 2019  (JP) .............................. JP2019-166637
Jan. 22, 2020  (JP) .............................. JP2020-008588
Feb. 12, 2020  (JP) .............................. JP2020-021922

(51) Int. Cl.
*H01M 4/1395* (2010.01)
*H01M 4/134* (2010.01)
(Continued)

(52) U.S. Cl.
CPC ......... *H01M 4/1395* (2013.01); *H01M 4/134* (2013.01); *H01M 4/42* (2013.01);
(Continued)

(58) Field of Classification Search
CPC ..................... H01M 10/0525; H01M 10/054
See application file for complete search history.

(56) References Cited

U.S. PATENT DOCUMENTS

2018/0130998 A1   5/2018   Parker et al.

FOREIGN PATENT DOCUMENTS

| JP | S56162870 U | 12/1981 |
| JP | 2005518644 A | 6/2005 |

(Continued)

OTHER PUBLICATIONS

Dec. 8, 2020, International Search Report issued in the International Patent Application No. PCT/JP2020/034456.

(Continued)

*Primary Examiner* — Ula C Ruddock
*Assistant Examiner* — Thomas H. Parsons
(74) *Attorney, Agent, or Firm* — Kenja IP Law PC

(57) ABSTRACT

Provided is a metal negative electrode used for a secondary battery. The metal negative electrode includes an active material portion, a current collector, and a non-electronically conductive reaction space divider. The active material portion forms metal during charging and forms an oxidation product of the metal during discharging. The metal is used as a negative-electrode active material. The current collector is electrically connected to the active material portion. The non-electronically conductive reaction space divider is integrally formed with or connected to the current collector and/or the active material portion. The reaction space divider has a plurality of electrolyte holder portions configured to hold a liquid electrolyte.

16 Claims, 46 Drawing Sheets

(51) Int. Cl.
  *H01M 4/42*   (2006.01)
  *H01M 4/46*   (2006.01)
  *H01M 10/0525*   (2010.01)
  *H01M 10/054*   (2010.01)
  *H01M 4/02*   (2006.01)
(52) U.S. Cl.
  CPC ............ *H01M 4/46* (2013.01); *H01M 10/054* (2013.01); *H01M 10/0525* (2013.01); *H01M 2004/027* (2013.01)

(56) References Cited

FOREIGN PATENT DOCUMENTS

| | | | |
|---|---|---|---|
| JP | 2012104273 A | | 5/2012 |
| JP | 2014026951 A | | 2/2014 |
| JP | 2014222570 A | | 11/2014 |
| JP | 2015519686 A | | 7/2015 |
| JP | 2016146263 A | | 8/2016 |
| JP | 2016170944 A | | 9/2016 |
| JP | 2016189356 A | | 11/2016 |
| JP | 2016194990 A | | 11/2016 |
| JP | 2016201199 A | | 12/2016 |
| JP | 2016225213 A | | 12/2016 |
| JP | 2017091949 A | | 5/2017 |
| JP | 2017130390 A | | 7/2017 |
| JP | 2018026205 A | | 2/2018 |
| JP | 2018133324 A | | 8/2018 |
| JP | 2018147738 A | | 9/2018 |
| JP | 2018147739 A | | 9/2018 |
| JP | 2019016602 A | | 1/2019 |
| JP | 2019021518 A | | 2/2019 |
| KR | 20070060218 | * | 6/2007 |
| KR | 1020070060218 A | | 6/2007 |
| WO | 2009048146 A1 | | 4/2009 |
| WO | 2014069541 A1 | | 5/2014 |
| WO | 2014119665 A1 | | 8/2014 |
| WO | 2017077991 A1 | | 5/2017 |
| WO | 2017183633 A1 | | 10/2017 |
| WO | 2018142652 A1 | | 8/2018 |

OTHER PUBLICATIONS

Joseph F. Parker et al., Rechargeable nickel-3D zinc batteries: An energy-dense, safer alternative to lithium-ion, Science, 2017, pp. 415-418, vol. 356.

Kohei Miyazaki et al., Suppression of Dendrite Formation of Zinc Electrodes by the Modification of Anion-Exchange Ionomer, Electrochemistry, 2012, pp. 725-727, vol. 80, No. 10.

May 18, 2021, Notification of Reasons for Refusal issued by the Japan Patent Office in the corresponding Japanese Patent Application No. 2021-505796.

Ryo Koda et al., A Physical Mechanism for Suppression of Zinc Dendrites Caused by High Efficiency of the Electrodeposition within Confined Nanopores, ECS Electrochemistry Letters, 2013, pp. D9-D11, vol. 2.

Sep. 7, 2021, Decision to Grant a Patent issued by the Japan Patent Office in the corresponding Japanese Patent Application No. 2021-505796.

T. C. Adler et al., Low-Zinc-Solubility Electrolytes for Use in Zinc/Nickel Oxide Cells, Journal of The Electrochemical Society, 1993, pp. 289-294, vol. 140, No. 2.

Tomoya Ishida et al., Electrochemical Behaviors of Zn Anode in Carbonate-based Aqueous Solutions, Electrochemistry, 2015, pp. 864-866, vol. 83, No. 10.

Jun. 30, 2022, Office Action issued by the Korean Intellectual Property Office in the corresponding Korean Patent Application No. 10-2022-7008872.

Jul. 19, 2022, Office Action issued by the China National Intellectual Property Administration in the corresponding Chinese Patent Application No. 202080064015.8.

Mar. 15, 2022, International Preliminary Report on Patentability issued in the International Patent Application No. PCT/JP2020/034456.

May 18, 2022, Office Action issued by the Canadian Intellectual Property Office in the corresponding Canadian Patent Application No. 3,151,028.

* cited by examiner

METAL NEGATIVE ELECTRODE, METHOD FOR FABRICATING THE SAME AND SECONDARY BATTERY INCLUDING THE SAME

TECHNICAL FIELD

This disclosure relates to a metal negative electrode being a negative electrode for secondary battery that forms metal during charging and forms an oxidation product by oxidizing the metal during discharging, a method for fabricating the metal negative electrode, and a secondary battery including the metal negative electrode.

BACKGROUND

A secondary battery requires three components: a positive electrode, a negative electrode and an electrolyte that connects them through ionic conduction. These components differ depending on a type of the battery. For example, comparing the electrolytes for representative secondary batteries, an electrolyte for the lead storage battery is an acidic sulfuric acid aqueous solution, an electrolyte for the nickel hydride battery is an alkaline aqueous solution such as an aqueous potassium hydroxide solution, and an electrolyte for the lithium-ion battery is an organic solvent or an ionic liquid. Materials that react each in the positive electrode and the negative electrode of the secondary battery are referred to as active materials (also referred to as reaction active materials or electrode active materials). Comparing the active materials of the negative electrodes in the above three types of secondary batteries, a negative-electrode active material for the lead storage battery is lead, a negative-electrode active material for the nickel hydride battery is hydrogen, and a negative-electrode active material for the lithium-ion battery is lithium. Here, any of the negative-electrode active materials are examples of the materials formed by charging the negative electrode. When the respective batteries are discharged, the materials turn into their respective oxidation products such as lead into lead sulfate, hydrogen into water, and lithium into lithium ions. The term "active material" is used to indicate a material formed by charging, a material formed by discharging or both. In the following, the metal is often exemplified as an active material in case of the material formed by charging, that is, a metal negative electrode. However, as described above, the oxidation product from the metal formed by discharging or both of the metal and the oxidation product thereof may be referred to as active materials, which are not to be excluded in the specification.

The above-described negative electrode for the lithium-ion battery has a matrix of graphite or other carbon material, or metal such as tin other than lithium, or the metallic oxide. In the negative electrode for the lithium-ion battery, during charging, lithium ions present in the electrolyte become lithium atoms on the negative electrode and the lithium atoms are occluded into the matrix. In contrast, there is a negative electrode which is generally referred to as a metal negative electrode. The charge of the metal negative electrode is a reaction that the oxidation product of the metal turns into the metal, and in fact, the metallic atoms are deposited to be accumulated in the negative electrode. The metal negative electrode does not use occlusion of the metallic atoms into the matrix as in the lithium-ion battery, thus having quite different composition, structure and reaction mechanism from those of the negative electrode for the lithium-ion battery.

Specific examples of the secondary battery using the metal negative electrode includes, for example, a zinc-air secondary battery, a zinc-nickel secondary battery and a zinc-silver secondary battery using a zinc negative electrode, and a lithium-air secondary battery and a lithium-sulfur secondary battery using a lithium negative electrode. Any of these secondary batteries are under development, and the practical application or the commercialization has not been realized except for a mechanical zinc-air secondary battery. The mechanical zinc-air secondary battery turns zinc in the negative electrode into zinc oxide by discharging and then replaces the negative electrode with a new zinc negative electrode to make a charged state, thus having a quite different mechanism from that of the secondary battery that is usually charged by energization.

In more detail, the metal negative electrode is made such that a current collector and the active material such as zinc and lithium are integrated. In the metal negative electrode, electrons flow in a direction from the current collector to the active material such as zinc and lithium during charging, and the electrons conversely flow in a direction from the active material to the current collector during discharging. The metal negative electrode is electrically connected to an external circuit via the current collector.

As described above, the metallic atoms in the metal negative electrode are reactants and have an electron conductivity among the metallic atoms and an electron conductivity with the current collector. Accordingly, in the metal negative electrode, it is difficult to use up all of metallic atoms as the active materials for reaction, thus some of them are usually used for battery reaction. In the zinc negative electrode, which is a representative metal negative electrode, when the electrolyte is an alkaline aqueous solution, two-step reaction as follows occurs during discharging.

$$Zn + 4OH^- \rightarrow Zn(OH)_4^{2-} + 2e^- \qquad (1)$$

$$Zn(OH)_4^{2-} \rightarrow ZnO + H_2O + 2OH^- \qquad (2)$$

On the other hand, the following two-step reaction conversely occurs during charging.

$$ZnO + H_2O + 2OH^- \rightarrow Zn(OH)_4^{2-} \qquad (3)$$

$$Zn(OH)_4^{2-} + 2e^- \rightarrow Zn + 4OH^- \qquad (4)$$

The above formulae (1) and (2) indicate that Zn (solid) provides two electrons to the negative electrode and becomes $Zn(OH)_4^{2-}$ (ion) to dissolve in the alkaline aqueous solution that is the electrolyte and then is deposited as ZnO (solid) on the negative electrode from the alkaline aqueous solution. On the other hand, the above formulae (3) and (4) indicate that $Zn(OH)_4^{2-}$ dissolved in the alkaline aqueous solution from ZnO receives two electrons from the negative electrode to be deposited as Zn (solid) on the negative electrode.

The zinc negative electrode is widely known as a metal negative electrode difficult to be put in practical application because of its poor charge and discharge cycle characteristics. The cause is considered to be influence of the ions in the above reaction mechanism. Specifically, a problem occurs such that, when the charge and discharge of the zinc negative electrode are repeated, the deposition of zinc locally occurs during charging, the deposited zinc becomes dendrite (dendritically grown crystal) and continues to grow toward the positive electrode, and the growth to reach the positive electrode causes an internal short-circuit. This problem is well known as "internal short-circuit due to dendrite (hereafter, dendrite short circuit)" in the zinc negative electrode.

In addition, both of the charge and the discharge involve once dissolution of $Zn(OH)_4^{2-}$ into the alkaline aqueous solution in the reaction mechanism. The details of how these ions have influence are not clear, but it is considered that, in the case of a well-used plate-like zinc negative electrode, in the two-dimensional direction of a surface of the negative electrode, distribution of zinc or zinc oxide becomes inhomogeneous due to the repetition of charge and discharge, and this decreases the ratio of zinc atoms that can be used for the charge and the discharge, thus causing a problem that the amount of dischargeable electricity reduces with an increase in cycle number.

More specifically, it is widely known that the repetition of charge and discharge in the plate-like zinc negative electrode causes inhomogeneity of the active material (hereafter, active material inhomogeneity) such that the active material accumulates more at a center part and the active material decreases compared to the initial state at an edge. In such active material inhomogeneity, the active material becomes thick at a center and becomes thin at an edge in the negative electrode, and dendrite formation is facilitated at the center. In addition, it is estimated that the increase in thickness of the active material at the center part causes Zn and ZnO, which are positioned away from the alkaline aqueous solution, that is, present inside the active material having the increased thickness, to be less likely to be used for the reaction. It is because, as indicated in the above formulae (1) to (4), both of the charge and the discharge need $Zn(OH)_4^{2-}$ and $OH^-$ in the alkaline aqueous solution for the reaction.

It is also known that the dendrite short circuit and the active material inhomogeneity occur also in a lithium negative electrode and a magnesium negative electrode, which are the metal negative electrodes similar to the zinc negative electrode. Therefore, these two types of negative electrodes also have each a small cycle number used for the charge and the discharge as well as the zinc negative electrode, thus not being the negative electrodes for the secondary battery, which are possible to be put in the practical application.

As described above, the metal negative electrode has problems of "dendrite short circuit" and "active material inhomogeneity", and any of the metal negative electrodes could not meet the request as the negative electrode for the secondary battery. Therefore, various studies have been made to solve these problems, and information on the invented technologies has been disclosed.

For example, PTL 1 discloses a negative electrode used for a zinc secondary battery, the negative electrode including at least one type of zinc material selected from the group consisting of zinc, zinc oxide, zinc alloy and zinc compound, and titanium oxide.

PTL 2 discloses an electrochemical cell comprising: a positive electrode; a negative electrode; an ionically conductive and electronically insulating separator positioned between the positive electrode and the negative electrode as an electrochemical cell useful for increasing the performance such as cycle life and energy and power. In this electrochemical cell, the separator is described as a separator for managing and controlling dendrite formation in metal based batteries, such as lithium based, alkaline based, zinc based and lead based batteries.

PTL 3 discloses a separator for secondary battery with a zinc negative electrode, the separator having a center and a margin surrounding the outer circumference of the center, and at least a part of the margin having a contact angle (compliant with θ/2 method) greater than that of the center.

PTL 4 discloses a method for manufacturing a separator for secondary battery with a zinc negative electrode, including an impregnating step of impregnating a nonwoven fabric with dispersion liquid containing a layered double hydroxide and a drying step of drying the nonwoven fabric impregnated with the dispersion liquid.

PTL 5 discloses a secondary battery comprising: a positive electrode having a layered double hydroxide (LDH) containing at least one type selected from the group consisting of Ni, Fe and Mn as a constituent element as a positive electrode active material; a negative electrode having a layered double hydroxide (LDH) containing at least one type selected from the group consisting of Cu, Al and Zn as a constituent element as a negative-electrode active material; an alkaline electrolyte (liquid electrolyte) and/or a hydroxide ion conducting solid electrolyte, as a secondary battery with potential of for increased capacity, with high stability during charging and discharging, and without short circuit problem due to zinc dendrite.

PTL 6 discloses a negative electrode structure for zinc secondary battery and a zinc secondary battery using it, the negative electrode structure including a porous current collector plate made of a porous metal, a negative-electrode active material layer disposed on one surface side of the porous current collector plate, the negative-electrode active material layer containing zinc and/or zinc oxide, and a hydroxide ion conducting ceramic separator disposed on a side opposite to the negative-electrode active material layer of the porous current collector plate, the hydroxide ion conducting ceramic separator with high fineness specified by no through-hole and no air permeability, as a negative electrode structure configured to ensure an efficient conducting path of hydroxide ions between a positive electrode and a negative electrode and effectively prevent a short circuit between the positive electrode and the negative electrode due to zinc dendrite while improving a space efficiency inside the battery.

PTL 7 discloses a battery comprising a separator comprising inorganic particles for preventing a short-circuit, the inorganic particles doing not drop easily from the separator.

PTL 8 discloses a zinc secondary battery comprising a separator structure including a hydroxide ion conducting separator, the zinc secondary battery being configured to improve overcharge tolerance while ensuring an excellent separator property effective in preventing a short circuit due to zinc dendrite.

PTL 9 discloses a secondary battery comprising a pillar porous base material having a plurality of cell holes provided parallel to one another from a first end surface toward a second end surface and/or from the second end surface toward the first end surface, positive electrodes and negative electrodes arranged alternately per hole or per row of holes in the plurality of cell holes, a positive electrode internal current collector inserted into the positive electrode to extend to the first end surface or an outer peripheral surface, a negative electrode internal current collector inserted into the negative electrode to extend the second end surface, the outer peripheral surface, or the first end surface, a hydroxide ion conducting ceramic separator formed on an inner wall surface of the cell hole to isolate the positive electrode and/or the negative electrode from the porous base material, and a liquid electrolyte, as a secondary battery space-efficiently comprising a plurality of unit batteries while certainly isolating the positive electrode from the negative electrode with the hydroxide ion conducting ceramic separator.

PTL 10 discloses a separator for zinc secondary battery to selectively cause hydroxide ions to pass between a positive electrode and a negative electrode in a zinc secondary battery, the separator for zinc secondary battery comprising a porous membrane having fine pores configured to separate the hydroxide ions from zinc complex ions $Zn(OH)_4^{2-}$ with a molecular sieve effect, as a separator for zinc secondary battery configured to effectively suppress a short circuit due to zinc dendrite.

PTL 11 discloses a separator structure comprising: a ceramic separator comprising an inorganic solid electrolyte and having hydroxide ion conductivity and air impermeability; and a peripheral member disposed along the periphery of the ceramic separator and comprising at least one of a resin frame and a resin film, the separator structure exhibiting air impermeability as a whole, as a separator structure configured to reliably separate a positive electrode side from a negative electrode side in a zinc secondary battery.

PTL 12 discloses a multi-layer porous separator for isolating a positive electrode from a negative electrode in a secondary battery, the multi-layer porous separator comprising a first layer and a third layer disposed separate from and opposite to one another, the first layer and the third layer being made of porous ceramics, and a second layer disposed between the first layer and the third layer, the second layer being made of porous ceramics that are more porous than those of the first layer and the third layer, and/or a space, as a porous separator configured to more effectively suppress or delay extension of dendrite and a short circuit between the positive electrode and the negative electrode due to the extension in the secondary battery.

PTL 13 discloses a separator used for a battery, the separator having a multi-layer structure including an insulating layer and a conductive layer, and a battery configured to include the separator, an electrode and an electrolyte, as a separator and a battery which are configured to suppress shape change of an active material due to long-term use of the battery.

PTL 14 discloses a secondary battery comprising a separator and an aqueous electrolyte arranged in a region sandwiched between both electrode surfaces of a positive electrode and a negative electrode, the separator having particulate active materials (noble potential active material particles Am) that become nobler potential than a potential of the negative electrode as being present along a surface of the separator, the noble potential active material particles Am of the separator dissolving dendrite, as a secondary battery that more certainly ensures long life compared to the conventional secondary battery.

PTL 15 discloses a negative electrode material for metal secondary battery configured to support a nanosheet of metallic oxide on a carbon-based conducting carrier, metal of the metallic oxide being titanium, ruthenium or niobium, as a negative electrode material for metal secondary battery in which dendrite formation is suppressed.

PTL 16 discloses a zinc negative electrode mixture containing zinc-containing compound and conductive auxiliary agent, the zinc-containing compound and/or the conductive auxiliary agent containing particles having an average particle diameter of 1000 μm or less and/or particles having an aspect ratio (vertical/horizontal) of 1.1 or more, as a zinc negative electrode mixture for forming a negative electrode of a battery excellent in economic efficiency and safety and excellent in battery performance.

PTL 17 discloses separator systems for electrochemical systems providing electronic, mechanical and chemical properties useful for a variety of applications including electrochemical storage and conversion, and describes providing structural, physical and electrostatic attributes useful for managing and controlling dendrite formation, for example, in a lithium battery and a zinc-based battery and for improving the cycle life and rate capability of electrochemical cells such as silicon anode based batteries, air cathode based batteries, redox flow batteries.

PTL 18 and NPL 1 disclose that a zinc electrode for secondary battery configured by a network made of a zinc sponge having air gaps, the zinc having a surface on which zinc oxide is formed as a shell, the zinc electrode for secondary battery improving cycle characteristics.

PTL 19 discloses a method of coating a zinc particle surface with metallic oxide (for example, Ti oxide and Zr oxide).

PTL 20 discloses a metal air secondary battery that suppresses a dendrite short circuit of metal using conductive oxide ceramics as a barrier membrane.

PTL 21 discloses an ion conductive film and a secondary battery into which the ion conductive film and a zinc negative electrode are integrated.

NPL 2 discloses an electrolyte solution in which the solubility of zinc by various additive agents is reduced to suppress dendrite of zinc.

NPL 3 discloses zinc dissolution by giving a surface treatment with, for example, an anionic exchange membrane to suppress dendrite of zinc.

NPL 4 discloses a dense carbonate aqueous solution as an electrolyte solution in which the solubility of zinc is reduced.

NPL 5 discloses suppression of dendrite deposit by zinc diffusion control with a nanoporous electrode.

CITATION LIST

Patent Literature

PTL 1: JP2019021518A
PTL 2: JP2019016602A
PTL 3: JP2018147739A
PTL 4: JP2018147738A
PTL 5: JP2018133324A
PTL 6: JP2018026205A
PTL 7: WO2017183633A
PTL 8: JP2017091949A
PTL 9: JP2016201199A
PTL 10: JP2016194990A
PTL 11: JP2016189356A
PTL 12: JP2016170944A
PTL 13: JP2016146263A
PTL 14: JP2014222570A
PTL 15: WO2014069541A
PTL 16: JP2014026951A
PTL 17: JP2015519686A
PTL 18: US20180130998A
PTL 19: WO2017077991A
PTL 20: JP2012104273A
PTL 21: WO2014119665A

Non-Patent Literature

NPL 1: J. F. Parker, C. N. Chervin, I. R. Pala, M. Machler, M. F. Burz, J. W. Long, D. R. Rolison, Science, Vol. 356, pp. 415-418 (2017)
NPL 2: T. C. Adler, F. R. McLarnon, E. J. Cairns, Journal of Electrochemical Society, Vol. 140, No. 2, pp. 289-294 (1993)
NPL 3: K. Miyazaki, Y. S. Lee, T. Fukutsuka, T. Abe, Electrochemistry, Vol. 80, No. 10, pp. 725-727 (2012)

NPL 4: T. Ishida, S. Nakata, S. Tsujimoto, H. Yamada, K. Katakura, Electrochemistry, Vol. 83, No. 10, pp. 864-866 (2015)

NPL 5: R. Koda, K. Fukami, T. Sakka, Y. H. Ogata, ECS Electrochemistry Letter, Vol. 2, pp. D9-D11 (2013)

SUMMARY

Technical Problem

In the above PTLs 1 to 21 and NPLs 1 to 5, various attempts were made for the problems of the "dendrite short circuit" and the "active material inhomogeneity" in the metal negative electrode, while the conventional techniques developed in the metal negative electrode and the secondary battery using the metal negative electrode could not sufficiently solve these problems. That is, a metal negative electrode sufficiently resistant to the charge and discharge cycle as a negative electrode used for a secondary battery has not been obtained. Also, the dendrite short circuit of the metal negative electrode could not be sufficiently suppressed even by improving the electrolyte. Further, for the change in voltage and capacity with respect to the charge and discharge cycle in the metal negative electrode, even if a result of hundreds of cycles or more was obtained, the charge and discharge test condition was based on an exceptionally small charge and discharge rate or an exceptionally small current density (value obtained by dividing a current by an area of the negative electrode). That is, in a condition where the zinc negative electrode is operated with a large charge and discharge rate or current density such as 1 C or more (1 C is referred to as 1 hour rate and equivalent to a current with which the battery capacity or the negative electrode capacity is charged or discharged in one hour. For example, when the battery capacity is 1 Ah, 1 C means charging or discharging with a current of 1 A.) or 10 mA/cm$^2$ or more, there was no result such that no decrease in battery capacity and no significant change in charge and discharge voltage were observed even with thousands of cycles or more. The separator developed to suppress the dendrite short circuit has no effect to suppress generation itself of the dendrite, thus there has been a problem that the suppression effect of the dendrite generation decreases over time. Further, the dendrite short circuit and the active material inhomogeneity are particularly likely to occur in the operation with a high current density or a large charge and discharge rate. Thus, to avoid these problems, it is necessary to avoid the operation with a high current density or a large charge and discharge rate and the way of use changing the operating current from a low current density to a high current density (from a low rate to a high rate) or the opposite. Therefore, there has been a problem that such metal negative electrode cannot be used for an application that requires such operation. Thus, there has been a problem that, although the metal negative electrode is required to be excellent in repeat resistance of charging and discharging and achieve such excellent repeat resistance even with a high charge and discharge rate, no metal negative electrode that achieves these properties are present. Further, there has been a problem that, as described above, although the metal negative electrode is required to be excellent in repeat resistance of charging and discharging and achieve such excellent repeat resistance even with a high charge and discharge rate, no method for fabricating the metal negative electrode that achieves these properties are present.

On the other hand, the metal negative electrode, among a variety of negative electrodes used for a secondary battery, has a possibility to achieve a capacity density higher than that of a negative electrode other than the metal negative electrode. Here, the capacity density of the metal negative electrode is a value obtained by dividing a theoretical capacity, which can be calculated from the weight of a used metal with Faraday's law, by the weight or the volume of the metal and it is expressed in units of Ah/kg or Ah/L. In the secondary battery, it is preferable that a reactant of the negative electrode or the positive electrode have a high capacity density. The reason is that the energy density of the battery is (discharge voltage)×(capacity density), and the more active materials with high capacitance density as well as discharge voltage are used, the higher the energy density will be. It is known that zinc and lithium have high theoretical capacity densities compared to other metals, but as described above, when they are used as secondary batteries, the charge and discharge cycle characteristics are poor. Thus, there has been a problem that the charge and discharge cycle characteristics of the secondary battery using zinc or lithium as a negative electrode are also poor. There also has been a problem that, in order to suppress the dendrite short circuit and the active material inhomogeneity in the secondary battery using the metal negative electrode, as a result of separating the positive electrode and the negative electrode in a separator supporting layered double hydroxide or metallic oxide, or in a solid electrolyte made of ceramics, the weight and the volume of the whole battery increase to decrease the energy density. There also has been a problem that, in order to suppress the dendrite short circuit, as a result of decreasing a solubility of metallic ions in the electrolyte or coating the metal negative electrode with, for example, an ion conductive material or metallic oxide, the charge and discharge rate is limited to be small. Further, there has been a problem that, in any method, in the secondary battery using the metal negative electrode, it is not possible to charge and discharge with thousands of cycles at a high charge and discharge rate. There also has been a problem that the dendrite generation or the active material inhomogeneity reduces the area of a part that can actually be involved in the reaction in the negative-electrode active material, thus the battery resistance significantly changes in accordance with charging and discharging or with a SOC (It means a State of Charge and also referred to as a charging rate, and, for example, an SOC of 100% means a fully charged condition and 0% means a fully discharged condition. 50% means a condition that a half of the total battery capacity has been charged. If the discharge starts from the fully charged condition with an SOC of 100%, when a half of the total battery capacity is discharged, the SOC will be 50%, and another half of the total battery capacity is discharged, the SOC will be 0%. If the charge starts from an SOC of 0%, the SOC will change until it finally reaches 100% according to the amount of charged electricity.). Further, the secondary battery is used not only for discharging and charging with an always constant current but also in a way necessary to change the rate of charging and discharging during the operation. For example, in applications for a hybrid car, a plug-in hybrid car, an electric car, a power supply for preventing momentary stop, an emergency power source, a power stabilization power supply, instantaneously large power output is required. However, there has been a problem that it is difficult to perform a high-rate discharge from a low-rate discharge because this leads to facilitate the dendrite short circuit and the active material inhomogeneity in the secondary battery using the metal negative electrode. Even if the high-rate discharge is performed, it involves a change in battery resistance, thus there has been a problem that it is difficult to instantaneously return to the voltage before the high-rate discharge and the responsivity to the rate change in the discharge is poor. The same applies to the charge to lead to facilitate the dendrite short circuit and the active material inhomogeneity, thus there has been a problem that the high-rate charge is difficult. Further, there also has been a problem that it is difficult to instantaneously return to the voltage before the high-rate charge and the responsivity to the rate change in the charge is poor.

Solution to Problem

In order to solve the above problems, the present inventors have studied intensively and came up with the idea of regulating a reaction space between a metal negative electrode and a positive electrode, and has completed a metal negative electrode, a method for fabricating the metal negative electrode, and a secondary battery including the metal negative electrode of this disclosure. The primary features of this disclosure are described below.

A metal negative electrode used for a secondary battery according to this disclosure includes an active material portion, a current collector, and a non-electronically conductive reaction space divider. The active material portion forms metal during charging and forms an oxidation product of the metal during discharging. The metal is used as a negative-electrode active material. The current collector is electrically connected to the active material portion. The non-electronically conductive reaction space divider is integrally formed with or connected to the current collector and/or the active material portion. The reaction space divider has a plurality of electrolyte holder portions configured to hold a liquid electrolyte.

In a method for fabricating a metal negative electrode used for a secondary battery according to this disclosure, the metal negative electrode includes an active material portion, a current collector, and a non-electronically conductive reaction space divider. The active material portion forms metal during charging and forms an oxidation product of the metal during discharging. The metal is used as a negative-electrode active material. The current collector is electrically connected to the active material portion. The non-electronically conductive reaction space divider is integrally formed with or connected to the current collector and/or the active material portion. The reaction space divider has a plurality of electrolyte holder portions configured to hold a liquid electrolyte. The method includes a step of integrally forming the current collector and the non-electronically conductive reaction space divider or connecting the current collector to the non-electronically conductive reaction space divider, and a step of electrically connecting the active material portion to the current collector.

A secondary battery according to this disclosure includes the above metal negative electrode.

Advantageous Effect

The metal negative electrode and the method for fabricating it according to this disclosure provide the following effects.

According to the metal negative electrode of this disclosure, the dendrite short circuit is suppressed, and the dendrite reaches the positive electrode in early phase of the charge and discharge cycle, thus preventing the secondary battery from not being used. In order to prevent the dendrite short circuit, it is not necessary to decrease the solubility of metallic ions and use, for example, the solid electrolyte that does not cause the dendrite to pass, thus having an effect that it is possible to charge and discharge even at a high charge and discharge rate and this does not increase the weight and the volume of the battery. In addition, according to the metal negative electrode of this disclosure, the active material inhomogeneity is suppressed, thus preventing a decrease in current efficiency and a decrease in the battery capacity that occur due to active material inhomogeneity even by repeating charging and discharging. The suppression of the active material inhomogeneity can prevent a local increase in active material thickness from the initial state that leads to induce the dendrite short circuit. The suppression of the active material inhomogeneity can prevent a decrease in negative electrode capacity or battery capacity with respect to an increase in charge and discharge cycle, thus having an effect that, in order to meet product specifications required for the negative electrode and the battery, it is not necessary to excessively increase the amount of the active material with respect to the battery capacity when manufacturing the negative electrode, or the excessive amount of the negative-electrode active material can be reduced as much as possible. In addition, the dendrite short circuit and the active material inhomogeneity are suppressed, thus having an effect that the metal negative electrode of this disclosure can be applied to the operation at a high current density and a large charge and discharge rate and a way of use that changes the operation current from the low current density to the high current density (from the low rate to the high rate) or the opposite.

Further, according to the method for fabricating the metal negative electrode of this disclosure, the metal negative electrode having the excellent effects as described above can be fabricated at a few steps, at a low cost and by an easy manufacturing technique, and continuous fabrication for mass production is ensured. In addition, the method for fabricating the metal negative electrode of this disclosure can include an oxidation step of converting the metal that is an active material into an oxidation product, thus having an effect that the metal negative electrode having the excellent effects as described above can be provided as a metal negative electrode appropriate to a case where the battery is fabricated from the discharged condition.

Further, according to the secondary battery of this disclosure, the effect on the negative electrode as described above is obtained, thus having an effect that, in the secondary battery using the metal negative electrode that has not been put in practical application, a secondary battery excellent in charge and discharge cycle characteristics is provided. Improvement in charge and discharge cycle characteristics of the secondary battery using the metal negative electrode has an effect to obtain the secondary battery that can provide a high energy density and a high output density. In addition, an effect is provided to suppress the change in battery resistance with respect to the SOC during charging and discharging. Further, an effect is provided to ensure the operation that changes the charge and discharge rate from the low-rate discharge or charge to the high-rate discharge or charge and the opposite and to enable to instantaneously return to the voltage before discharging or charging at a high rate, thus improving a responsivity to the rate change during charging and discharging.

DETAILED DESCRIPTION (Metal Negative Electrode)

A metal negative electrode according to one embodiment of this disclosure is a metal negative electrode used for a secondary battery, which includes an active material portion, a current collector, and a non-electronically conductive reaction space divider. The active material portion forms metal during charging and forms an oxidation product of the metal during discharging. The metal is used as a negative-electrode active material. The current collector is electrically connected to the active material portion. The non-electronically conductive reaction space divider is integrally formed with or connected to the current collector and/or the active material portion. The reaction space divider has a plurality of electrolyte holder portions configured to hold a liquid electrolyte.

Such metal negative electrode can be a metal negative electrode having a structure in which, for example, a plurality of recesses is provided, a negative-electrode active material is exposed on at least a part of a bottom surface of each recess, and a side wall of each recess consists of a non-electronically conductive material. In fabrication of the battery, an electrolyte is injected into the plurality of recesses of the metal negative electrode and positive electrode is disposed to cover the recesses to ensure charge and discharge reaction in the respective recesses. In this case, space in which the charge and discharge reaction occurs is divided into a plurality of sections by the non-electronically conductive side wall, thus regulating the reaction space. The following description of the method for fabricating the reaction space divider and the metal negative electrode is applicable to formation of the side wall and the bottom surface of the recess. The negative-electrode active material exposed on the bottom surface can be a part of the active material portion to which the current collector is electrically connected, and in this case, the following description is applicable to the active material portion and the current collector.

Figure 1:
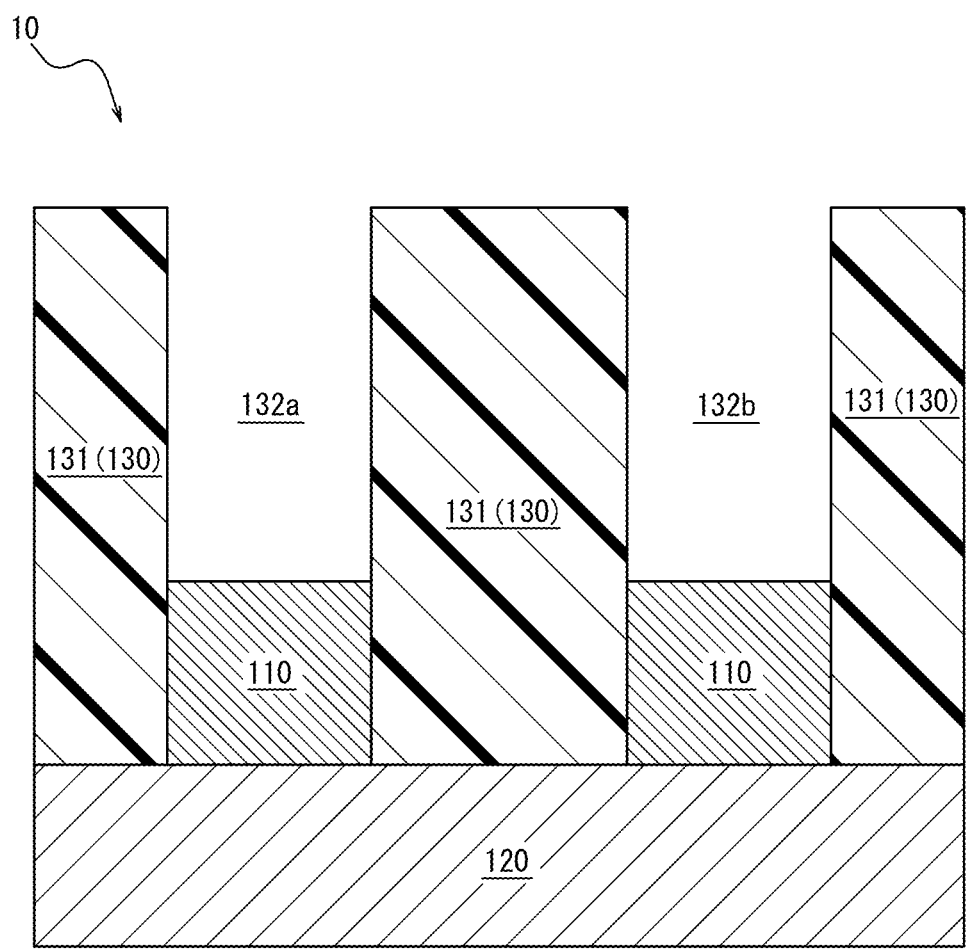
FIG. 1 is a schematic cross-sectional view illustrating one example of a metal negative electrode according to one embodiment of this disclosure.
Figure 2:
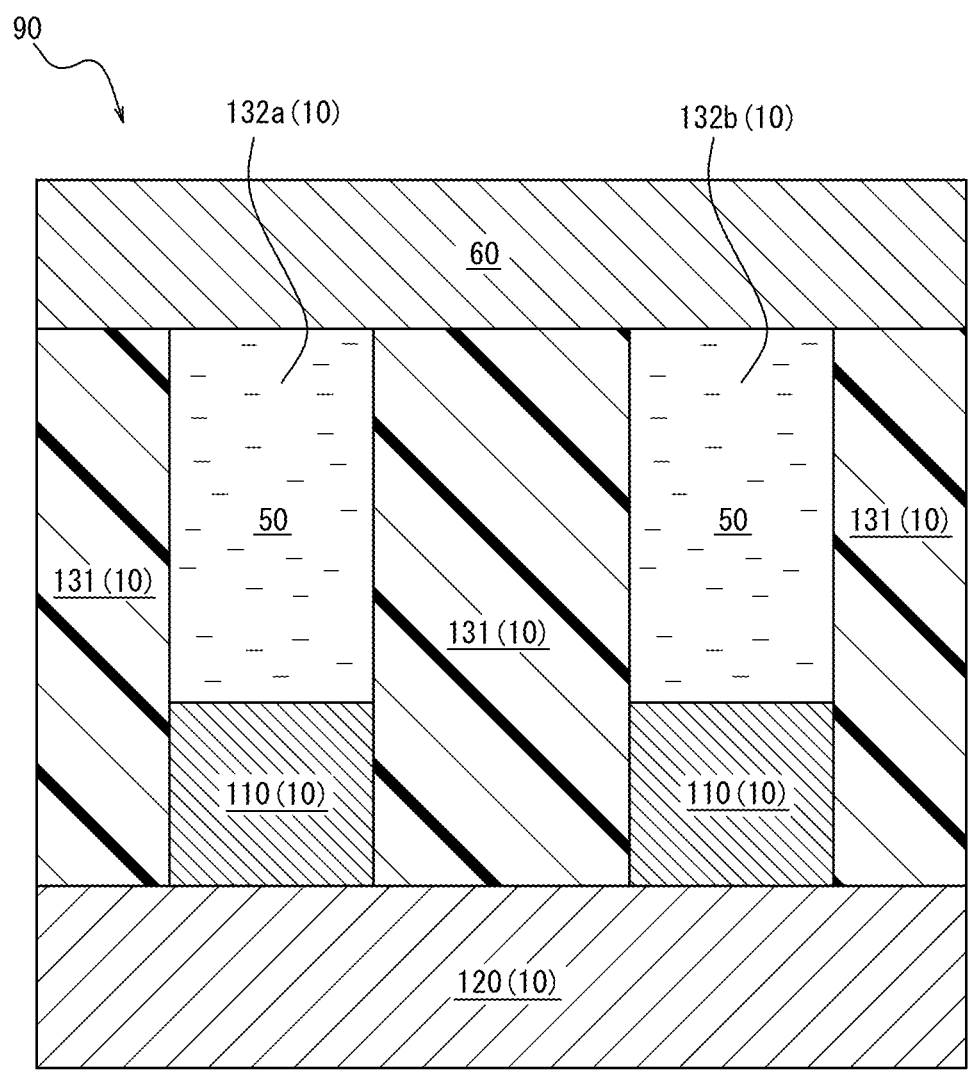
FIG. 2 is a schematic cross-sectional view illustrating one example of a secondary battery including the metal negative electrode illustrated in FIG. 1.

A specific example of a structure of a metal negative electrode 10 will be described with reference to schematic cross-sectional views of FIG. 1 and FIG. 2. The metal negative electrode 10 exemplified in FIG. 1 includes an active material portion 110, a current collector 120, which is electrically connected to this active material portion 110, and a non-electronically conductive reaction space divider 130, which is integrally formed with the current collector 120 and the active material portion 110. This reaction space divider 130 has a plurality of electrolyte holder portions 132a, 132b that can hold a liquid electrolyte 50 (see FIG. 2). In other words, the "electrolyte holder portion" in the reaction space divider is a space that can hold the liquid electrolyte. Each of the electrolyte holder portions 132a, 132b can consist of, for example, a structure punched out from a main body 131 of the reaction space divider 130. The detail will be described later. In the metal negative electrode 10, respective one sides of the electrolyte holder portions 132a, 132b are occluded by the active material portion 110 and the other sides are opened. FIG. 2 is one example of a secondary battery 90 including the metal negative electrode 10 illustrated in FIG. 1. The secondary battery 90 exemplified in FIG. 2 includes at least the metal negative electrode 10, the liquid electrolyte 50 and a positive electrode 60. In the secondary battery 90, the liquid electrolyte 50 is held in the respective spaces of the electrolyte holder portions 132a, 132b. Spaces between the positive electrode 60 and the metal negative electrode 10 will be equivalent to the electrolyte holder portions 132a, 132b. However, the metal negative electrode 10 described with reference to FIG. 1 and FIG. 2 is merely one specific example. In the secondary battery 90, it is also preferable that an abutting surface of the reaction space divider 130 on the positive electrode 60 be a smooth surface so that the metal negative electrode 10 can contact the positive electrode 60 at the reaction space divider 130. The reaction space divider 130 can hold the liquid electrolyte 50 in the electrolyte holder portions 132a, 132b, while the reaction space divider 130 can be a non-penetrant material so that the liquid electrolyte 50 does not penetrate the main body 131.

One embodiment of this disclosure encompassing the above one specific example will be described including the action and the effect. For convenience of explanation, one example of the metal negative electrode according to one embodiment of this disclosure will be described using a case in which the active material portion includes the negative-electrode active material consisting of zinc as an example. The following example does not exclude an active material portion including a negative-electrode active material consisting of zinc oxide that is an oxidation product of zinc or does not exclude an active material portion including a negative-electrode active material consisting of both of zinc and zinc oxide. Thus, the active material portion of the metal negative electrode of this disclosure can include a negative-electrode active material consisting of metal, an oxidation product of the metal or both of them.

First, in the active material portion, zinc is formed during charging, and zinc oxide, which is the oxidation product of zinc, is formed during discharging. Reaction between zinc and zinc oxide involves $Zn(OH)_4^{2-}$ that is a zinc oxide ion in the electrolyte. The active material portion in the zinc negative electrode is, for example, deposited, piled up or accumulated on a current collector such as a copper plate and copper mesh in a chemical, electrochemical or mechanical method to be electrically connected the current collector. In addition, the zinc negative electrode has a non-electronically conductive reaction space divider integrally formed with or connected to the current collector and/or the active material portion. Here, the reason why the reaction space divider is non-electronically conductive is to prevent an internal short-circuit even if this reaction space divider contacts the positive electrode. Further, taking an example of a zinc-nickel secondary battery using the zinc negative electrode and an aqueous potassium hydroxide solution, the reaction space divider has a plurality of electrolyte holder portions that can hold the aqueous potassium hydroxide solution.

<Reaction Space Divider>

Specific examples of thin-plate-like members applicable to the reaction space divider having such electrolyte holder portions will be described in details with reference to FIG. 3 to FIG. 10 that are schematic drawings in which the reaction space divider has been extracted from the metal negative electrode. In the following reaction space divider, the signs of the last two digits of the three digits refer to the identical type of configuration and duplicate explanations will be omitted.

First Example of Reaction Space Divider

Figure 3:
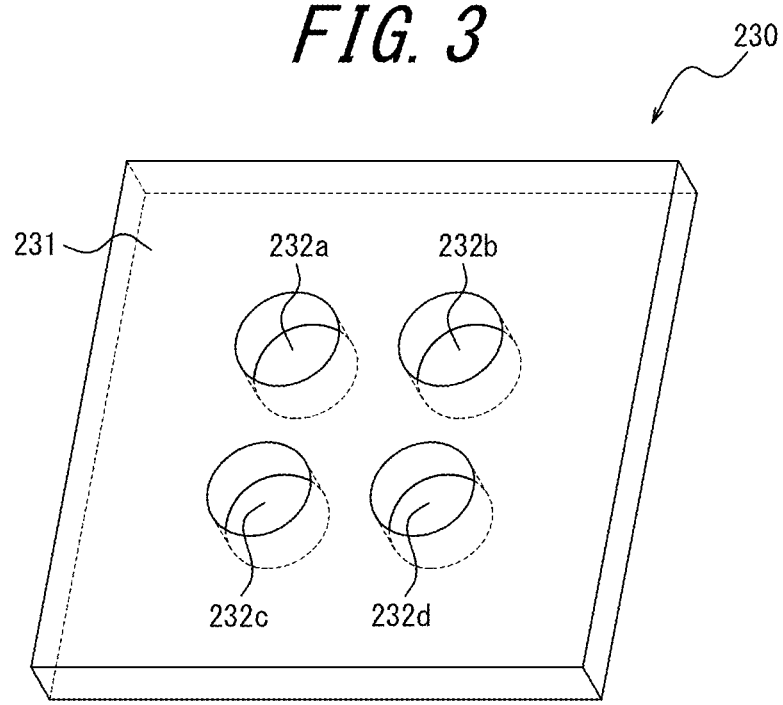
FIG. 3 is a first example of a shape diagram of a reaction space divider in the metal negative electrode according to one embodiment of this disclosure.

A reaction space divider 230 in FIG. 3 has a thin-plate-like outer shape. The reaction space divider 230 has four circular through-holes (cylindrical structures) punched out from a main body 231. In this example, these through-holes constitute electrolyte holder portions 232a, 232b, 232c, 232d. The "through-hole" here is intended to pass through the front and back sides of the reaction space divider 230 when it is viewed as a single component. As described with reference to FIG. 1 and FIG. 2, one surface side of the reaction space divider is occluded in the entire metal negative electrode. In the case of this example, each of the electrolyte holder portions has a circular cross-sectional shape in a surface parallel to the occluded surface. The reaction space divider 230 in FIG. 3 has one planar portion that will be a surface integrally formed with or connected to the current collector and/or zinc that is the active material portion. When used as a secondary battery, the positive electrode can be arranged on a planar portion side opposite to the above planar portion, and the electrolyte holder portions are filled with the liquid electrolyte.

Second Example of Reaction Space Divider

Figure 4:
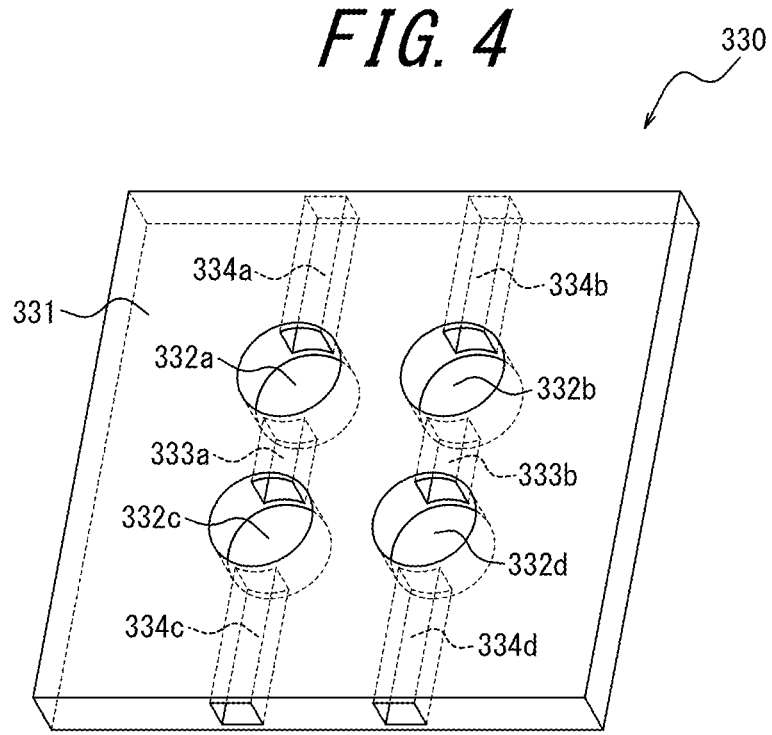
FIG. 4 is a second example of the shape diagram of the reaction space divider in the metal negative electrode according to one embodiment of this disclosure.

A reaction space divider 330 in FIG. 4, similarly to FIG. 3, has electrolyte holder portions 332a, 332b, 332c, 332d formed by four through-holes having circular cross-sectional surfaces and has connection passages 333a, 333b that connect the left and right, upper and lower two electrolyte holder portions 332a, 332c and electrolyte holder portions 332b, 332d to one another respectively. Further, in the reaction space divider 330 in FIG. 4, the respective electrolyte holder portions are connected to an edge of the reaction space divider 330 (side surface portions in the upper and lower direction of the drawing of the main body 331) through respective opening passages 334a, 334b, 334c, 334d on the opposite sides of the connection passages 333a, 333b. The connection passages enable the liquid electrolyte to be put from one electrolyte holder portion into the other electrolyte holder portion with respect to a plurality of electrolyte holder portions to make it easy to hold the required amount of liquid electrolyte in the identical amount in a plurality of electrolyte holder portions. For example, in a transversely mounted secondary battery an in FIG. 2, the connection passages facilitate leveling of the liquid electrolyte held in the plurality of electrolyte holder portions and makes it easy to put the required amount of liquid electrolyte. In addition, the opening passages enable the liquid electrolyte to be held by putting it from the opening passages to the electrolyte holder portions without directly putting the liquid electrolyte into the electrolyte holder portions. For example, in a case of a longitudinally mounted secondary battery not the transversely mounted one as in FIG. 2, the opening passages enable the required amount of liquid electrolyte for the electrolyte holder portion to be easily put into the plurality of electrolyte holder portions by putting the liquid electrolyte from the opening passages present in the upper portion. Further, provision of both of the connection passages and the opening passages can simultaneously obtain the above-described actions, thus making it easier to hold the liquid electrolyte in the electrolyte holder portions. For example, there is an advantage that the electrolyte holder portion can be filled with the liquid electrolyte after causing the metal negative electrode to contact the positive electrode via the reaction space divider.

In FIG. 4, the connection passages 333a, 333b may be grooves (connection grooves) that are open at the top or bottom. These grooves form spaces with the positive electrode or the metal negative electrode to form connection passages. The opening passages 334a, 334b, 334c, 334d may be grooves (opening grooves) that are open at the top or bottom. These grooves form spaces with the positive electrode or the metal negative electrode to form opening passages. However, when forming the space with the metal negative electrode, a part of the metal negative electrode corresponding to the groove (the connection groove or the opening groove) have a structure on which the negative-electrode active material is not exposed and, for example, this part may be sealed.

Third Example of Reaction Space Divider

Figure 5:
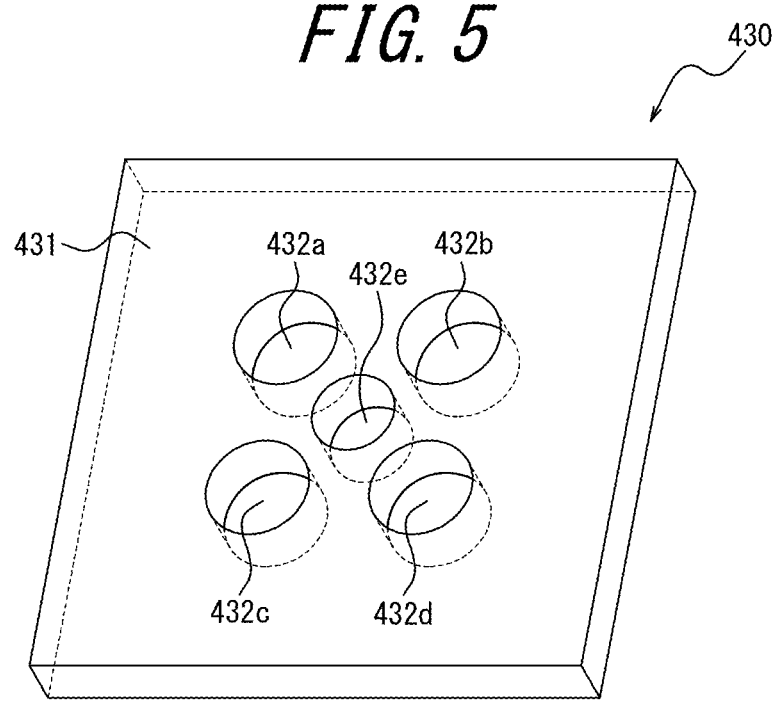
FIG. 5 is a third example of the shape diagram of the reaction space divider in the metal negative electrode according to one embodiment of this disclosure.

A reaction space divider 430 in FIG. 5 has five electrolyte holder portions 432a, 432b, 432c, 432d, 432e. The electrolyte holder portions 432a, 432b, 432c, 432d have identical diameters and the center electrolyte holder portion 432e is formed by a through-hole having a circular cross-sectional surface with a diameter smaller than those of the four surrounding electrolyte holder portions.

Fourth Example of Reaction Space Divider

Figure 6:
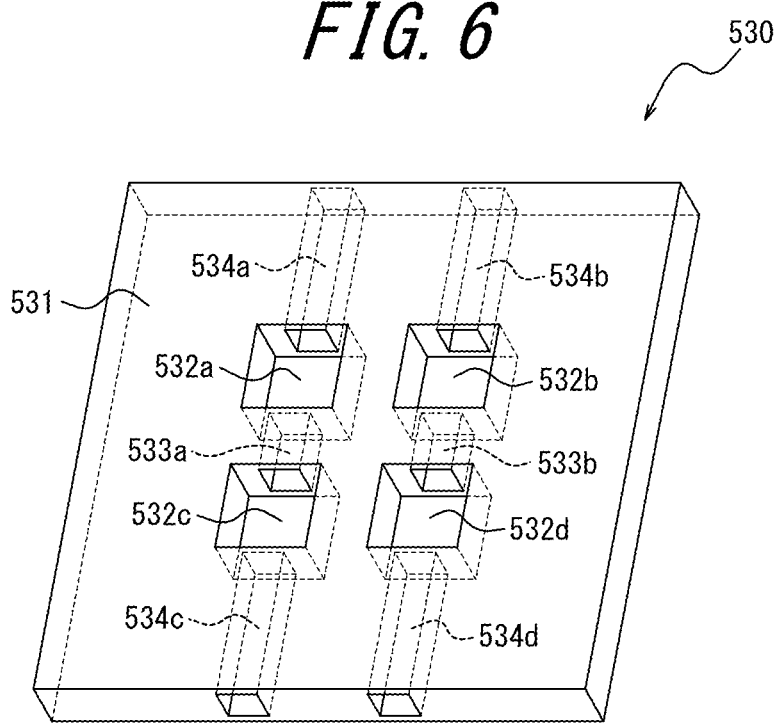
FIG. 6 is a fourth example of the shape diagram of the reaction space divider in the metal negative electrode according to one embodiment of this disclosure.

A reaction space divider 530 in FIG. 6, similarly to the reaction space divider 330 in FIG. 4, has electrolyte holder portions 532a, 532b, 532c, 532d, connection passages 533a, 533b and opening passages 534a, 534b, 534c, 534d. However, while the electrolyte holder portions 332a, 332b, 332c, 332d in FIG. 4 are formed by the through-holes having circular cross-sectional surfaces, the respective electrolyte holder portions in FIG. 6 are formed by through-holes having quadrate cross-sectional surfaces. In FIG. 6, the connection passages 533a, 533b may be grooves (connection grooves) that are open at the top or bottom. These grooves form spaces with the positive electrode or the metal negative electrode to form connection passages. The opening passages 534a, 534b, 534c, 534d may be grooves (opening grooves) that are open at the top or bottom. These grooves form spaces with the positive electrode or the metal negative electrode to form opening passages. However, when forming the space with the metal negative electrode, a part of the metal negative electrode corresponding to the groove (the connection groove or the opening groove) has a structure on which the negative-electrode active material is not exposed and, for example, this part may be sealed.

Fifth Example of Reaction Space Divider

Figure 7:
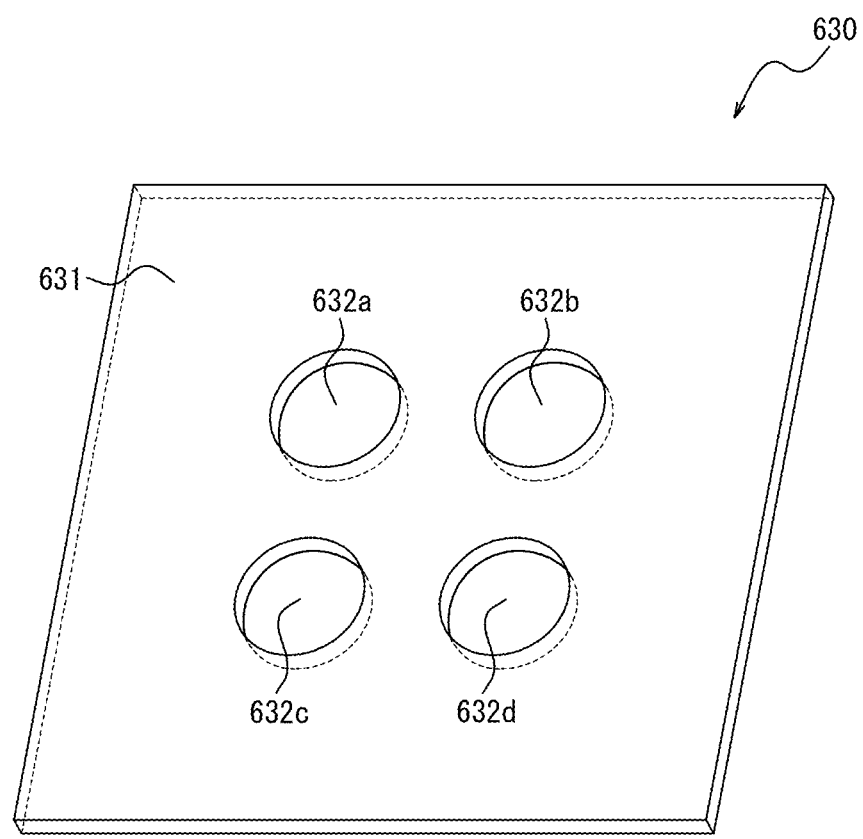
FIG. 7 is a fifth example of the shape diagram of the reaction space divider in the metal negative electrode according to one embodiment of this disclosure.

A reaction space divider 630 in FIG. 7, similarly to the reaction space divider 230 in FIG. 3, has a thin-plate-like outer shape and electrolyte holder portions formed by four through-holes having circular cross-sectional surface therein, while being thinner than the reaction space divider 230 in FIG. 3. The thickness of the reaction space divider corresponds to the thickness of the electrolyte, thus if it becomes too thick, the ohmic loss of the electrolyte will increase, which is not preferable. The thickness of the reaction space divider should be 3 mm or less, but 3 mm is not the upper limit because a suitable amount of electrolyte is required when the area of the active material portion is large or the capacity of the negative electrode is large. An optimal thickness of the reaction space divider may be determined according to the relation such as the area of the active material portion, the capacity of the negative electrode and the ohmic loss of the electrolyte.

Sixth Example of Reaction Space Divider

Figure 8:
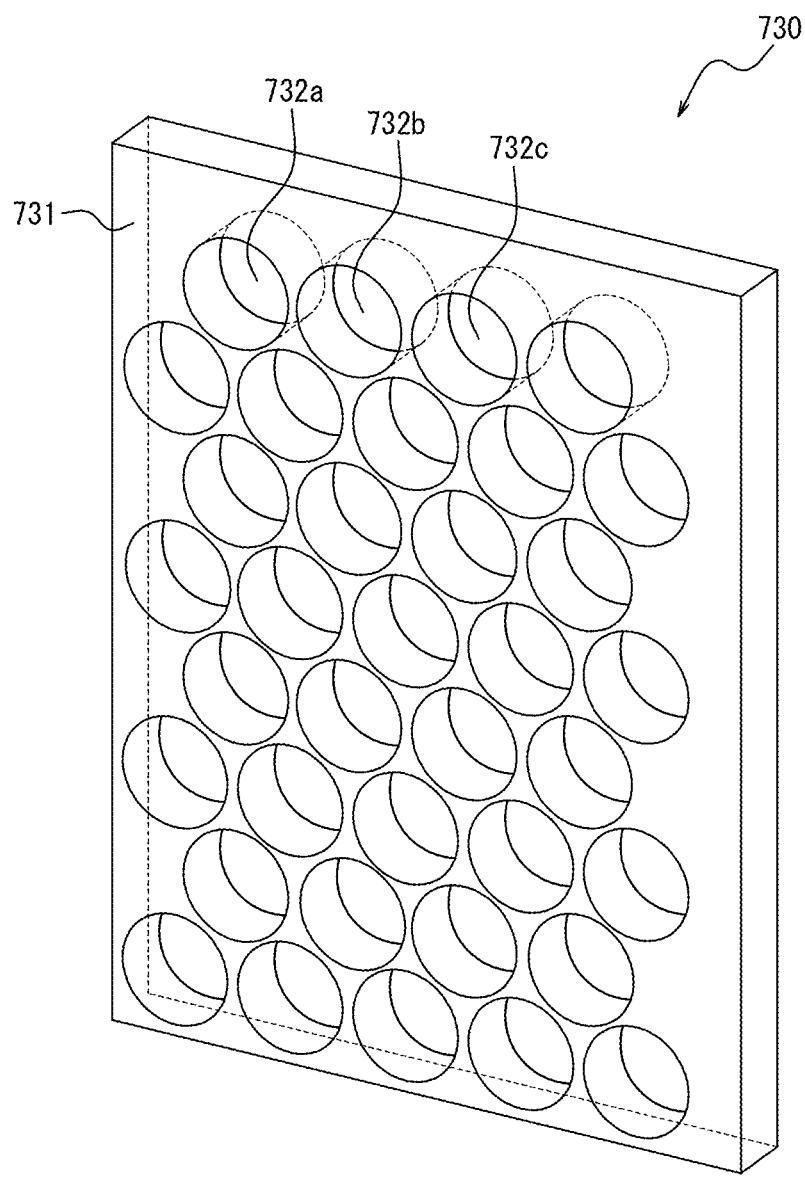
FIG. 8 is a sixth example of the shape diagram of the reaction space divider in the metal negative electrode according to one embodiment of this disclosure.

A reaction space divider 730 in FIG. 8, similarly to the reaction space divider 230 in FIG. 3, has a thin-plate-like outer shape and has electrolyte holder portions 732a, 732b, 732c, . . . formed by through-holes having circular cross-sectional surfaces. However, the number of electrolyte holder portions is larger than that of the reaction space divider 230 in FIG. 3 and the arrangement is differ from that of the electrolyte holder portions 232a, 232b, 232c, 232d in FIG. 3. The electrolyte holder portions 232a, 232b, 232c, 232d formed by the circular through-holes are arranged in a square grid pattern in FIG. 3, while the electrolyte holder portions 732a, 732b, 732c, . . . are alternately arranged in a honeycomb pattern in FIG. 8. With respect to FIG. 3, the reaction space divider 730 in FIG. 8 is designed such that the ratio of the area occupied by other than the electrolyte holder portions is smaller, and the ratio (hereinafter, referred to as "aperture ratio") of the total area of the electrolyte holder portions 732a, 732b, 732c, . . . to the area determined from the outer shape of the planar portion (four sides of the planar portion) of the main body 731 in the reaction space divider 730 is larger.

Seventh Example of Reaction Space Divider

Figure 9:
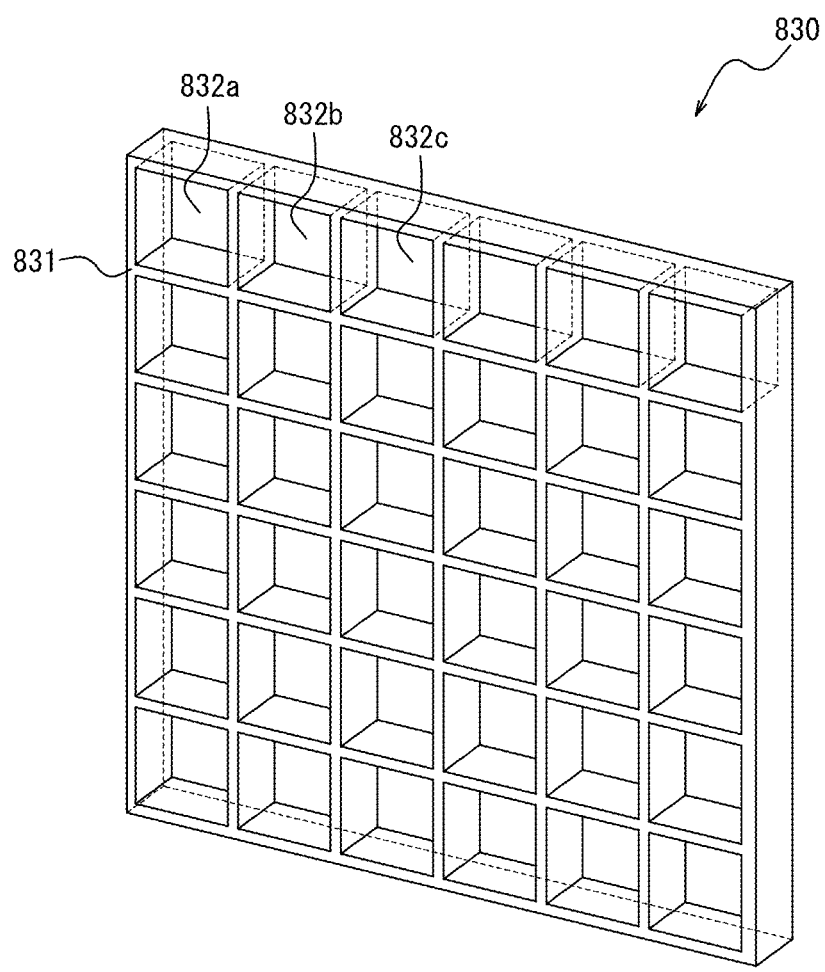
FIG. 9 is a seventh example of the shape diagram of the reaction space divider in the metal negative electrode according to one embodiment of this disclosure.

A reaction space divider 830 in FIG. 9, like the reaction space divider 530 in FIG. 6, has electrolyte holder portions 832a, 832b, 832c, . . . formed by through-holes having quadrate cross-sectional surfaces. However, the number of electrolyte holder portions is larger than that of the reaction space divider 530 in FIG. 6, and the ratio of the area occupied by the main body 831 other than the electrolyte holder portions is smaller than that of the reaction space divider 530 in FIG. 6. Accordingly, the reaction space divider 830 in FIG. 9 is designed such that the aperture ratio is larger.

Eighth Example of Reaction Space Divider

Figure 10:
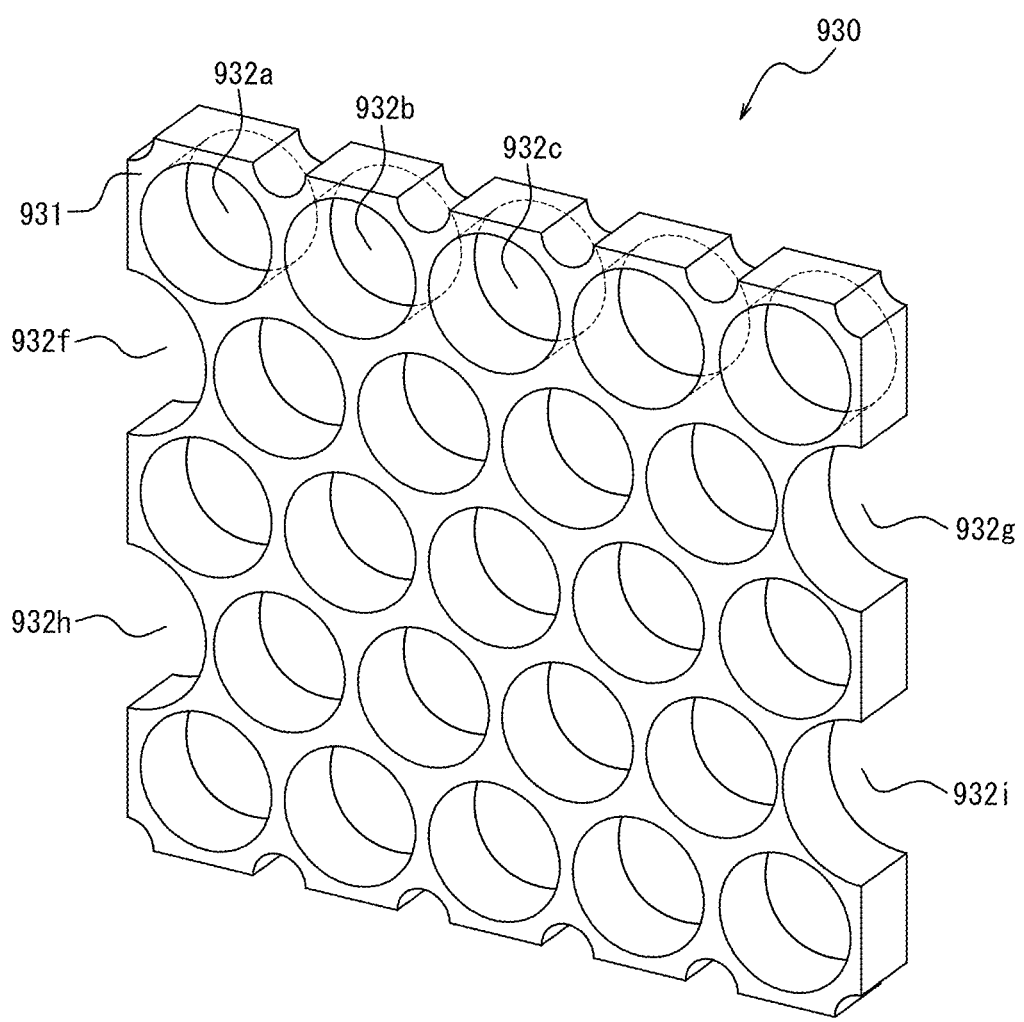
FIG. 10 is an eighth example of the shape diagram of the reaction space divider in the metal negative electrode according to one embodiment of this disclosure.

A reaction space divider 930 in FIG. 10, similarly to the reaction space divider 730 in FIG. 8, has a thin-plate-like main body 931 and has electrolyte holder portions 932a, 932b, 932c, . . . formed by through-holes having circular cross-sectional surfaces. However, unlike FIG. 8, the main body 931 has an edge that is not quadrate. Some (932f, 932g, 932h, 932i) of the electrolyte holder portions have structures cut off at the edge of the reaction space divider 930. Thus, the reaction space divider 930 in FIG. 10 is designed such that the ratio of the area occupied by the main body 931 other than the electrolyte holder portions is even smaller than that of the reaction space divider 730 in FIG. 8 and thus the aperture ratio is larger.

The above first to eighth examples have been described as the representative examples of the reaction space divider, but they are merely specific examples, and the main body, the connection passages and the opening passages besides the shape, the number and the magnitude of the electrolyte holder portion can be appropriately configured. For example, the connection passages and the opening passages are not illustrated in FIG. 3, FIG. 5, FIG. 7 to FIG. 10, but the connection passages may be provided, the opening passages may be provided, or both of them may be provided. When the connection passages, the opening passage or both of them are provided, various numbers of combinations can be configured on the reaction space divider as necessary, such as one connection passage and one opening passage, a plurality of connection passages and a plurality of opening passage, one connection passage and a plurality of opening passages, and a plurality of connection passages and one opening passage. It is not intended to limit the scope of this disclosure, but when the reaction space divider including the above electrolyte holder portion is a plate-like member, the thickness range of 0.5 mm to 5 mm can be exemplified, when the cross-sectional shape of the electrolyte holder portion is circular, the diameter of 1 mm to 10 mm can be exemplified, and when the cross-sectional shape of the electrolyte holder portion is square, the length of the diagonal of 1 mm to 10 mm can be exemplified. Like some (932f, 932g, 932h, 932i) of the electrolyte holder portions referring to FIG. 10, the electrolyte holder portion of the reaction space divider does not have to be configured to be enclosed only by the main body of the zinc negative electrode as long as it can hold the liquid electrolyte, and as necessary may hold the liquid electrolyte via a member (for example, a container, a positive electrode (air electrode) and a spacer) other than the main body.

The following describes a method for fabricating a metal negative electrode used for a secondary battery according to one embodiment of this disclosure. As described before, the metal negative electrode includes an active material portion, a current collector, and a non-electronically conductive reaction space divider. The active material portion forms metal during charging and forms an oxidation product of the metal during discharging. The metal is used as a negative-electrode active material. The current collector is electrically connected to the active material portion. The non-electronically conductive reaction space divider is integrally formed with or connected to the current collector and/or the active material portion. The reaction space divider has a plurality of electrolyte holder portions configured to hold a liquid electrolyte. This fabrication method includes a step of integrally forming the current collector and the non-electronically conductive reaction space divider or connecting the current collector to the non-electronically conductive reaction space divider, and a step of electrically connecting the active material portion to the current collector.

<Method for Fabricating Zinc Negative Electrode>

Here, the method for fabricating the metal negative electrode of this disclosure will be described using the zinc negative electrode as an example. In the case of a zinc negative electrode using a copper plate or copper mesh as the current collector, it can be fabricated such that, for example, over an object formed into a thin film by electroplating the copper plate with the required amount of zinc for charging and discharging in advance or an object obtained by attaching a thin zinc film to the copper plate by crimping, the reaction space dividers 230 to 930 are integrated by crimping, fusing, sticking, heat-curing or three-dimensional modeling or connected with an adhesive. It can be also fabricated such that the copper mesh is integrated with the reaction space dividers 230 to 930 by crimping and zinc is deposited on the copper mesh inside the electrolyte holder portion by electroplating or the required amount of zinc powder is put on the copper mesh to be fixed. The following describes exemplary methods for fabricating the zinc negative electrode.

First Example of Fabrication Method

Figure 11:
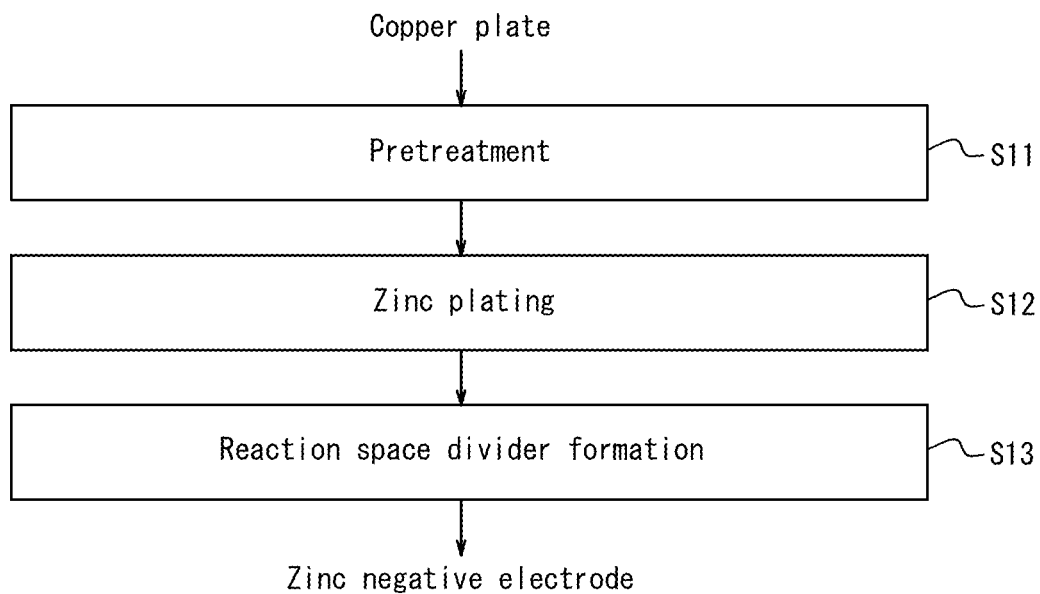
FIG. 11 is a flow diagram of a first example of a method for fabricating a zinc negative electrode according to one embodiment of this disclosure.

A flow chart in FIG. 11 will be referred. For example, the copper plate is used as the current collector, and if necessary, the surface of the copper plate is subjected to pretreatment such as degreasing and etching (S11). Then, a method that can form zinc such as the evaporation method, the sputtering method, the electroplating method and the hot dipping method is used to form an active material portion consisting of zinc in an amount equivalent to the capacity required as the zinc negative electrode (S12). FIG. 11 illustrates zinc plating as a specific example at step S12. Next, the reaction space divider is connected to the surface and/or the end surface of the formed active material portion consisting of zinc by, for example, crimping, fusing, sticking, heat-curing or adhesion (S13). Thus, the zinc negative electrode according to one embodiment of this disclosure can be obtained. In the above, the range in which the active material portion consisting of zinc is formed may be only a part corresponding to an electrolytic solution holder of the reaction space divider, or the active material portion may be formed in a range larger than the part corresponding to the electrolytic solution holder, over which the reaction space divider may be integrally formed.

Second Example of Fabrication Method

Figure 12:
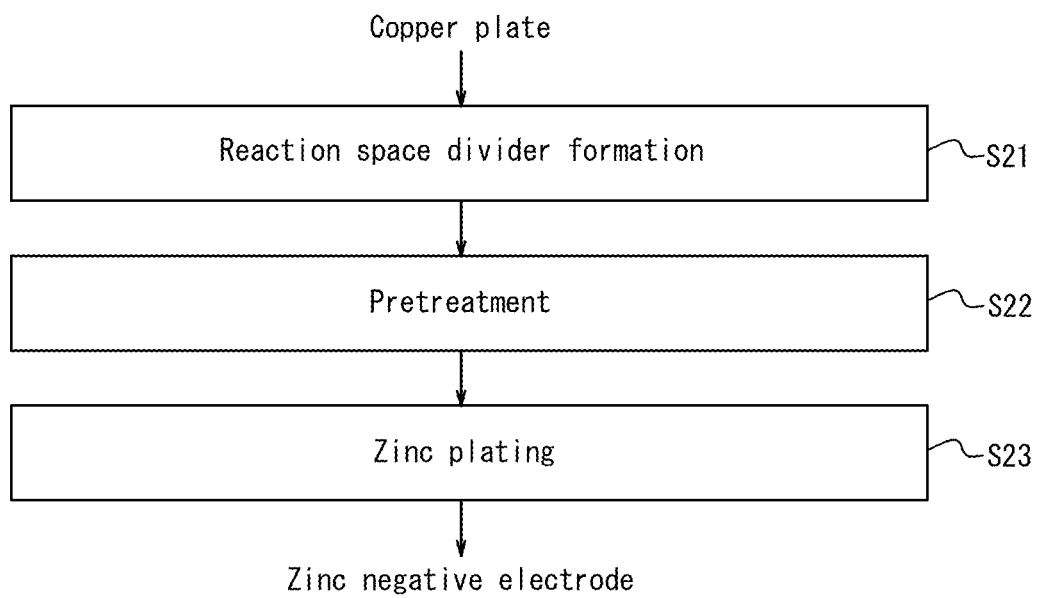
FIG. 12 is a flow diagram of a second example of the method for fabricating a zinc negative electrode according to one embodiment of this disclosure.

A flow chart in FIG. 12 will be referred. For example, using the copper plate as the current collector, the reaction space divider is connected to the surface of the copper plate by, for example, crimping, fusing, sticking, heat-curing or adhesion (S21). Then, if necessary, the surface of the copper plate is subjected to pretreatment such as degreasing and etching (S22). Next, a method that can form zinc such as the evaporation method, the sputtering method, the electroplating method or the hot dipping method is used to form the active material portion containing zinc in an amount equivalent to the capacity required as the zinc negative electrode inside the electrolyte holder portion of the reaction space divider (S23). FIG. 12 illustrates the zinc plating as a specific example at step S23. This can also obtain the zinc negative electrode according to one embodiment of this disclosure. The electrolyte holder portion leaves a space that can be filled with the electrolyte even after forming zinc.

Third Example of Fabrication Method

Figure 13:
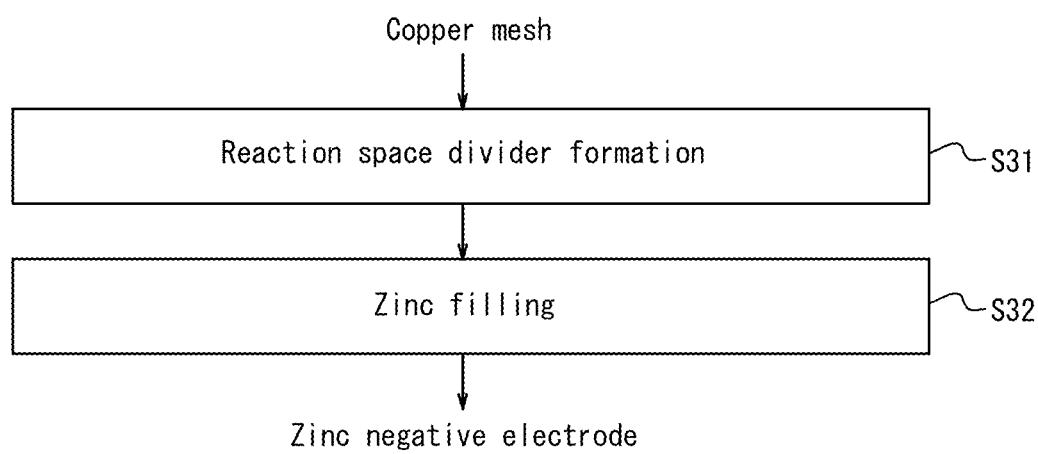
FIG. 13 is a flow diagram of a third example of the method for fabricating a zinc negative electrode according to one embodiment of this disclosure.

A flow chart in FIG. 13 will be referred. For example, using the copper mesh as the current collector, the reaction space divider is connected onto the copper mesh by, for example, crimping, fusing, sticking, heat-curing or adhesion to form the reaction space divider (S31). Then, the active material portion containing zinc is formed by filling inside of the electrolyte holder portion of the reaction space divider with zinc powder having an appropriate particle size, a mixture of the zinc powder and zinc oxide powder or a mixture obtained by mixing each of them with an appropriate binder, with an amount containing a zinc in an amount equivalent to the capacity required as the negative electrode (S32). This can also obtain the zinc negative electrode according to one embodiment of this disclosure. The electrolyte holder portion leaves a space that can be filled with the electrolyte even after being filled with zinc.

Fourth Example of Fabrication Method

Figure 14:
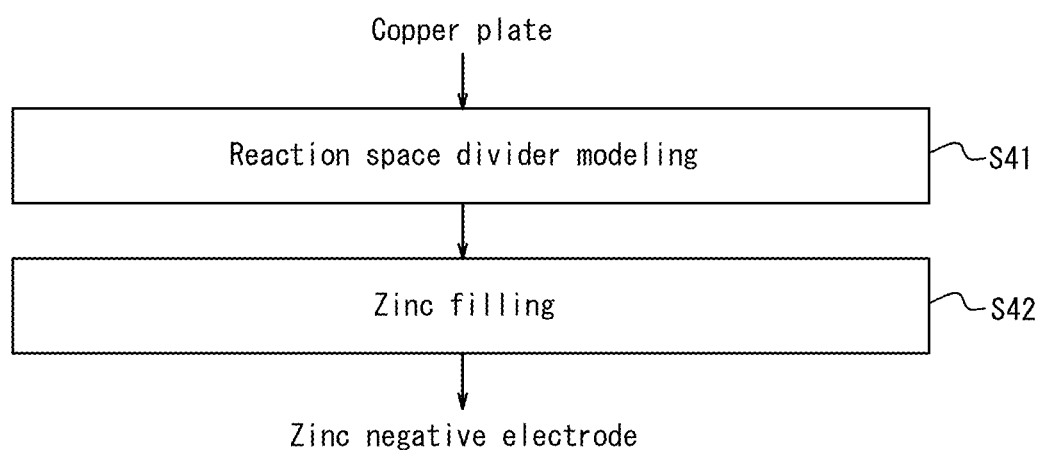
FIG. 14 is a flow diagram of a fourth example of the method for fabricating a zinc negative electrode according to one embodiment of this disclosure.

A flow chart in FIG. 14 will be referred. For example, using the copper plate as the current collector, the reaction space divider is modeled on the copper plate by a 3D modeling device (S41). Then, the active material portion containing zinc is formed by filling inside of the electrolyte holder portion of the reaction space divider with zinc powder having an appropriate particle size, a mixture of the zinc powder and zinc oxide powder or a mixture obtained by mixing each of them with an appropriate binder with an amount containing a zinc in an amount equivalent to the capacity required as the negative electrode (S42). This can also obtain the zinc negative electrode according to one embodiment of this disclosure. The electrolyte holder portion leaves a space that will be filled with the electrolyte even after being filled with zinc.

The above description in the first to fourth examples of the fabrication method exemplifies the zinc negative electrode using the copper plate or the copper mesh as the current collector and zinc as the active material, but this disclosure should not be limited to this. The fabrication method also should not be limited to the above specific examples. For example, when forming the reaction space divider, after a flowing liquid containing a raw material or a source material of the reaction space divider is printed, or applied by, for example, dripping or spraying, on a metal plate which will be the current collector to have a predetermined shape, the reaction space divider having a desired shape may be formed by, for example, drying, heating, pressurization, cooling, freeze-drying or photocoagulation. Industrially, from the point of view of the increase in productivity, the fabrication by the above printing or applying is suitable, and it is possible to employ a pattern printing method such as the ink-jet method, the screen method, the offset method, the flexographic method, the gravure method and the microcontact method, and an applying method such as the dip coating method, the die coating method, the bar coating method, the spin coating method, the offset method, the spray coating method and the doctor blade method. In this case, for example, a thermosetting resin or a light curing resin can be used independently or by mixing two or more types. Further, for example, the reaction space divider having a desired shape may be formed using a variety of processing techniques such as the machine processing, the laser beam machining, the ultrasonic machining, the chemical etching and the electrochemical oxidation or reduction after integrally forming a resin layer having a predetermined thickness on the metal plate which will be the current collector.

—Material of Reaction Space Divider—

The material of the reaction space divider is preferably selected in relation to the specific gravity with the liquid electrolyte. For example, when an aqueous solution is used as the electrolyte, the material of the reaction space divider is preferably a material having a specific gravity of 2 or less, thus preferably, for example, a resin material or other plastic material exhibiting the alkaline resistance. The material of the reaction space divider may be an inorganic material as long as being non-electronically conductive. For example, examples of non-electronically conductive materials include oxide such as alumina and zirconia, as well as a nitride. Materials other than these examples should not been excluded, but it is preferable to use an inorganic material that is non-electronically conductive, has a small specific gravity, does not increase the weight of the whole battery, and has good shape diversity and processing formability, as a material of the reaction space divider.

For example, as a material of the reaction space divider, in addition to an acrylic-based resin used in Example which will be described later, it is possible to use, for example, a polyolefin-based resin such as ultra-high-molecular-weight polyethylene resin (UHPE); a polyketone-based resin such as polyether ether ketone resin (PEEK) or polyether ketone resin (PEK); a polyphenylene-based resin such as polyphenylene sulfide resin (PPS) or denaturated-polyphenyleneether (denatured PPE); a styrene-based resin such as acrylonitrile-butadiene-styrene resin (ABS) or acrylonitrile styrene resin (AS); an epoxide-based resin such as bisphenol A epoxy resin or novolak epoxy resin. It is also possible to use a fluorine-based resin such as Teflon® (Teflon is a registered trademark in Japan, other countries, or both) or other lighter resins.

However, the material of the reaction space divider is desired to be chemically and electrochemically stable with respect to the electrolyte, and materials formed by the reaction in the metal negative electrode and the positive electrode. In addition, as already described, the reaction space divider needs to be non-electronically conductive because it will contact the positive electrode. Further, it is possible to achieve a material that is inexpensive, has good shape flexibility, and is integrally formed with or connected to the current collector and/or the active material portion, using various methods including, for example, crimping, adhesion and 3D modeling, but it is preferable to use a material that is easily applicable to these various methods.

<Action and Effect>

When describing the above zinc negative electrode as an example, the metal negative electrode according to one embodiment of this disclosure, which is described so far, regulates a three-dimensional moving range of $Zn(OH)_4^{2-}$ that is a zinc oxide ion in the aqueous potassium hydroxide solution, resulting in an action that the dendrite short circuit and the active material inhomogeneity can be suppressed. Its detail mechanism has not become clear, but the following possibilities are considered as the action mechanism.

First, the dendrite short circuit of zinc is caused by occurrence of local zinc deposition at an angle close to a direction perpendicular to the electrode surface not in the two-dimensional direction parallel to the electrode surface when zinc is deposited from the zinc oxide ions.

In the deposition of metal by electrochemical reaction, after the metallic ion receives an electron to become a metallic atom, there are a case in which the metallic atoms are bonded to one another to grow by two-dimensionally becoming metal crystal (two-dimensional growth), a case in which some of the metallic atoms form a crystal nucleus and the metallic atom is deposited at the tip of the crystal nucleus (three-dimensional growth) and their intermediate case. The dendrite short circuit is likely to occur in the case of the three-dimensional growth. Which of these growth modes will occur depends not only on the type of metal but also on the deposition rate in the identical metal. Generally, the two-dimensional growth is likely to occur when the metal deposition rate is slow, and the three-dimensional growth is likely to occur when the metal deposition rate fast.

However, the formation of the crystal nucleus that triggers the dendrite short circuit is considered to be less likely to occur when the space distribution of the metallic ions in the electrolyte is homogeneous and likely to occur when it is inhomogeneous. That is, when the potential is high enough for the metal to be deposited, the metal is more likely to be deposited and the crystal nucleus is more likely to be formed on the electrode surface that is in contact with the highly concentrated metallic ions. In fact, in the case of the zinc negative electrode, the zinc oxide ions are three-dimensionally present in the aqueous potassium hydroxide solution that is the electrolyte. Therefore, once the deposition of zinc starts, the concentration of the zinc oxide ions becomes lower on the negative electrode side and becomes relatively higher on the positive electrode side in the electrolyte. In this case, the difference in concentration is likely to occur also in the two-dimensional direction (in-plane direction of the surface of the active material portion) of the surface of the active material portion in the zinc negative electrode. Such difference in concentration causes to generate a place where zinc is likely to be deposited and a place where zinc is less likely to be deposited, resulting in generation of the dendrite in the place where zinc is likely to be deposited.

Such inhomogeneity of the concentration distribution of the metallic ions is considered to also cause the active material inhomogeneity for the same reason as above. Particularly, in the case of the secondary battery, the negative electrode is separated from the positive electrode by a few mm or less, while the size of the electrode surface is larger by more than a few cm, thus the space distribution of the metallic ions in the two-dimensional direction of the electrode surface is likely to be inhomogeneous. The metal negative electrode of this disclosure can suppress such inhomogeneity of the space distribution of the metallic ions, thus being considered to also suppress the dendrite short circuit and the active material inhomogeneity.

(Preferred Embodiment)

The metal negative electrode and its fabrication method according to one embodiment of this disclosure have been described so far using the zinc negative electrode as an example, but this disclosure should not be limited to these specific examples in any way. As long as reaction space regulating effects according to the effect of this disclosure are obtained, it is possible to appropriately apply the above-described configurations, methods and known arts. The following will further describe aspects preferable to be applied to this disclosure.

Next, in the metal negative electrode according to one embodiment of this disclosure, the metal that constitutes the negative-electrode active material is preferably selected from the group consisting of zinc, lithium, magnesium, sodium, potassium, calcium, and any of alloys containing metals thereof as components. Zinc, lithium, magnesium, sodium, potassium and calcium are known as metals with high capacity density, but they are all the metals that are likely to become dendrite. This disclosure has an action that can suppress the dendrite short circuit and the active material inhomogeneity in such metals.

Further, in the metal negative electrode according to one embodiment of this disclosure, the reaction space divider preferably has a connection passage that connects the electrolyte holder portions to one another. Such reaction space divider has, for example, a structure as illustrated in FIG. 4. As already described, the electrolyte holder portions being connected through the connection passage and the electrolyte holder portions being also connected to the edge of the reaction space divider through the opening passage cause the liquid electrolyte to be put from one electrolyte holder portion into the other electrolyte holder portion with respect to a plurality of electrolyte holder portions, making it easy to hold the liquid electrolyte. For example, in a transversely mounted secondary battery an in FIG. 2, the connection passage facilitates leveling of the liquid electrolyte held in a plurality of electrolyte holder portions and makes it easy to put the required amount of liquid electrolyte into the plurality of electrolyte holder portions.

Further, like the reaction space divider 330 illustrated in FIG. 4, the reaction space divider preferably has an opening passage that connects the electrolyte holder portion to an edge of the reaction space divider. As already described, the opening passage enables the liquid electrolyte to be held by putting it from the opening passage into the electrolyte holder portions without directly putting the liquid electrolyte into the electrolyte holder portions. For example, in a case of a longitudinally mounted secondary battery not the transversely mounted one as in FIG. 2, the opening passage enables the required amount of liquid electrolyte to be easily put into the electrolyte holder portions by putting the liquid electrolyte from the opening passage present in the upper portion. Further, like the reaction space divider 330 illustrated in FIG. 4, both the connection passage and the opening passage may be provided. This can simultaneously obtain the respective actions on the connection passage and the opening passage which are already described, thus making it even easier to put the liquid electrolyte into the electrolyte holder portions to hold the required amount of liquid electrolyte in the plurality of electrolyte holder portions. For example, the connection passage and the opening passage have an action that facilitates introduction of the electrolyte particularly when, in a cylindrical battery structure such as a dry cell, the metal negative electrode of this disclosure, the positive electrode and an insulating paper are layered and then rolled up to be put in a cylindrical battery container, and lastly the liquid electrolyte is injected into the battery container.

Further, in the metal negative electrode according to one embodiment of this disclosure, the reaction space divider preferably consists of a plastics material. The plastic material is inexpensive, has high flexibility and shape variability, has good formability of the electrolyte holder portions, the connection passages and the opening passages, has good designability and processability of the reaction space divider, is easy to manufacture, has excellent durability even when the electrolyte is highly alkaline, ensures the integral molding or the connection with the current collector, is applicable to a variety of sizes, and has wide material options, thus having an action that can fabricate the optimal reaction space divider depending on the type of the used metal, the type of the electrolyte and the required structure durability. The specific plastic material types that are preferably applied are as described above, but the plastic material type should not be limited to these.

Each of the electrolyte holder portions preferably has a circular cross-sectional shape. For example, the through-holes provided in the reaction space divider in the above example can constitute the electrolyte holder portions. As described above, the "through-hole" here is expressed as a through-hole when the reaction space divider is viewed as a single component, and one side of this through-hole is occluded by the active material portion in the entire metal negative electrode. The reaction space divider in the metal negative electrode of this disclosure is not limited to only the electrolyte holder portion having a through-hole structure cylindrically extracted as illustrated in FIG. 3 and FIG. 4. However, in the cylindrically-extracted electrolyte holder portion as in these drawings, the cross-sectional shape of the electrolyte holder portion is circular to have a better symmetry in all directions of the cross-sectional direction compared to the case in which the cross-sectional surface is oval, triangle or quadrangle, thus having an action that the inhomogeneity of the space distribution of the metallic ions can be most suppressed. If the cross-sectional surface is polygonal and the number of corners is increased, the final shape will be as close to a circle as possible. Thus, the shape of the electrolyte holder portion is not limited to a symmetric shape and may be an asymmetric shape or a polygonal shape. On the other hand, in terms of ensuring the reaction area, it is preferable that each of the above electrolyte holder portion have a square cross-sectional shape or it may have a polygonal cross-sectional shape. Further, the respective cross-sectional shapes may include a mix of circles and polygons. It is considered to be most preferable to maintain the identical magnitude in the identical cross-sectional shape in the direction perpendicular to the cross-sectional surface, but it should not be limited to this.

Next, at least one of the electrolyte holder portions according to one embodiment of this disclosure preferably has a different maximum span length from the other electrolyte holder portions. For example, there is a structure as in FIG. 5 as an example of the reaction space divider having such electrolyte holder portions. In FIG. 5, there are five electrolyte holder portions, and the center electrolyte holder portion surrounded by the four electrolyte holder portions is formed by a through-hole having a circular cross-sectional surface with a diameter smaller than those of the four surrounding electrolyte holder portions. In this way, combination of large and small sizes of the cross-sectional shapes of the electrolyte holder portions can decrease the area other than the electrolyte holder portions in the reaction space divider, resulting in an action that can increase the aperture ratio to increase the area that can be used for the reaction.

In the metal negative electrode according to one embodiment of this disclosure, the electrolyte holder portions preferably have a maximum span length of less than 20 mm, particularly 5 mm or less. The maximum span length of less than 20 mm can more effectively provide the action that homogeneously keeps the two-dimensional and three-dimensional space distribution of the metallic ions in the electrolyte, and the maximum span length of 5 mm or less can more certainly obtain this effect. Here, the maximum span length of the through-hole means the diameter of the above circle when the hole shape is circular and the length of the diagonal of the above square when the hole shape is square.

Next, the secondary battery according to one embodiment of this disclosure is a secondary battery including the metal negative electrode described so far. This secondary battery can be any one of a zinc-air secondary battery, a zinc-nickel secondary battery, a zinc-silver secondary battery, a lithium-air secondary battery, a lithium-sulfur secondary battery, a magnesium-air secondary battery, a sodium-sulfur secondary battery, a potassium secondary battery, a calcium secondary battery and a multivalent-ion secondary battery. As described above, this secondary battery can include the positive electrode and the liquid electrolyte, and an arrangement relation between the metal negative electrode, and the positive electrode and the liquid electrolyte is similar to that in the description using the zinc negative electrode as an example. The secondary battery includes the positive electrode, the metal negative electrode and the liquid electrolyte, and the electrolyte holder portion in the metal negative electrode can hold the liquid electrolyte between the positive electrode and the active material portion.

EXAMPLES

The following will describe this disclosure more specifically using Examples. This disclosure should not be limited to these Examples.

Example 1

Among the metal negative electrodes according to this disclosure, a zinc negative electrode whose metal is zinc was fabricated as follows. First, after the copper plate (the plating portion: 30 mm×40 mm×0.2 mm, the lead portion: 5 mm×50 mm×0.2 mm) illustrated in FIG. 15 was subjected to pretreatment with a polishing paper and by oxalic acid etching, one surface and the side surfaces of the plating portion and both surfaces and the side surfaces of the lead portion were masked by a commercially available masking material for plating. Next, 1.2 mol/L of zinc sulfate 7-hydrate, 0.56 mol/L of sodium sulfate and 0.02 g/L of glue were dissolved in a distilled water, and a zinc plating bath was prepared with pH of 2. This zinc plating bath was put in a beaker, then the above copper plate and a platinum plate (50 mm×50 mm×0.1 mm) to which a platinum wire was attached as a lead were immersed in the zinc plating bath opposed to one another at a distance of about 5 cm, and it was placed on a hot stirrer to reach 40° C. Then, using the copper plate as a cathode and the platinum plate as an anode, a constant current was applied for a certain period of time to electroplate a part that was not masked on the copper plate with zinc. At this time, energization was performed at 150 mA/cm$^2$ for 281 seconds based on the area of the part electroplated with zinc. During energization, it was stirred with a stirring bar. The weight of the copper plate before energization was subtracted from the weight of the copper plate after energization, and this was used as the amount of zinc deposition obtained by electroplating. The ratio of the obtained amount of zinc deposition to the theoretical amount of zinc deposition as determined by Faraday's law was 89.2% as an example, and the thickness was 17.8 μm. The amount of zinc deposition per unit area obtained from the amount of zinc deposition was 12.7 mg/cm$^2$, the capacity per unit area obtained from this was 10.4 mAh/cm$^2$, and thus the capacity was five times or more than the average capacity of 2 mAh/cm$^2$ of the negative electrode in the lithium-ion secondary battery. The capacity here means the amount of electricity obtained from the mass of the reactant by Faraday's law, and in addition to this, the charge capacity and the discharge capacity are also used for the amount of electricity charged and the amount of electricity discharged.

Figure 16:
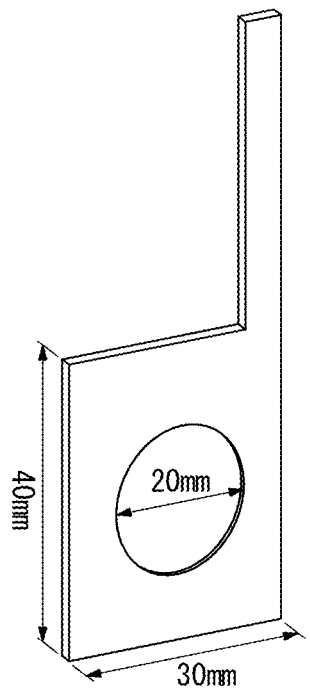
FIG. 16 is a diagram illustrating a shape after masking except for one part zinc-plated in a circular shape with a diameter of 20 mm after zinc-plating the copper-plate current collector illustrated in FIG. 15.
Figure 17:
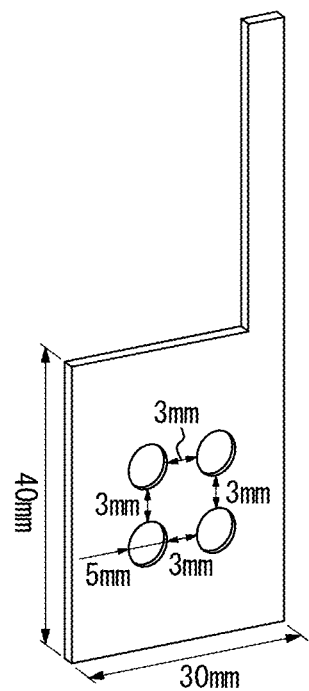
FIG. 17 is a diagram illustrating a shape after masking except for four parts zinc-plated in a circular shape with a diameter of 5 mm following FIG. 16.

On the zinc-plated copper plate obtained by the above, a commercially available masking material for plating was applied to the rest of the plate, leaving a circular part with a diameter of 20 mm from the center of one zinc-plated surface, as illustrated in FIG. 16. Next, as illustrated in FIG. 17, within this circular part with a diameter of 20 mm, four circles with a diameter of 5 mm were taken such that the closest distance between the circular parts at the top and bottom or left and right is 3 mm, and the commercially available masking material was applied to the part other than these circles. Further, by adhering the acrylic-based resin reaction space divider having a plurality of connection passages and opening passages as illustrated in FIG. 4 to the top of this masking material applied surface and by waiting for the masking material to be stuck, the zinc negative electrode according to Example 1, in which the zinc-plated copper plate and the reaction space divider have been integrated, was fabricated. The contour of the exposed portion of the zinc plating matches the cylindrical contour in the reaction space divider. Referring to the signs in FIG. 4, in this reaction space divider 330, a plate with outer shape dimensions of 27 mm, 27 mm and 3 mm is the main body 331, the electrolyte holder portions 332$a$, 332$b$, 332$c$, 332$d$ with a diameter of 5 mm are formed in such a way that the closest distance between the top and bottom or left and right is 3 mm so that they are arranged in correspondence with the zinc exposed parts of the zinc-plated copper plate after the above masking, further, the electrolyte holder portions 332$a$, 332$c$ and the electrolyte holder portions 332$b$, 332$d$ at the top and bottom of the drawing are connected to one another through the connection passages 333$a$, 333$b$ of 2 mm×2 mm, the electrolyte holder portions 332$a$, 332$b$ on the upper side of FIG. 4 have the opening passages 334$a$, 334$b$ of 2 mm×2 mm, respectively, formed up to the edge of the resin plate toward the opposite side of the lower electrolyte holder portions 332$c$, 332$d$, and the lower electrolyte holder portions 332$c$, 332$d$ have the opening passages 334$c$, 334$d$ of 2 mm×2 mm, respectively, formed up to the edge of the resin plate toward the opposite side of the upper electrolyte holder portions 332$a$, 332$b$.

Figure 18:
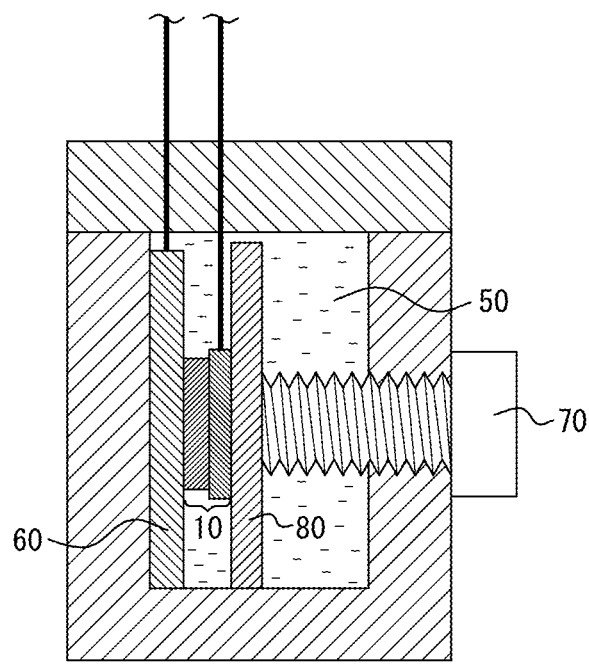
FIG. 18 is a configuration diagram of a cell of a zinc-nickel secondary battery used in Example 1.

For convenience in explaining the arrangement relation, a schematic diagram in FIG. 18 will be referred. A zinc negative electrode 10 according to Example 1, which was fabricated as described above, and a pre-charged nickel positive electrode 60 (about 50 mm square with a thickness of 5 mm) were arranged opposite to one another within an acrylic container, and a resin plate (resin spacer) 80 was abutted on a back side of the zinc negative electrode 10 and screwed with a screw 70 so that the reaction space divider of the zinc negative electrode 10 according to Example 1 and the nickel positive electrode 60 are in close contact with one another. The used nickel positive electrode 60 is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, a liquid electrolyte 50 consisting of 6 mol/L of aqueous potassium hydroxide solution saturated with zinc oxide was added to the acrylic container to fabricate the zinc-nickel secondary battery.

<Evaluation>

The zinc-nickel secondary battery fabricated as described above was charged and discharged at a constant current. The flowing current was set to have a current density of 10 mA/cm$^2$ based on the area of the (four) circles with a diameter of 5 mm where the electroplated zinc was exposed in the zinc negative electrode. The battery was first discharged at the above current density until the SOC reached 50% (charged to 50% of the fully charged state), and then the current was stopped for one minute (pause). Next, the battery was charged at the current density identical to that in the discharge until the SOC reached 80%, and then the current was stopped for one minute. After this, if the SOC reached 50% during discharging, or if the battery voltage during discharging suddenly decreased to be a predetermined voltage or less before the SOC reached 50%, it was determined that the reaction on the zinc negative electrode was no longer only a reaction from zinc to zinc oxide, and the discharge was stopped. This voltage was set at 1.6 V in Example 1. The charge was performed until the SOC reached 80% or the battery voltage during charging exceeded 3 V. A pause of one minute or more was always made between the discharge and the charge, or between the charge and the discharge. As described above, the capacity of the electroplated zinc is 10.4 mAh/cm$^2$, but under this test condition, the charge and discharge are performed at 10 mA/cm$^2$ with respect to about 3.1 mAh/cm$^2$ which is 30% of capacity while the SOC varies from 80% to 50%, thus being 3.2 C in the C-rate used to represent the charge and discharge speed of the battery, which is an extremely fast charge and discharge rate as for the speed when using batteries.

Figure 19:
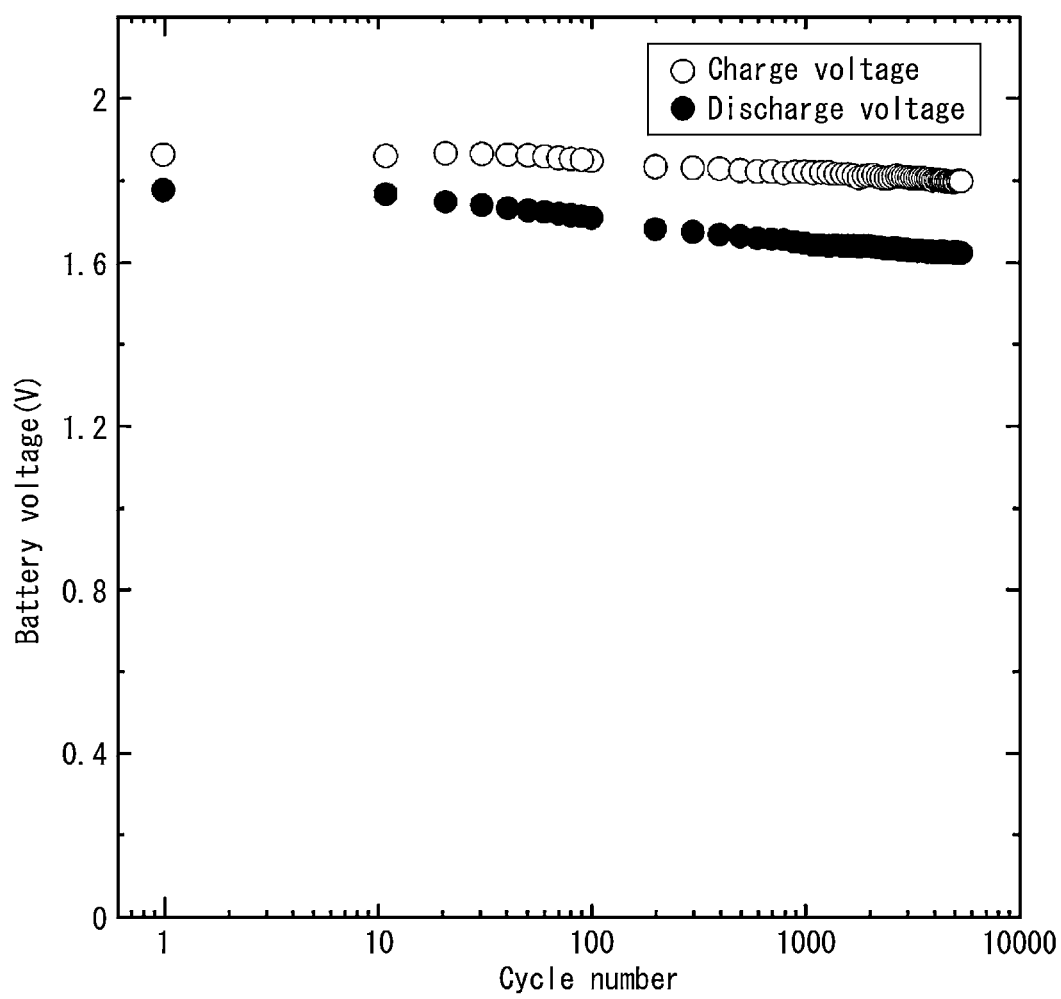
FIG. 19 is a diagram illustrating relation between discharge and charge voltages and a cycle number of the zinc-nickel secondary battery in Example 1.
Figure 20:
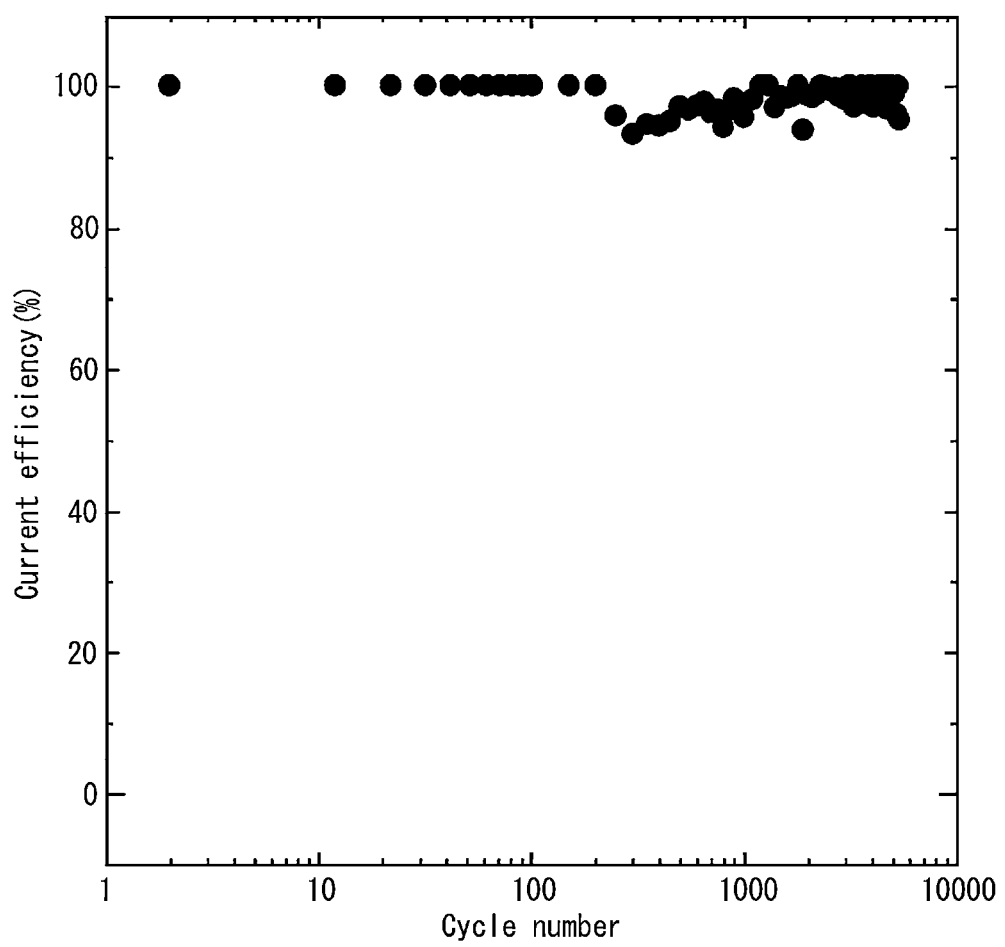
FIG. 20 is a diagram illustrating relation between a current efficiency and the cycle number of the zinc-nickel secondary battery in Example 1.

FIG. 19 and FIG. 20 illustrate respective relations of an average discharge voltage, an average charge voltage and a current efficiency to a charge and discharge cycle number obtained in Example 1. The current efficiency is a ratio of the amount of electricity that can be discharged during the discharge immediately after the charge to the amount of electricity charged in the battery for the second and subsequent cycles, and if these are identical, the current efficiency will be 100%. That is, it means how much electricity could be discharged in the next discharge with respect to the amount of electricity charged.

As illustrated in FIG. 19 and FIG. 20, it was found that, in the zinc-nickel secondary battery using the zinc negative electrode in Example 1, for more than 5500 charge and discharge cycles for which data was obtained, the average charge voltage and the average discharge voltage are both slightly lower than the initial voltages, but there was no rapid decrease in discharge voltage or increase in charge voltage indicating a dendrite short circuit, and the charge and discharge can be stably performed for 5500 cycles or more. It was also found that there was almost no change in current efficiency, and even under the fast-operating condition with a charge and discharge rate of 1 C or more, there was no decrease in capacity due to the active material inhomogeneity and the dendrite short circuit, and the battery capacity can be maintained at a high current efficiency of over 90% for 5500 cycles or more.

Comparative Example 1

Figure 21:
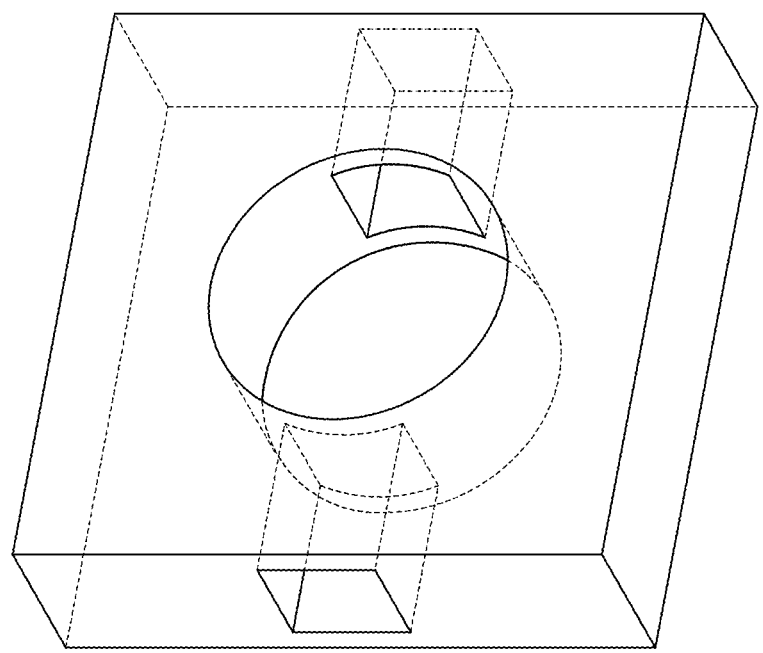
FIG. 21 is a shape diagram of a separator used for a zinc-nickel secondary battery in Comparative Example 1.

On the zinc-plated copper plate obtained by the method and the condition identical to those in Example 1, the commercially available masking material was applied to the rest of the plate, leaving a circle with a diameter of 20 mm from the center of one zinc-plated surface as illustrated in FIG. 16. Next, on the top of this masking material applied surface, the separator illustrated in FIG. 21 was adhered, then waiting for the masking material to be solidified. This separator is made of the acrylic-based resin identical to that in Example 1, has a plate shape with outer shape dimensions of 27 mm, 27 mm and 3 mm, and has a through-hole with a diameter of 20 mm in the center part and further has two holes of 2 mm×2 mm leading from that hole to the edge of the resin plate. When adhering this separator to the zinc-plated copper plate, the contour of the through-hole with a diameter of 20 mm is configured to match the contour of the zinc-plating exposed portion.

Figure 22:
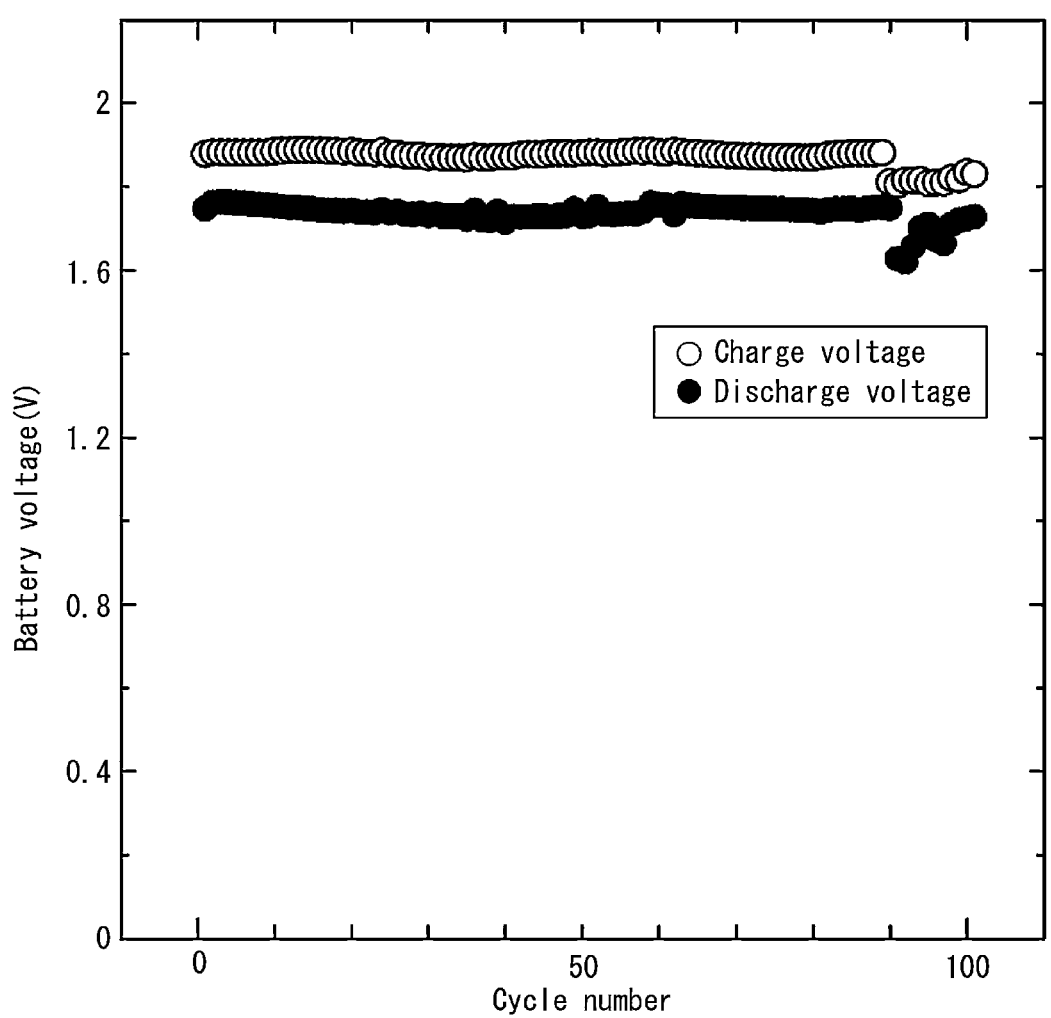
FIG. 22 is a diagram illustrating relation between discharge and charge voltages and a cycle number of the zinc-nickel secondary battery in Comparative Example 1.
Figure 23:
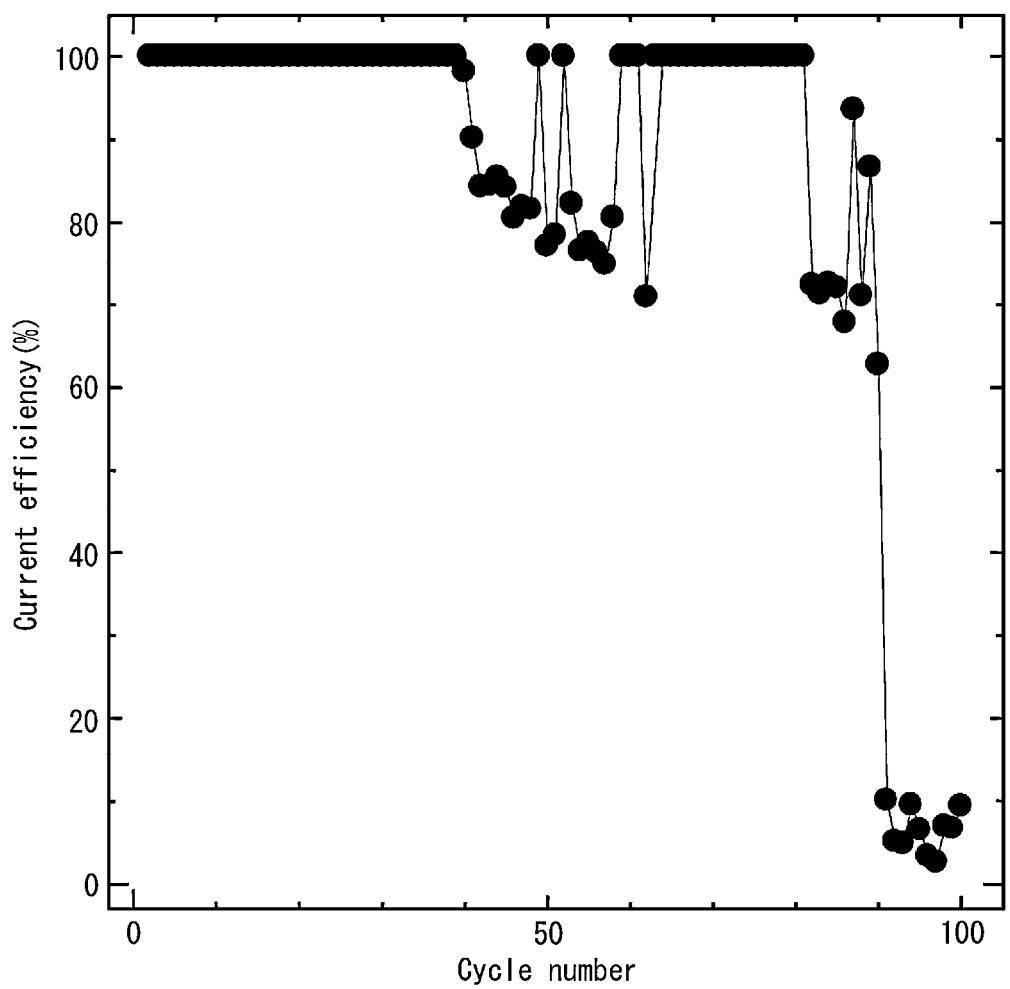
FIG. 23 is a diagram illustrating relation between a current efficiency and the cycle number of the zinc-nickel secondary battery in Comparative Example 1.

A zinc-nickel secondary battery was fabricated similarly to Example 1, except that instead of the zinc negative electrode in Example 1, a zinc-plated copper plate to which the separator illustrated above is adhered was used as the negative electrode, and a charge and discharge cycle test was performed under the identical condition to that in Example 1, except that the voltage limiting the discharge was changed from 1.6 V to 1.5 V. As a result, as illustrated in FIG. 22, large oscillations were observed in the discharge voltage and the charge voltage after about 90 cycles. In addition, as in FIG. 23, a large decrease in current efficiency was once observed after 40 cycles, and the current efficiency significantly decreased again after 90 cycles, when the charge and discharge voltage oscillation occurred. After that, the discharge was no longer possible and the current efficiency became almost zero, so the charge and discharge test was stopped.

Comparative Example 2

On the zinc-plated copper plate obtained by the method and the condition identical to those in Example 1, the commercially available masking material was applied to the rest of the plate, leaving a circle with a diameter of 20 mm from the center of one zinc-plated surface as illustrated in FIG. 16. In Comparative Example 2, unlike both Example 1 and Comparative Example 1, a nonwoven fabric using a polyolefin-based material used in the nickel-metal hydride secondary battery was used as the separator. A zinc-nickel secondary battery according to Comparative Example 2 was fabricated by arranging the above nonwoven fabric separator between the zinc-plated copper plate electrode, which was masked as described above, and a nickel positive electrode similar to that used in Example 1 in an acrylic container similar to that used in Example 1.

Figure 24:
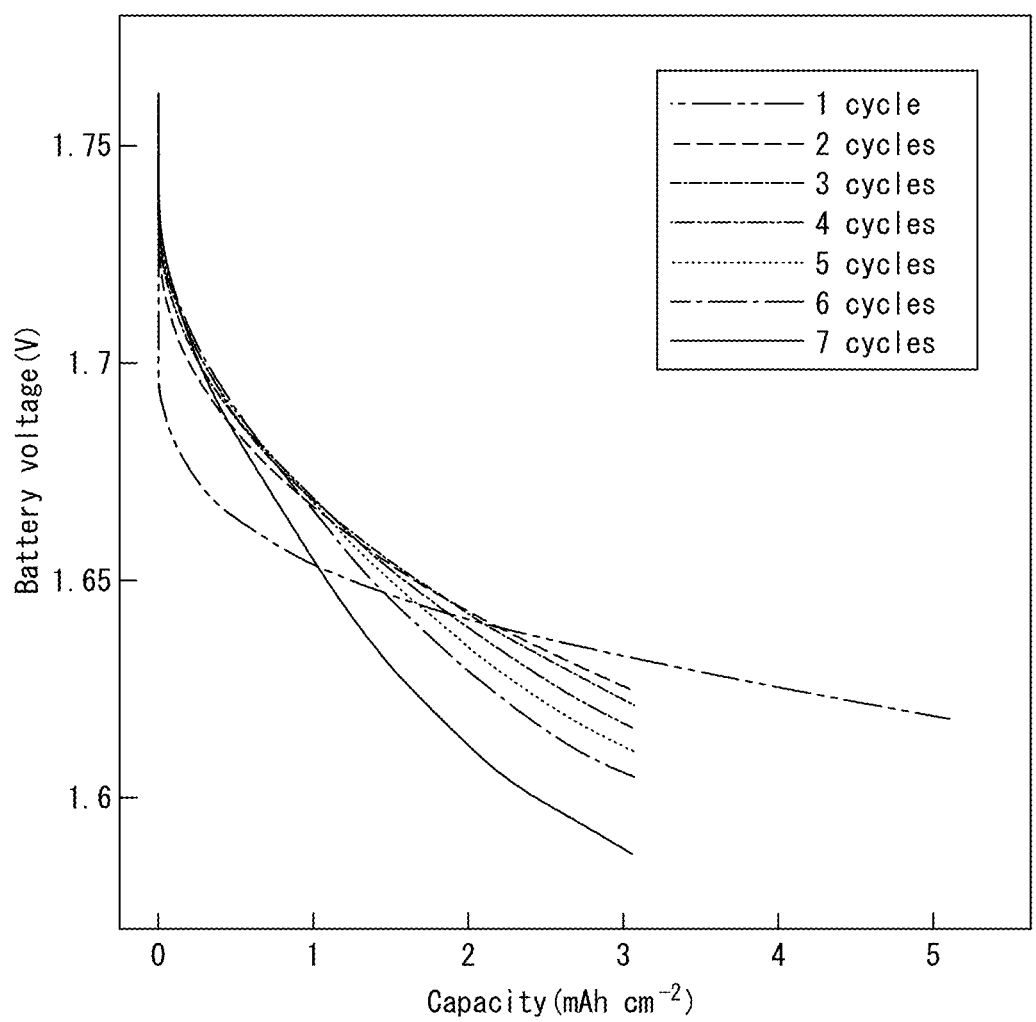
FIG. 24 is a diagram illustrating relation between a discharge curve and a cycle number of a zinc-nickel secondary battery in Comparative Example 2.
Figure 25:
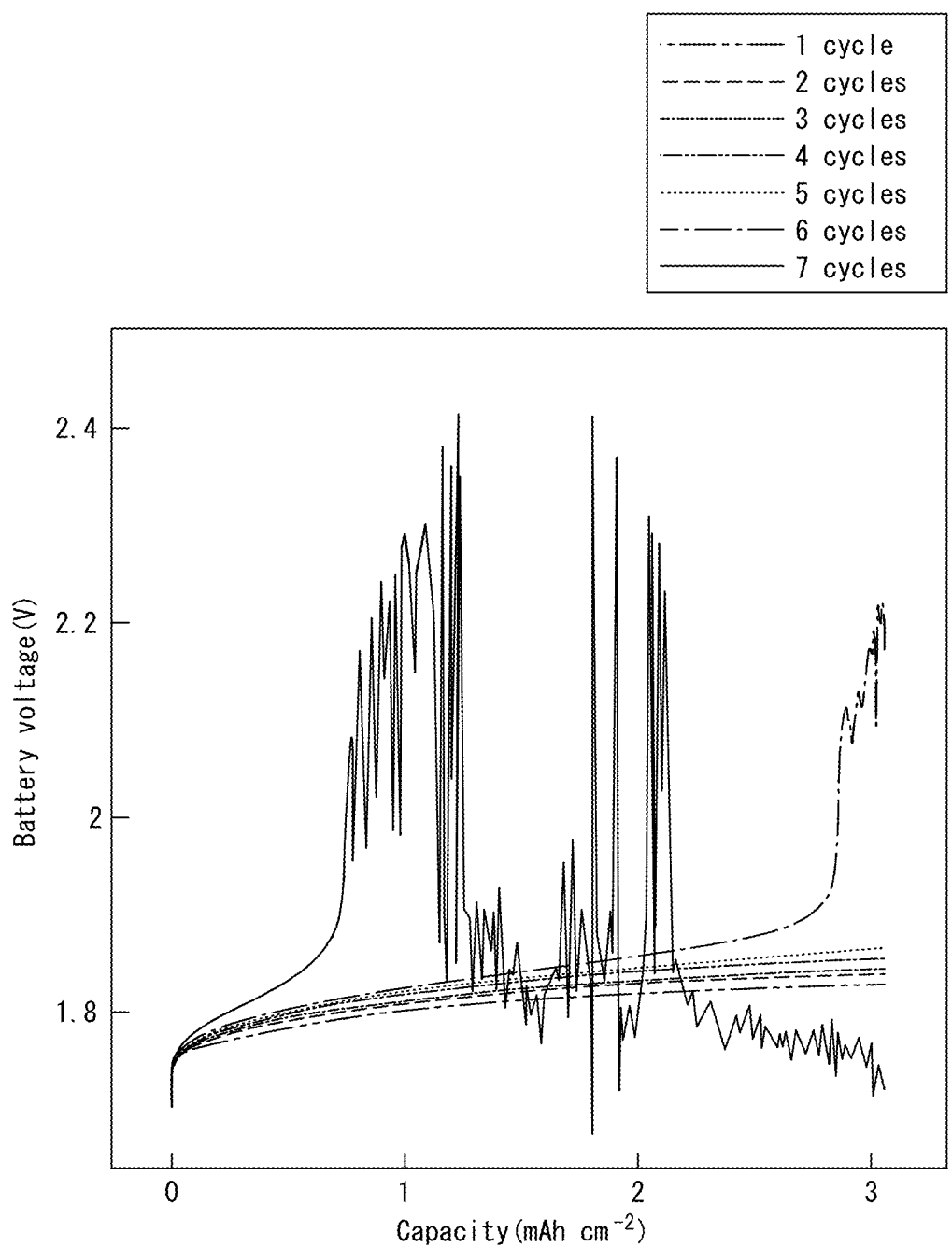
FIG. 25 is a diagram illustrating relation between a charge curve and the cycle number of the zinc-nickel secondary battery in Comparative Example 2.
Figure 26:
FIG. 26 is a photograph on a negative electrode side of a nonwoven fabric taken out after completing a charge and discharge test of the zinc-nickel secondary battery in Comparative Example 2.
Figure 27:
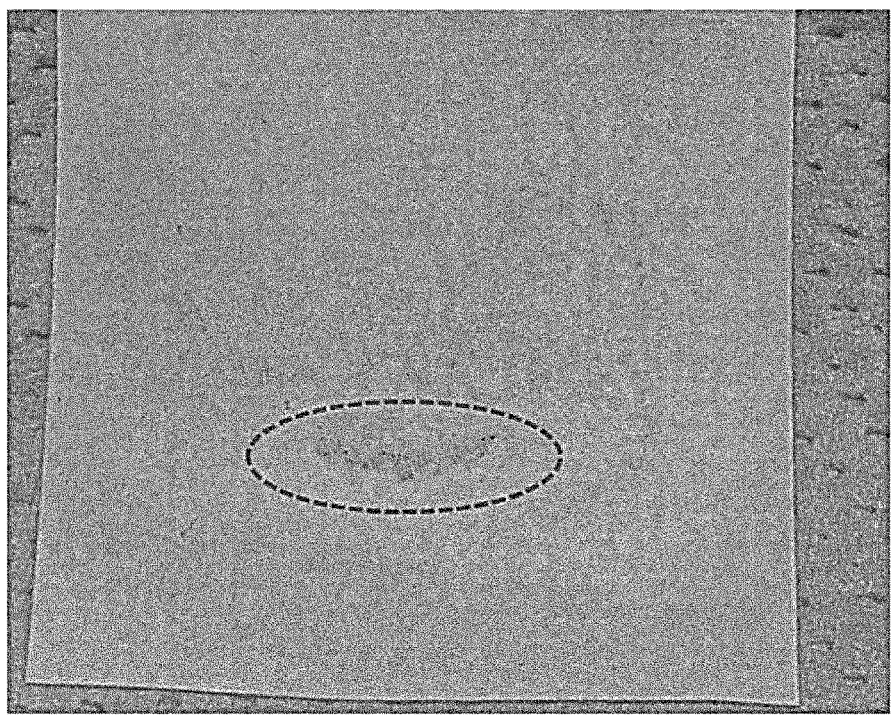
FIG. 27 is a photograph on a positive electrode side of a nonwoven fabric taken out after completing a charge and discharge curve of the zinc-nickel secondary battery in Comparative Example 2.

The zinc-nickel secondary battery in Comparative Example 2 was subjected to the charge and discharge cycle test in the same way as in Comparative Example 1, but the pause time was changed from 1 minute to 10 minutes. In the charge and discharge cycle test, if there is no pause time between the charge and the discharge or between the discharge and the charge, or if the pause time is shortened, a rapid change in state occurs on the electrode surface, making the test condition severe. However, as described above, changing the pause time from 1 minute to 10 minutes has no effect on the cycle characteristics. In Comparative Example 2, the charge and discharge were no longer possible after 7 cycles, so the discharge curve up to that point was illustrated in FIG. 24, and the charge curve up to that point was illustrated in FIG. 25. The cycle number was illustrated in FIG. 24, and the relation of lines such as the dashed line and the dotted line indicating the cycle number are common to FIG. 25. As illustrated in FIG. 24, the discharge was possible up to the seventh cycle, but as illustrated in FIG. 25, the voltage greatly oscillated during the subsequent seventh cycle of charging, and in the middle of the oscillation, the voltage reached 1.7 V or less, which was lower than the electromotive force, indicating that an internal short-circuit was occurring. In the subsequent eighth cycle, the discharge voltage reached the lower limit immediately after the start of energization, and the charge and discharge test was stopped because the discharge was not possible. After the test was stopped, the battery was dismantled, the nonwoven fabric was taken out and cleaned, the respective negative electrode and positive electrode sides were observed, and a photograph of the negative electrode side was illustrated in FIG. 26 and a photograph of the positive electrode side was illustrated in FIG. 27. The nonwoven fabric is the white (light-colored) part in this drawing, and the one viewed in part of it (part surrounded by the dashed line) is zinc. From these drawings, it was found that the zinc penetrated the nonwoven fabric from the negative electrode side to the positive electrode side. Accordingly, it was found that the charge and discharge were no longer possible due to the internal short-circuit caused by dendrite growth of zinc. The voltage changes as above were observed for a few cycles in a plurality of zinc-nickel secondary batteries using the nonwoven fabric identical to that in Comparative Example 2 as the separator, thus any charge and discharge test was stopped.

Figure 28:
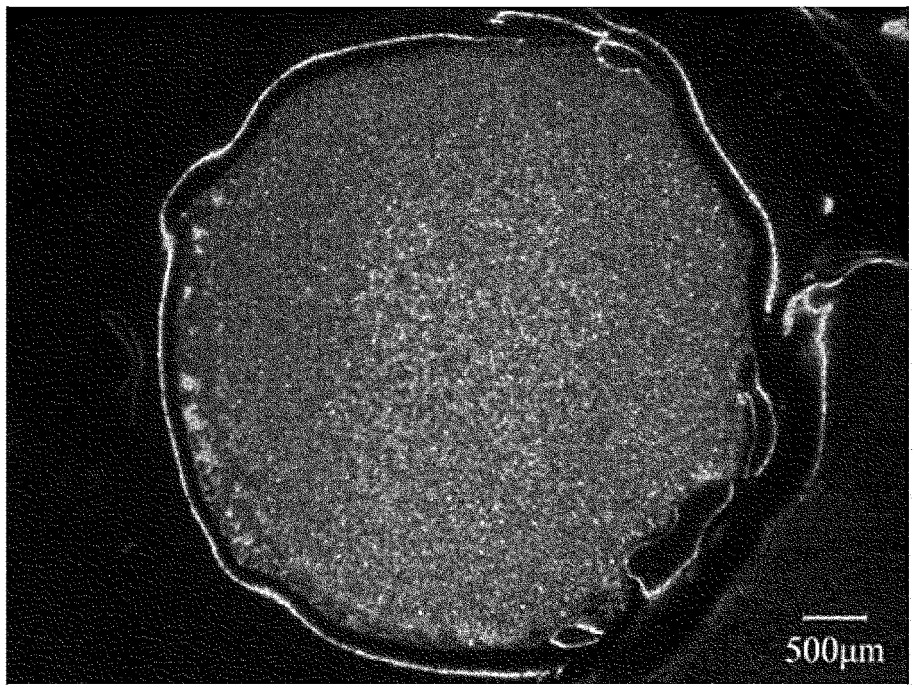
FIG. 28 is a photograph of a negative electrode surface after 30 cycles of charging and discharging under the identical condition to that in Example 1.
Figure 29:
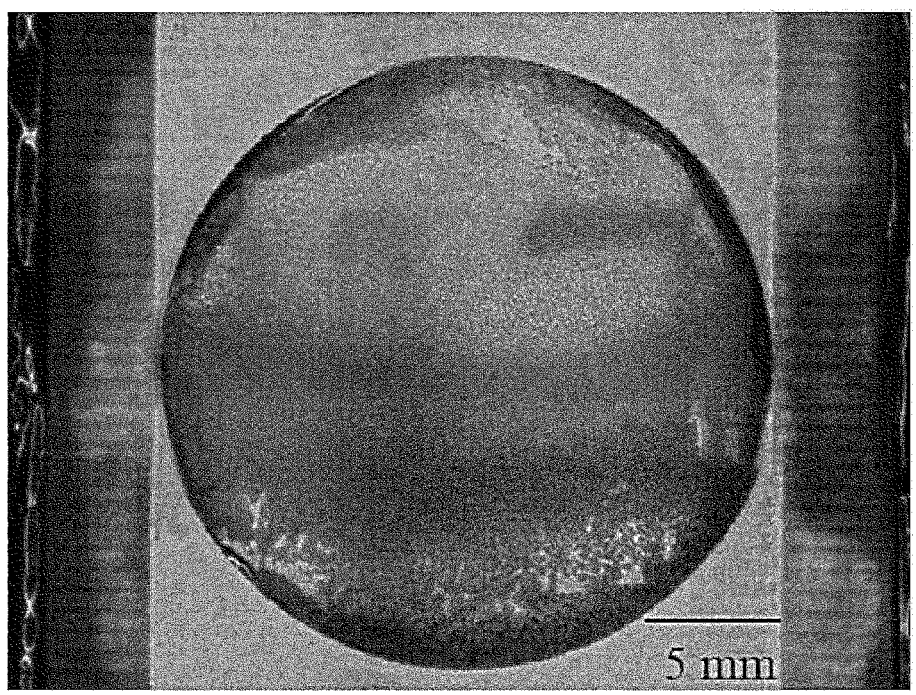
FIG. 29 is a photograph of a negative electrode surface after 30 cycles of charging and discharging under the identical condition to that in Comparative Example 1.
Figure 30:
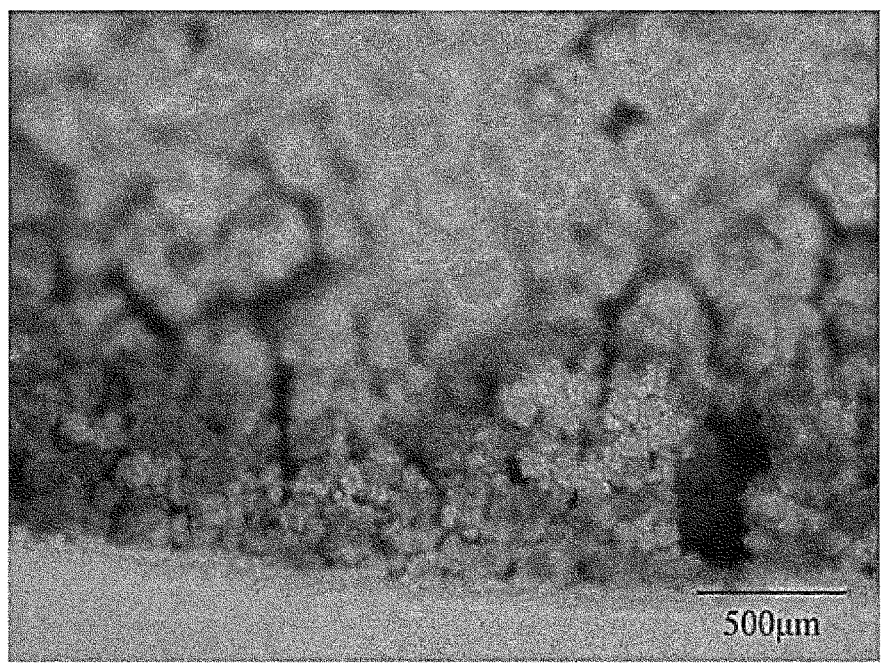
FIG. 30 is a photograph of a lower part of the negative electrode surface after 30 cycles of charging and discharging under the identical condition to that in Comparative Example 1.
Figure 31:
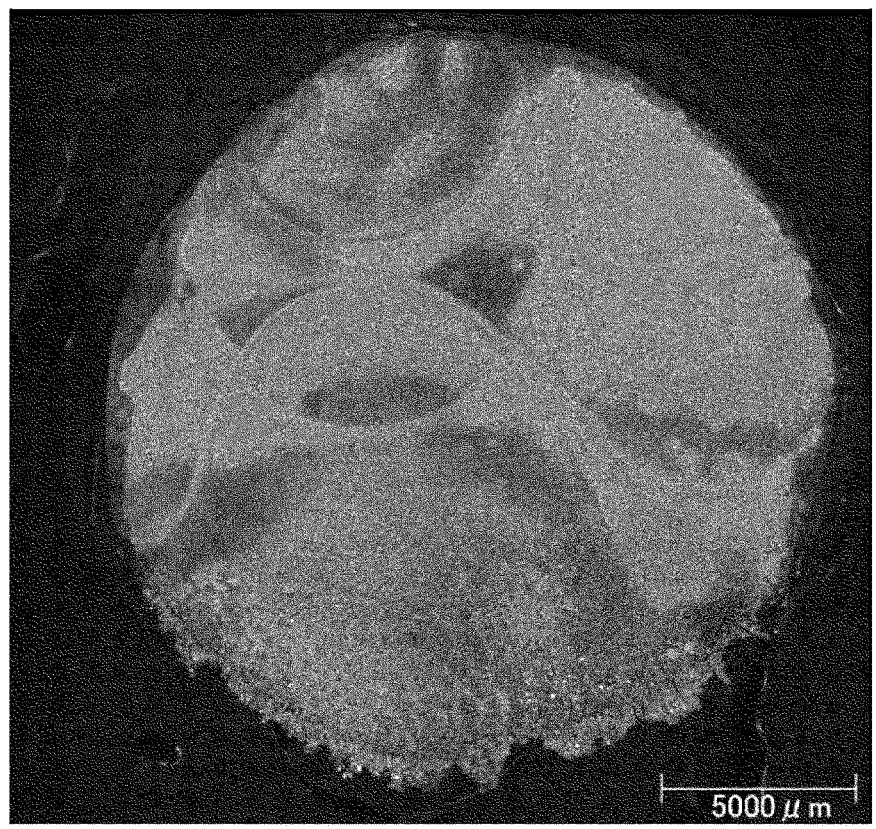
FIG. 31 is a photograph of a negative electrode surface after completing the charge and discharge test in Comparative Example 2.

Here, FIG. 28 illustrates a photograph of the negative electrode surface after 30 cycles of the charge and discharge under the identical condition to that in Example 1, FIG. 29 and FIG. 30 illustrate photographs of the negative electrode surface after 30 cycles of the charge and discharge under the identical condition to that in Comparative Example 1, and FIG. 31 illustrates a photograph of the negative electrode surface after completing the charge and discharge test in Comparative Example 2.

The surface form in FIG. 28, obtained from the experiment under the identical condition to that in Example 1, was almost the same as before the charge and discharge test, and the form was not inhomogeneous over the entire reaction surface. The surface form in FIG. 29, obtained from the experiment under the identical condition to that in Comparative Example 1, was clearly inhomogeneous and distinctly different from that in FIG. 28. As illustrated in FIG. 30, there was zinc that was considered to have fallen at the bottom of the reaction surface in FIG. 29. The surface form in FIG. 31, obtained from the experiment in Comparative Example 2, was even more inhomogeneous than that in FIG. 29, and as described above, the one that was considered as zinc dendrite penetrating the nonwoven fabric was observed at the bottom. As described above, it was found that the charge and discharge cycle characteristics were significantly improved in Example 1 compared to Comparative Example 1 and Comparative Example 2 due to the suppression of the dendrite short circuit and the active material inhomogeneity.

Example 2

Figure 32:
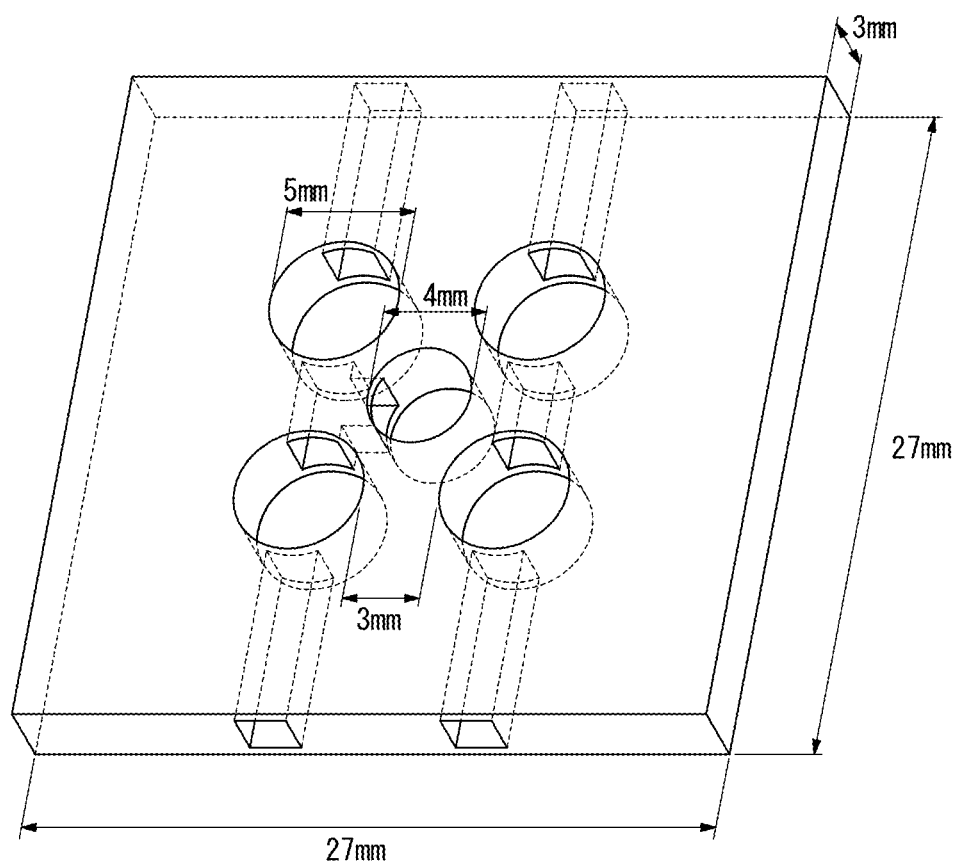
FIG. 32 is a shape diagram of a reaction space divider used for a zinc negative electrode in Example 2.

Among the metal negative electrodes of this disclosure, a zinc negative electrode, in which the metal of the active material portion is zinc, was fabricated as follows. First, the copper plate illustrated in FIG. 15 was electroplated in the method and the condition identical to those in Example 1, and the commercially available masking material was applied to the rest of the plate, leaving a circle with a diameter of 20 mm from the center of one zinc-plated surface as illustrated in FIG. 16. Next, within this circle with a diameter of 20 mm, the commercially available masking material was applied except for the parts corresponding to the electrolyte holder portions in the reaction space divider having a structure illustrated in FIG. 32, that is, four circles with a diameter of 5 mm and one circle with a diameter of 4 mm arranged in the center of these circles. Further, by adhering the acrylic-based resin reaction space divider having a plurality of connection passages and opening passages as illustrated in FIG. 32 to the top of this masking material applied surface and by waiting for the masking material to be stuck, the zinc negative electrode of this disclosure, in which the zinc-plated copper plate and the reaction space divider have been integrated, was fabricated. In this reaction space divider, four electrolyte holder portions with a diameter of 5 mm are formed on the plate with the outer shape dimensions of 27 mm, 27 mm and 3 mm such that the closest distance between the top and bottom or left and right is 3 mm, and an electrolyte holder portion with a diameter of 4 mm is formed in the center of these electrolyte holder portions. The electrolyte holder portion with a diameter of 4 mm located in the center has a connection passage that connects to the two electrolyte holder portions on the left side of FIG. 32. The reaction space divider in Example 2 can be equivalent to the reaction space divider 430 illustrated in FIG. 5, with additional connection passages and opening passages.

The zinc negative electrode of this disclosure, which was fabricated as described above, and a pre-charged nickel positive electrode (about 50 mm square with a thickness of 5 mm) were arranged opposite to one another within an acrylic container similarly to Example 1, and a resin plate was abutted on a back side of the zinc negative electrode and screwed with a screw so that the reaction space divider of the zinc negative electrode of this disclosure and the nickel positive electrode are in close contact with one another. The used nickel positive electrode is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, 6 mol/L of aqueous potassium hydroxide solution saturated with zinc oxide was added to the acrylic container to fabricate the zinc-nickel secondary battery, and the charge and discharge cycle test was performed under the identical condition to that in Example 2.

Figure 33:
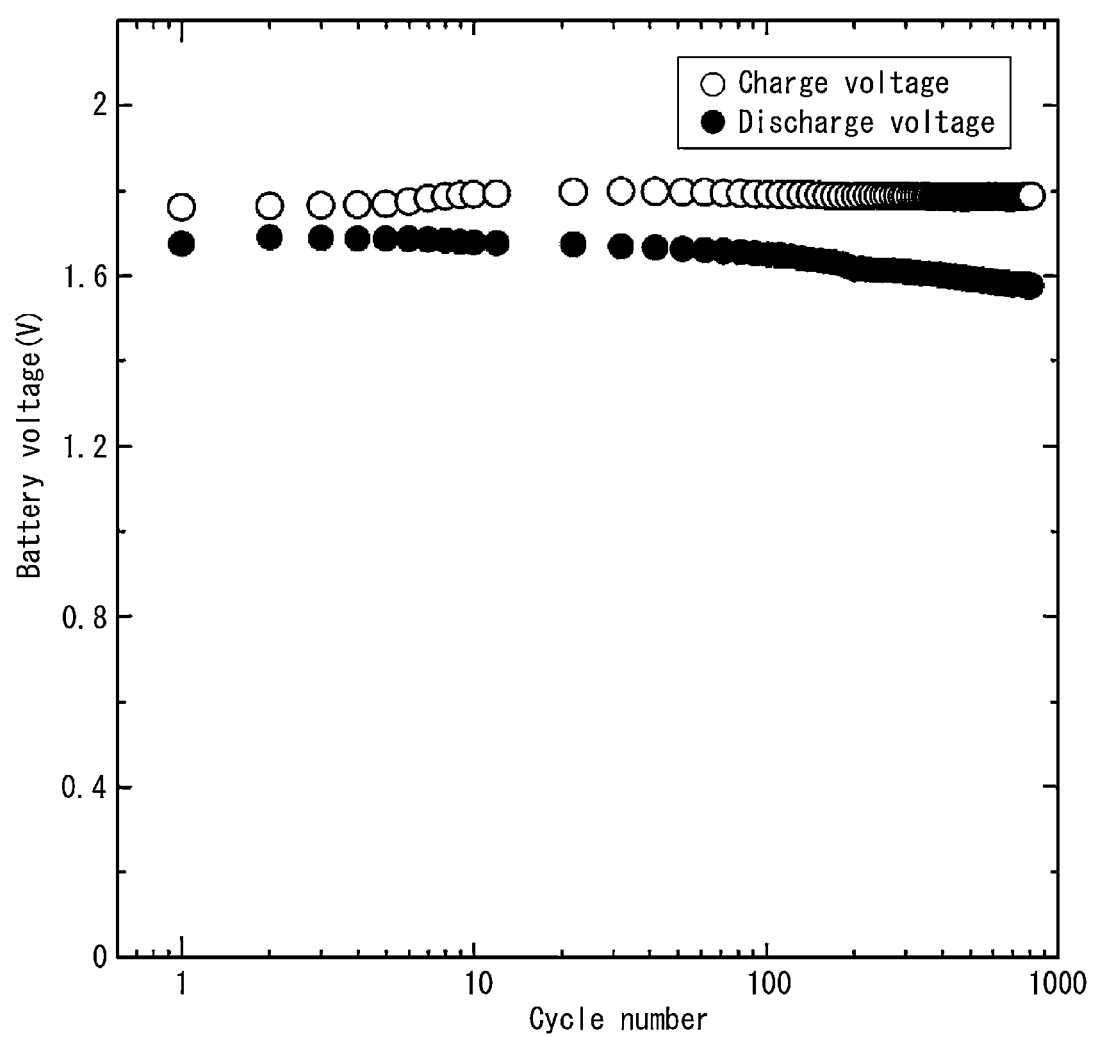
FIG. 33 is a diagram illustrating relation between discharge and charge voltages and a cycle number of a zinc-nickel secondary battery in Example 2.
Figure 34:
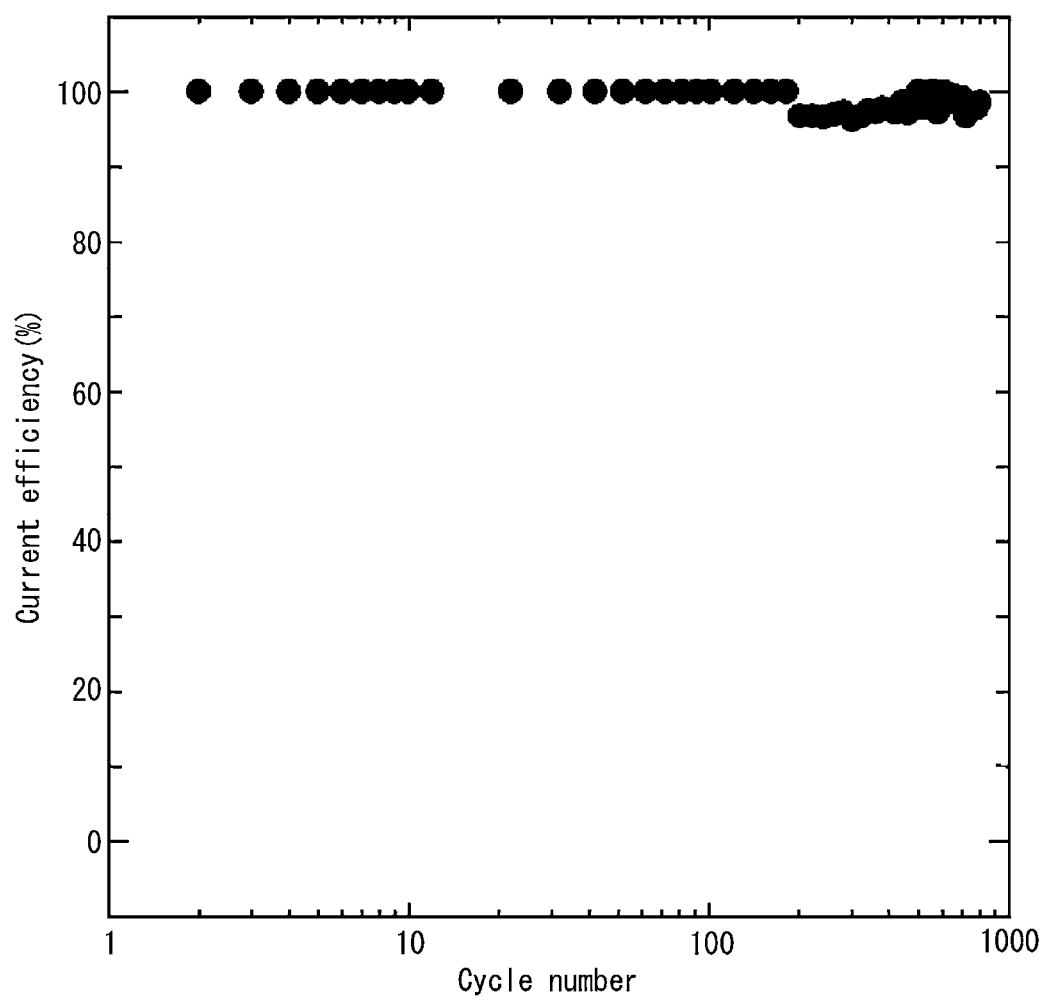
FIG. 34 is a diagram illustrating relation between a current efficiency and the cycle number of the zinc-nickel secondary battery in Example 2.

FIG. 33 and FIG. 34 illustrate respective relations of an average discharge voltage, an average charge voltage and a current efficiency to a charge and discharge cycle number obtained in Example 2. The definition and meaning of the current efficiency are identical to those described in Example 1. As illustrated in FIG. 33 and FIG. 34, it was found that, in the zinc-nickel secondary battery using the zinc negative electrode in Example 2, in the 780th cycle in the middle of the data acquisition, the average charge voltage was almost identical to the initial voltage, and the average discharge voltage was only slightly lower than the initial voltage, with no rapid decrease in discharge voltage or increase in charge voltage indicating a dendrite short circuit, and the charge and discharge can be stably performed for 780 cycles or more. It was also found that there was almost no change in current efficiency, and even under the fast-operating condition with a charge and discharge rate of 1 C or more, there was no decrease in capacity due to the active material inhomogeneity and the dendrite short circuit, and the battery capacity can be maintained at a high current efficiency. The result in Example 2 indicates merely the result in the middle of the data acquisition, and it does not indicate that the charge and discharge became impossible after 780 cycles.

Example 3

Among the metal negative electrodes according to this disclosure, a zinc negative electrode, in which the metal of the active material portion is zinc, was fabricated as follows. First, the copper plate illustrated in FIG. 15 was electroplated in the method and the condition identical to those in Example 1, and the commercially available masking material was applied to the rest of the plate, leaving a circular part with a diameter of 20 mm from the center of one zinc-plated surface as illustrated in FIG. 16. Next, referring to the signs in FIG. 6, within this circular part with a diameter of 20 mm, the commercially available masking material was applied except for the parts corresponding to the electrolyte holder portions 532a, 532b, 532c, 532d in the reaction space divider 530 having a structure illustrated in FIG. 6, that is, four squares of 4.43 mm square. Further, by adhering the acrylic-based resin reaction space divider 530 having a plurality of connection passages 533a, 533b and opening passages 534a, 534b, 534c, 534d illustrated in FIG. 6 to the top of this masking material applied surface and by waiting for the masking material to be stuck, the zinc negative electrode of this disclosure, in which the zinc-plated copper plate and the reaction space divider 530 have been integrated, was fabricated. In this reaction space divider 530, four square electrolyte holder portions 532a, 532b, 532c, 532d of 4.43 mm are formed on the plate with the outer shape dimensions of 27 mm, 27 mm and 3 mm, and the electrolyte holder portions 532a, 532b, 532c, 532d are formed such that the closest distance between the top and bottom or left and right is 3 mm. Further, the electrolyte holder portions 532a, 532c and 532b, 532d at the top and bottom in FIG. 6 are connected to one another through the connection passages 533a, 533b of 2 mm×2 mm, the upper electrolyte holder portions 532a, 532b in the drawing have the opening passages 534a, 534b of 2 mm×2 mm, respectively, formed up to the edge of the main body 531 of the reaction space divider 530 toward the opposite side of the lower electrolyte holder portions 532c, 532d, and the lower electrolyte holder portions 532c, 532d have the opening passages 534c, 534d of 2 mm×2 mm, respectively, formed up to the edge of the main body 531 of the reaction space divider 530 toward the opposite side of the upper electrolyte holder portions 532a, 532b. The reaction space divider 530 in Example 3 was configured so that the total opening area of its electrolyte holder portions was identical to that in Example 1.

The zinc negative electrode according to Example 3, which was fabricated as described above, and a pre-charged nickel positive electrode (about 50 mm square with a thickness of 5 mm) were arranged opposite to one another within an acrylic container similarly to Example 1, and a resin plate was abutted on a back side of the zinc negative electrode and screwed with a screw so that the reaction space divider of the zinc negative electrode according to Example 3 and the nickel positive electrode are in close contact with one another. The used nickel positive electrode is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, 6 mol/L of aqueous potassium hydroxide solution saturated with zinc oxide was added to the acrylic container to fabricate the zinc-nickel secondary battery, and the charge and discharge cycle test was performed under the identical condition to that in Example 2.

Figure 35:
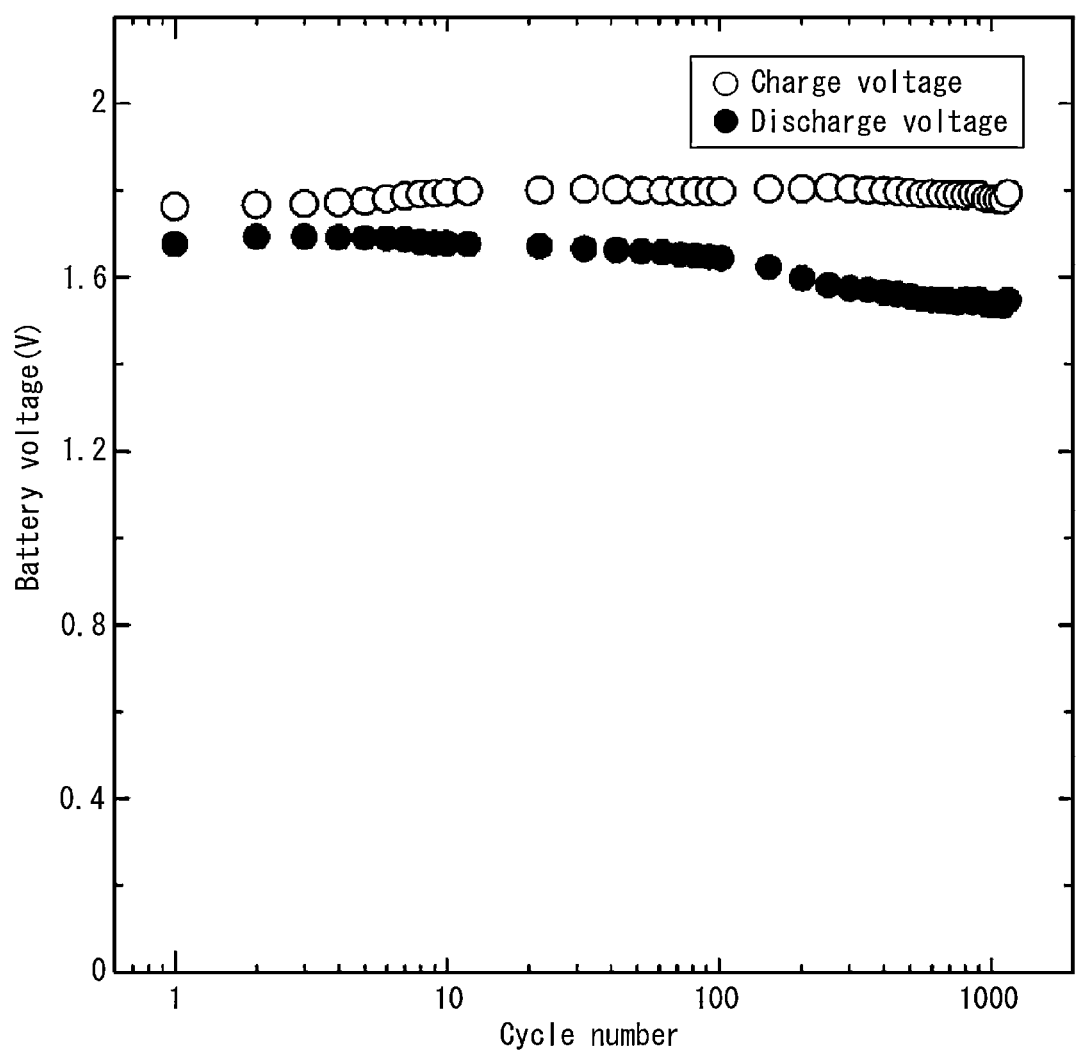
FIG. 35 is a diagram illustrating relation between discharge and charge voltages and a cycle number of a zinc-nickel secondary battery in Example 3.
Figure 36:
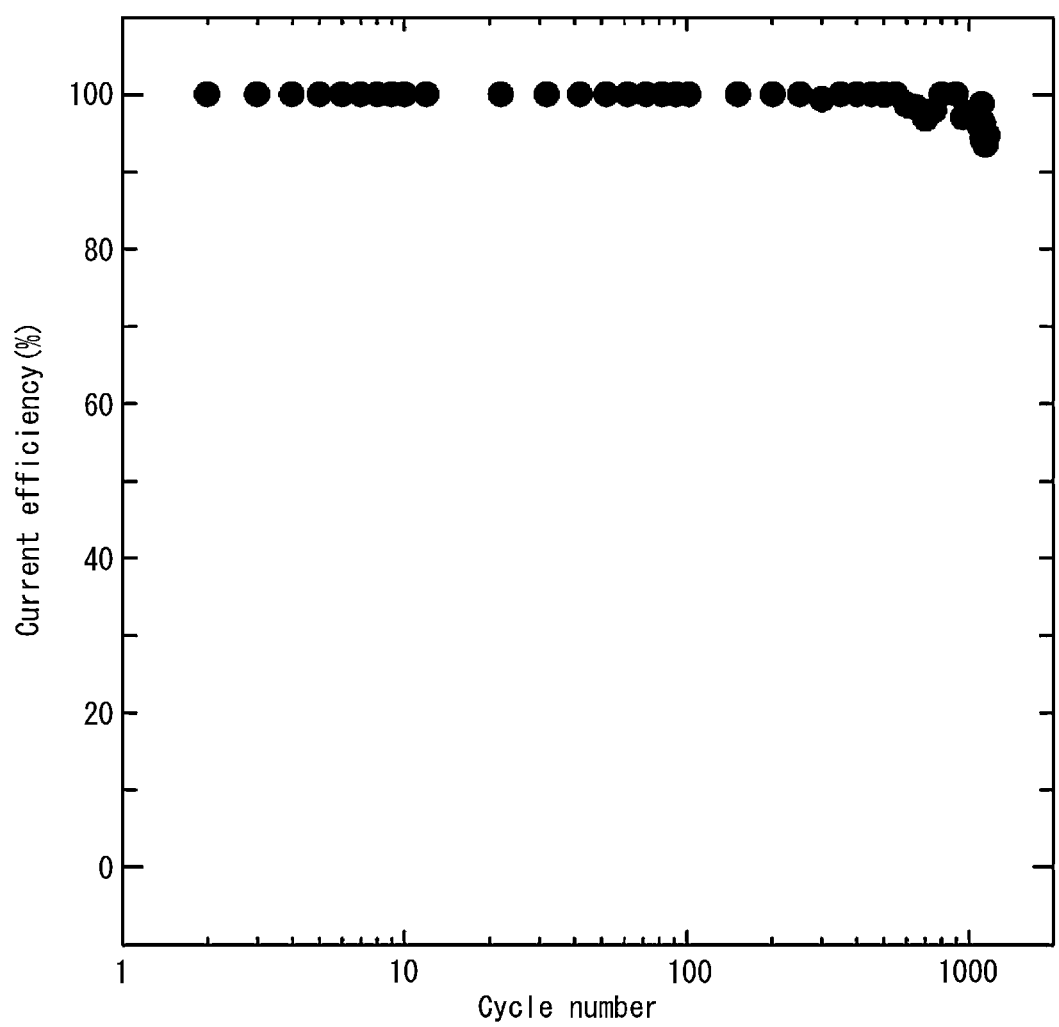
FIG. 36 is a diagram illustrating relation between a current efficiency and the cycle number of the zinc-nickel secondary battery in Example 3.

FIG. 35 and FIG. 36 illustrate respective relations of an average discharge voltage, an average charge voltage and a current efficiency to a charge and discharge cycle number obtained in Example 3. The definition and meaning of the current efficiency are identical to those described in Example 1. As illustrated in FIG. 35 and FIG. 36, it was found that, in the zinc-nickel secondary battery using the zinc negative electrode in Example 3, in the 1130th cycle in the middle of the data acquisition, the average charge voltage was almost identical to the initial voltage, and the average discharge voltage was only slightly lower than the initial voltage, with no rapid decrease in discharge voltage or increase in charge voltage indicating a dendrite short circuit, and the charge and discharge can be stably performed for 1130 cycles or more. It was also found that there was almost no change in current efficiency, and even under the fast-operating condition with a charge and discharge rate of 1 C or more, there was no decrease in capacity due to the active material inhomogeneity and the dendrite short circuit, and the battery capacity can be maintained at a high current efficiency. The result in Example 3 indicates merely the result in the middle of the data acquisition, and it does not indicate that the charge and discharge became impossible after 1130 cycles.

Example 4

In Example 4, a zinc negative electrode was fabricated in the identical longitudinally mounted cell to that in Example 1, with the identical reaction space divider design, but the thickness of the reaction space divider was changed from 3 mm in Example 1 to 2 mm in Example 4. Further, the amount of plating was increased to three times that of Example 1. Specifically, a zinc-nickel secondary battery was fabricated as follows.

Figure 15:
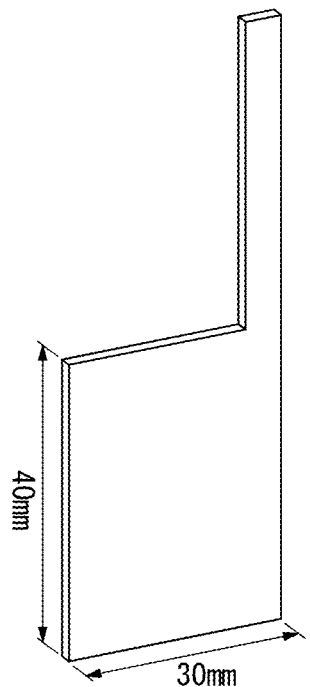
FIG. 15 is a diagram illustrating a shape of a copper plate used for a current collector of the zinc negative electrode in Example.

After the copper plate (the plating portion: 30 mm×40 mm×0.2 mm, the lead portion: 5 mm×50 mm×0.2 mm) illustrated in FIG. 15 was subjected to pretreatment with a polishing paper and by oxalic acid etching, one surface and the side surfaces of the plating portion and both surfaces and the side surfaces of the lead portion were masked by a commercially available masking material for plating. Next, 1.2 mol/L of zinc sulfate 7-hydrate, 0.56 mol/L of sodium sulfate and 0.02 g/L of glue were dissolved in a distilled water, and a zinc plating bath was prepared with pH of 2. This zinc plating bath was put in a beaker, then the above copper plate and a platinum plate (50 mm×50 mm×0.1 mm) to which a platinum wire was attached as a lead were immersed in the zinc plating bath opposed to one another at a distance of about 5 cm, and it was placed on a hot stirrer to reach 40° C. Then, using the copper plate as a cathode and the platinum plate as an anode, a constant current was applied for a certain period of time to electroplate a part that was not masked on the copper plate with zinc. At this time, energization was performed at 150 mA/cm$^2$ for 843 seconds based on the area of the part electroplated with zinc. During energization, it was stirred with a stirring bar. The weight of the copper plate before energization was subtracted from the weight of the copper plate after energization, and this was used as the amount of zinc deposition obtained by electroplating. The ratio of the obtained amount of zinc deposition to the theoretical amount of zinc deposition as determined by Faraday's law was 90% as an example, and the thickness was 54 µm. The amount of zinc deposition per unit area obtained from the amount of zinc deposition was 36.9 mg/cm$^2$, the capacity per unit area obtained from this was 30.2 mAh/cm$^2$, and thus the capacity was 15 times or more than the average capacity of 2 mAh/cm$^2$ of the negative electrode in the lithium-ion secondary battery. The capacity here means the amount of electricity obtained from the mass of the reactant by Faraday's law, and in addition to this, the charge capacity and the discharge capacity are also used for the amount of electricity charged and the amount of electricity discharged.

On the zinc-plated copper plate obtained by the above, a commercially available masking material for plating was applied to the rest of the plate, leaving a circular part with a diameter of 20 mm from the center of one zinc-plated surface, as illustrated in FIG. 16. Next, as illustrated in FIG. 17, within this circular part with a diameter of 20 mm, four circles with a diameter of 5 mm were taken such that the closest distance between the circles at the top and bottom or left and right is 3 mm, and the commercially available masking material was applied to the part other than these circles. Further, by adhering the acrylic-based resin reaction space divider having a plurality of connection passages and opening passages as illustrated in FIG. 4 to the top of this masking material applied surface and by waiting for the masking material to be stuck, the zinc negative electrode according to Example 4, in which the zinc-plated copper plate and the reaction space divider have been integrated, was fabricated. The contour of the exposed portion of the zinc plating matches the cylindrical contour in the reaction space divider. Referring to the signs in FIG. 4, in this reaction space divider 330, a plate with outer shape dimensions of 27 mm, 27 mm and 2 mm is the main body 331, the electrolyte holder portions 332a, 332b, 332c, 332d with a diameter of 5 mm are formed in such a way that the closest distance between the top and bottom or left and right is 3 mm so that they are arranged in correspondence with the zinc exposed parts of the zinc-plated copper plate after the above masking, further, the electrolyte holder portions 332a, 332c and the electrolyte holder portions 332b, 332d at the top and bottom of the drawing are connected to one another through the connection passages 333a, 333b of 1.4 mm×1.4 mm, the electrolyte holder portions 332a, 332b on the upper side of FIG. 4 have the opening passages 334a, 334b of 1.4 mm×1.4 mm, respectively, formed up to the edge of the resin plate toward the opposite side of the lower electrolyte holder portions 332c, 332d, and the lower electrolyte holder portions 332c, 332d have the opening passages 334c, 334d of 1.4 mm×1.4 mm, respectively, formed up to the edge of the resin plate toward the opposite side of the upper electrolyte holder portions 332a, 332b.

For convenience in explaining the arrangement relation, the schematic diagram in FIG. 18 will be referred again. A zinc negative electrode 10 according to Example 4, which was fabricated as described above, and a pre-charged nickel positive electrode 60 (about 50 mm square with a thickness of 5 mm) were arranged opposite to one another within an acrylic container, and a resin plate (resin spacer) 80 was abutted on a back side of the zinc negative electrode 10 and screwed with a screw 70 so that the reaction space divider of the zinc negative electrode 10 according to Example 4 and the nickel positive electrode 60 are in close contact with one another. The used nickel positive electrode 60 is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, a liquid electrolyte 50 consisting of 6 mol/L of aqueous potassium hydroxide solution saturated with zinc oxide was added to the acrylic container to fabricate the zinc-nickel secondary battery. In the acrylic container in Example 4, a zinc wire with a diameter of 1 mm was arranged at a position near the zinc negative electrode but not in contact with it, and the potential of the zinc negative electrode was also measured using this zinc wire as a reference electrode.

<Evaluation>

The zinc-nickel secondary battery fabricated as described above was charged and discharged at a constant current. The charge and discharge cycle test was identical to that in Comparative Example 2, except that the setting condition for charge and discharge switching was as follows. As in Example 4, the battery voltage and the potential of the zinc negative electrode were simultaneously measured in the zinc-nickel secondary battery including the zinc reference electrode. As a result, it was found that the change in battery voltage matches the change in potential of the zinc negative electrode. Therefore, the condition for switching from the charge or the discharge to the pause was set at the potential of the zinc negative electrode to match that in the case of the battery voltage. Specifically, the condition was set so that when the potential of the zinc negative electrode relative to the zinc reference electrode becomes higher than 0.2 V during discharging, the discharge is terminated to be switched to the pause, and when it becomes lower than −2 V during charging, the charge is terminated to be switched to the pause. The change in battery voltage is opposite to the change in the potential of the zinc negative electrode. When the battery voltage becomes lower due to the discharge, the potential of the zinc negative electrode becomes higher, and when the battery voltage becomes higher due to the charge, the potential of the zinc negative electrode becomes lower. In this way, the switching condition was changed from the battery voltage to the potential of the zinc negative electrode, but the battery charge and discharge voltages in the latter case were in the identical range to that in the former case, as indicated in the result below. Accordingly, the switching condition has no effect on the result of the charge and discharge cycle test.

Figure 37:
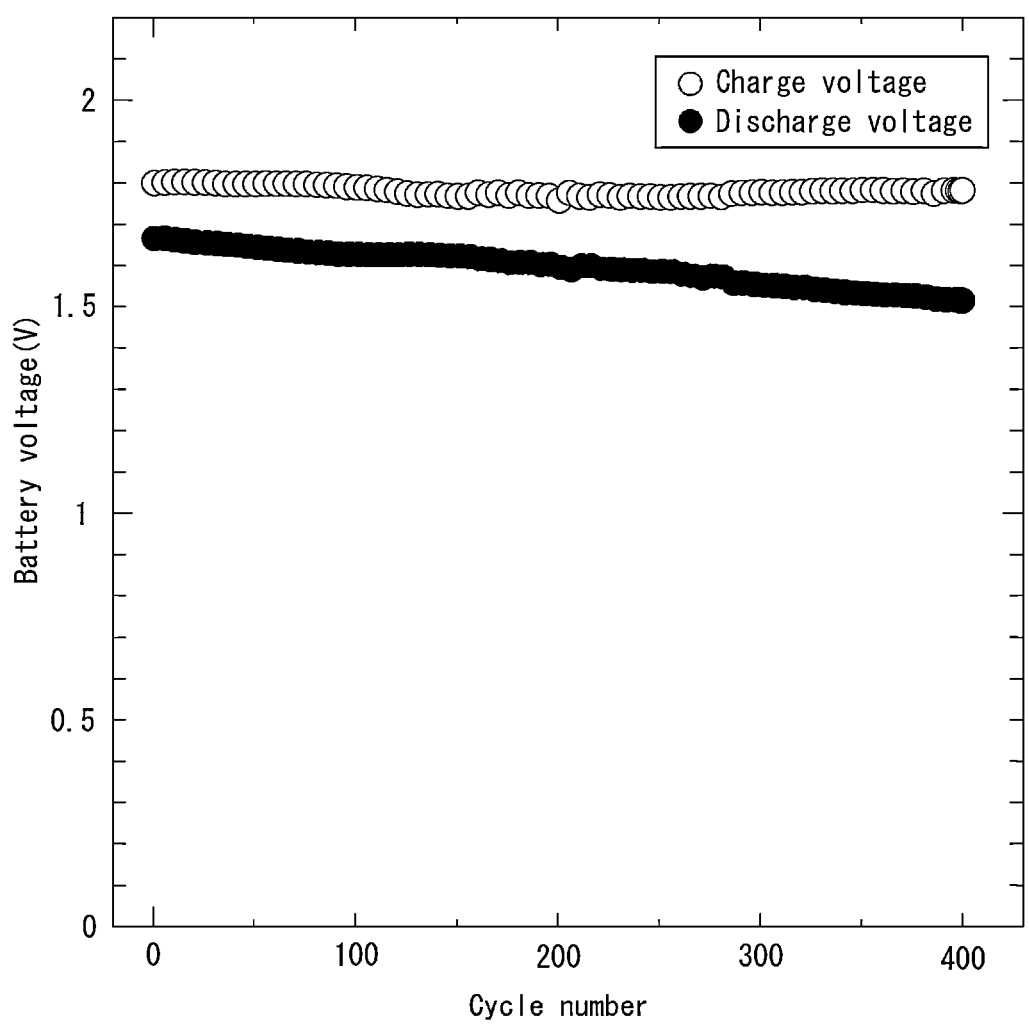
FIG. 37 is a diagram illustrating relation between discharge and charge voltages and a cycle number of a zinc-nickel secondary battery in Example 4.
Figure 38:
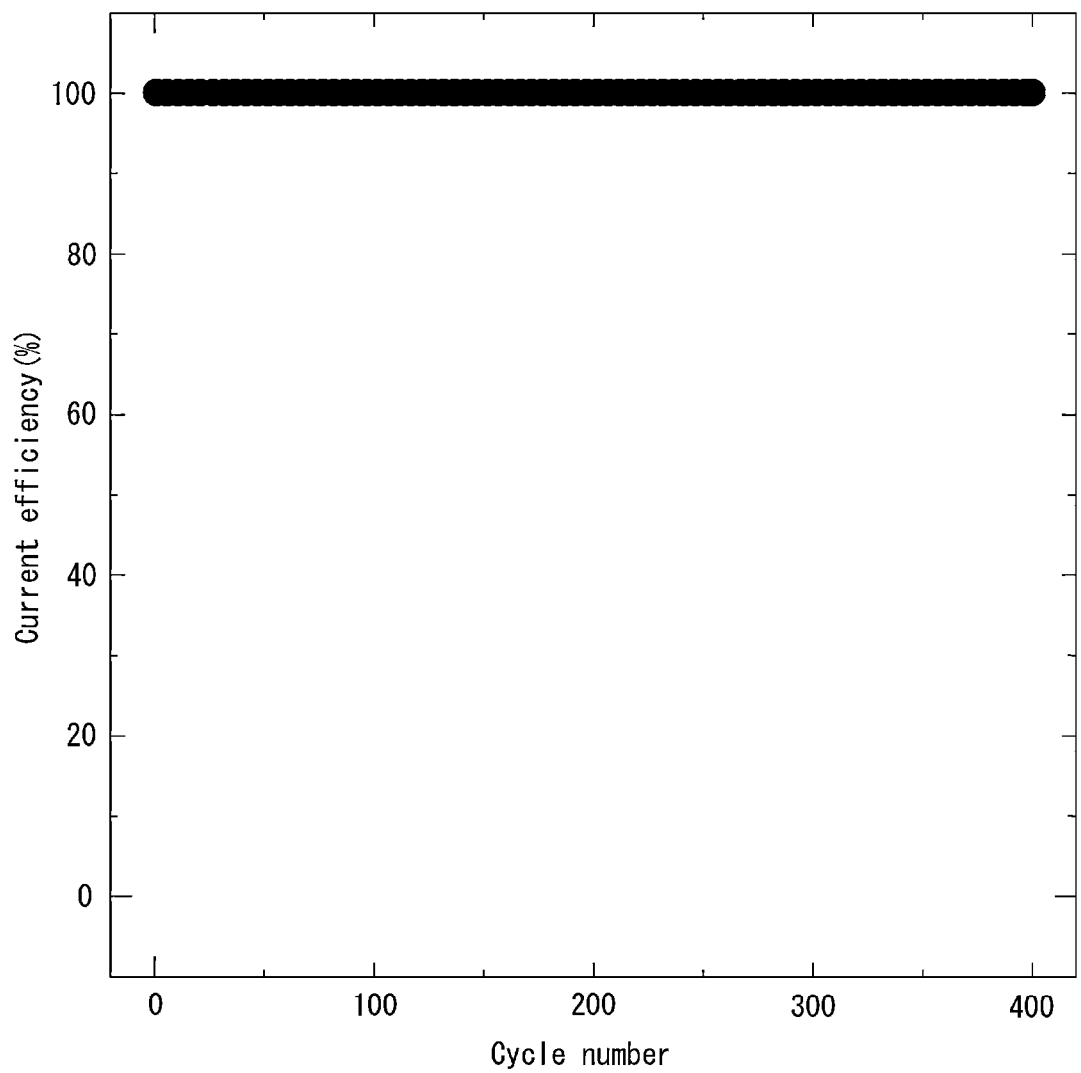
FIG. 38 is a diagram illustrating relation between a current efficiency and the cycle number of the zinc-nickel secondary battery in Example 4.

FIG. 37 and FIG. 38 illustrate respective relations of an average discharge voltage, an average charge voltage and a current efficiency to a charge and discharge cycle number obtained in Example 4. The definition and meaning of the current efficiency are identical to those described in Example 1. As illustrated in FIG. 37 and FIG. 38, it was found that, in the zinc-nickel secondary battery using the zinc negative electrode in Example 4, in the 400th cycle in the middle of the data acquisition, the average charge voltage was almost identical to the initial voltage, and the average discharge voltage was only slightly lower than the initial voltage, with no rapid decrease in discharge voltage or increase in charge voltage indicating a dendrite short circuit, and the charge and discharge can be stably performed for 400 cycles or more. It was also found that the current efficiency was maintained at 100% from the beginning to the 400th cycle, there was no decrease in capacity due to the active material inhomogeneity and the dendrite short circuit, and the battery capacity can be maintained at a high current efficiency. The result in Example 4 indicates merely the result in the middle of the data acquisition, and it does not indicate that the charge and discharge became impossible after 400 cycles.

Example 5

A zinc negative electrode fabricated in Example 5 has the identical design and dimensions of the reaction space divider to those in Example 3. However, Example 3 had a longitudinally mounted structure, while it was changed to a transversely mounted structure in Example 5. The pretreatment of the copper plate before zinc plating and the amount of plating are identical to those in Example 4. Specifically, a zinc-nickel secondary battery was fabricated as follows.

The copper plate illustrated in FIG. 15 was electroplated in the method and the condition identical to those in Example 4, and the commercially available masking material was applied to the rest of the plate, leaving a circular part with a diameter of 20 mm from the center of one zinc-plated surface as illustrated in FIG. 16. Next, referring to the signs in FIG. 6, within this circular part with a diameter of 20 mm, the commercially available masking material was applied except for the parts corresponding to the electrolyte holder portions 532*a*, 532*b*, 532*c*, 532*d* in the reaction space divider 530 having a structure illustrated in FIG. 6, that is, four squares of 4.43 mm square. Further, by adhering the acrylic-based resin reaction space divider 530 having a plurality of connection passages 533*a*, 533*b* and opening passages 534*a*, 534*b*, 534*c*, 534*d* illustrated in FIG. 6 to the top of this masking material applied surface and by waiting for the masking material to be stuck, the zinc negative electrode of this disclosure, in which the zinc-plated copper plate and the reaction space divider 530 have been integrated, was fabricated. In this reaction space divider 530, four square electrolyte holder portions 532*a*, 532*b*, 532*c*, 532*d* of 4.43 mm are formed on the plate with the outer shape dimensions of 27 mm, 27 mm and 3 mm, and the electrolyte holder portions 532*a*, 532*b*, 532*c*, 532*d* are formed such that the closest distance between the top and bottom or left and right is 3 mm. Further, the electrolyte holder portions 532*a*, 532*c* and 532*b*, 532*d* at the top and bottom in FIG. 6 are connected to one another through the connection passages 533*a*, 533*b* of 2 mm×2 mm, the upper electrolyte holder portions 532*a*, 532*b* in the drawing have the opening passages 534*a*, 534*b* of 2 mm×2 mm, respectively, formed up to the edge of the main body 531 of the reaction space divider 530 toward the opposite side of the lower electrolyte holder portions 532*c*, 532*d*, and the lower electrolyte holder portions 532*c*, 532*d* have the opening passages 534*c*, 534*d* of 2 mm×2 mm, respectively, formed up to the edge of the main body 531 of the reaction space divider 530 toward the opposite side of the upper electrolyte holder portions 532*a*, 532*b*. The reaction space divider 530 in Example 5 was configured so that the total opening area of its electrolyte holder portions was identical to that in Example 1.

The zinc negative electrode according to Example 5, which was fabricated as described above, and a pre-charged nickel positive electrode (about 50 mm square with a thickness of 5 mm) were arranged opposite to one another within an acrylic container similarly to Example 1, and a resin plate was abutted on a back side of the zinc negative electrode and screwed with a screw so that the reaction space divider of the zinc negative electrode according to Example 5 and the nickel positive electrode are in close contact with one another. For convenience in explaining the arrangement relation, a schematic diagram in FIG. 39 will be referred. A zinc negative electrode 10 according to Example 5, which was fabricated as described above, and a pre-charged nickel positive electrode 60 (about 50 mm square with a thickness of 5 mm) were arranged opposite to one another within an acrylic container, and a resin plate (resin spacer) 80 was abutted on a back side of the zinc negative electrode 10 and screwed with a screw 70 so that the reaction space divider of the zinc negative electrode 10 according to Example 5 and the nickel positive electrode 60 are in close contact with one another. Thus, in Example 5, the zinc negative electrode 10 and the nickel positive electrode 60 are arranged horizontally to be a transversely mounted structure, different from the longitudinally mounted structure in which the zinc negative electrode 10 and the nickel positive electrode 60 are arranged vertically in Example 1 to Example 4 (see FIG. 18). The used nickel positive electrode 60 is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, a liquid electrolyte 50 consisting of 6 mol/L of aqueous potassium hydroxide solution saturated with zinc oxide was added to the acrylic container to fabricate the zinc-nickel secondary battery.

<Evaluation>

The zinc-nickel secondary battery fabricated as described above was charged and discharged at a constant current. The condition in the charge and discharge test was identical to that in Example 4.

Figure 40:
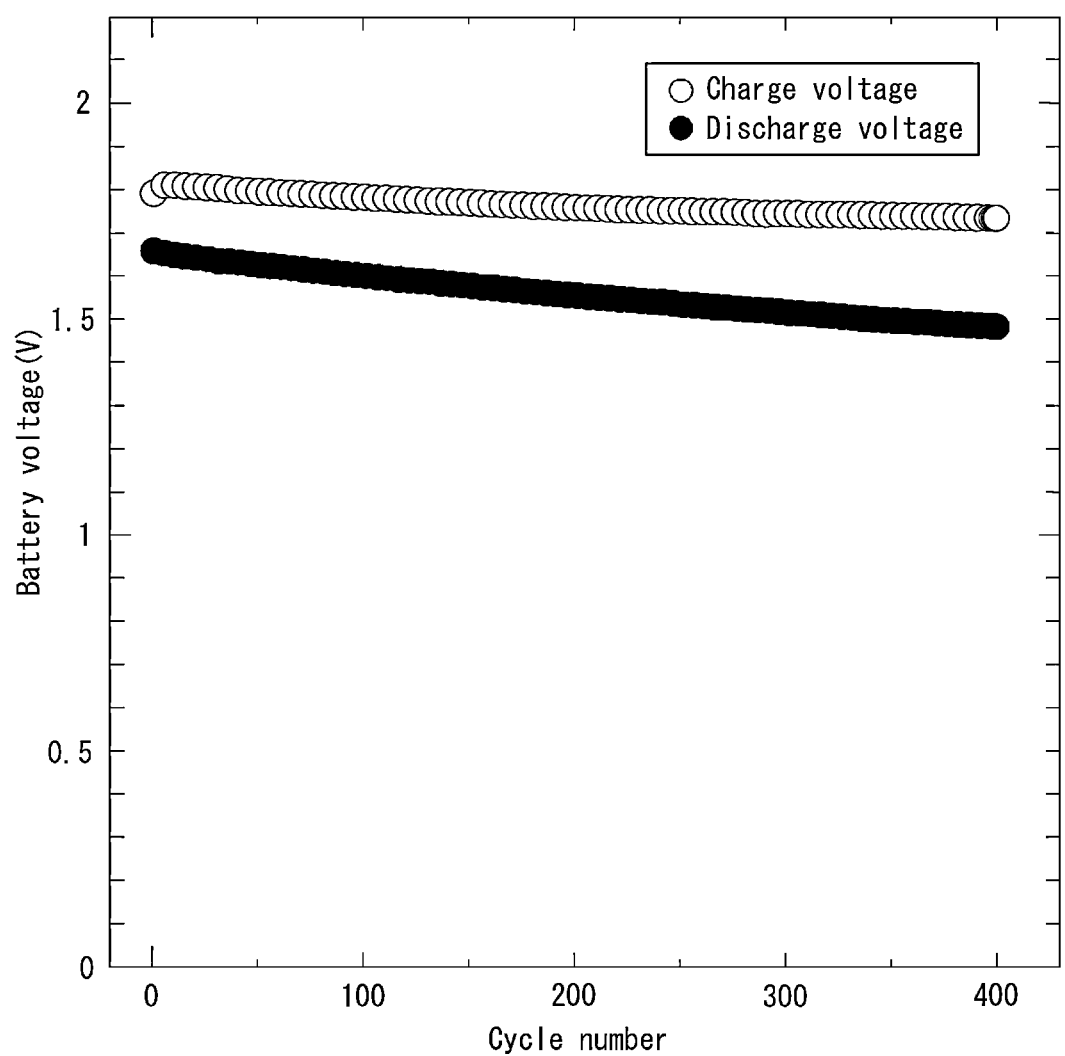
FIG. 40 is a diagram illustrating relation between discharge and charge voltages and a cycle number of the zinc-nickel secondary battery in Example 5.
Figure 41:
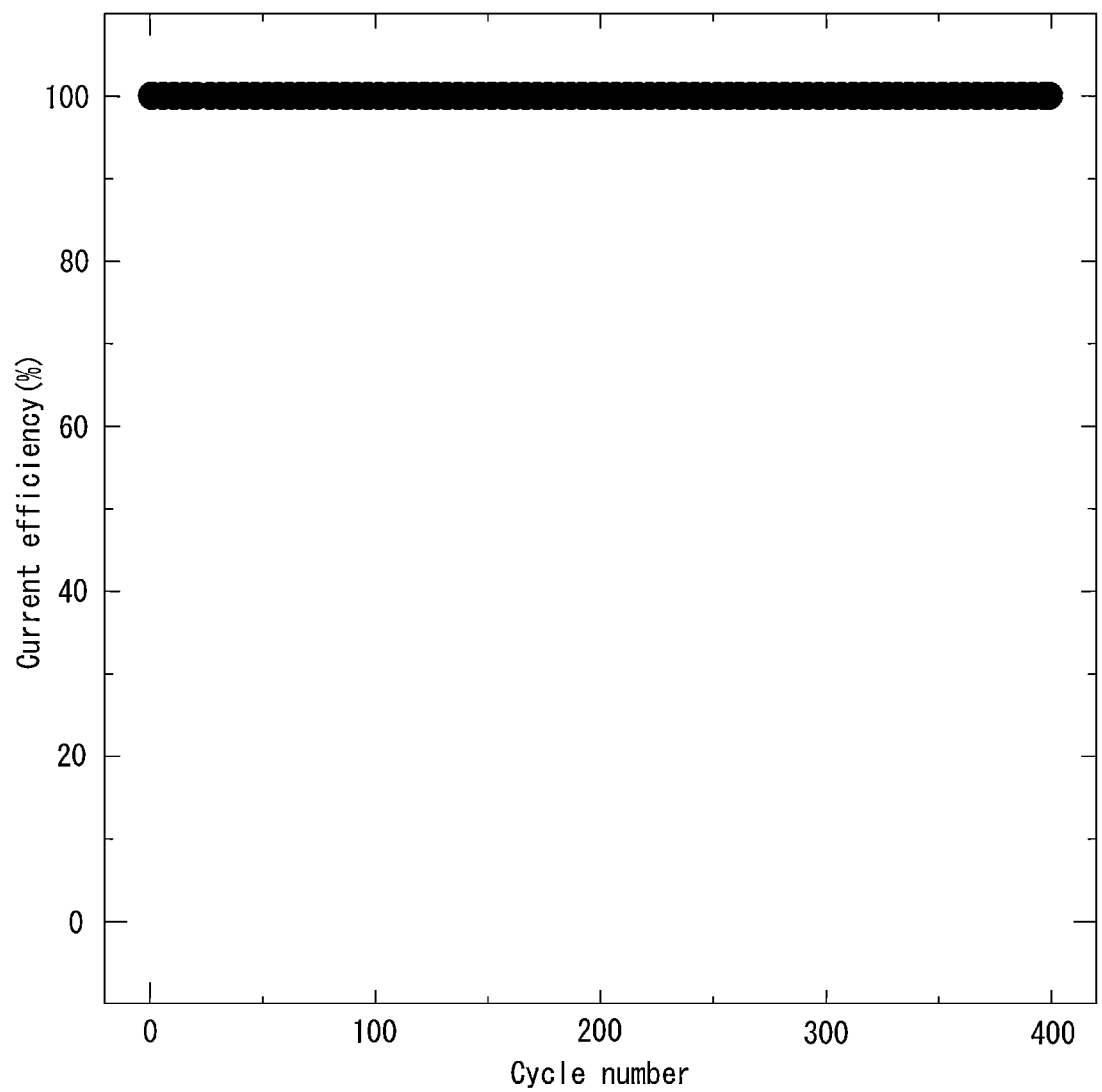
FIG. 41 is a diagram illustrating relation between a current efficiency and the cycle number of the zinc-nickel secondary battery in Example 5.

FIG. 40 and FIG. 41 illustrate respective relations of an average discharge voltage, an average charge voltage and a current efficiency to a charge and discharge cycle number obtained in Example 5. The definition and meaning of the current efficiency are identical to those described in Example 1. As illustrated in FIG. 40 and FIG. 41, it was found that, in the zinc-nickel secondary battery using the zinc negative electrode in Example 5, in the 400th cycle in the middle of the data acquisition, the average charge voltage was almost identical to the initial voltage, and the average discharge voltage was only slightly lower than the initial voltage, with no rapid decrease in discharge voltage or increase in charge voltage indicating a dendrite short circuit, and the charge and discharge can be stably performed for 400 cycles or more. It was also found that the current efficiency was maintained at 100% from the beginning to the 400th cycle, there was no decrease in capacity due to the active material inhomogeneity and the dendrite short circuit, and the battery capacity can be maintained at a high current efficiency. The result in Example 5 indicates merely the result in the middle of the data acquisition, and it does not indicate that the charge and discharge became impossible after 400 cycles.

Example 6

A zinc negative electrode fabricated in Example 6 has the identical design and dimensions of the reaction space divider to those in Example 2. However, Example 2 had a longitudinally mounted structure, while it was changed to a transversely mounted structure in Example 6 similarly to Example 5. The pretreatment of the copper plate before zinc plating and the amount of plating are identical to those in Example 4. Specifically, a zinc-nickel secondary battery was fabricated as follows.

The copper plate illustrated in FIG. 15 was electroplated in the method and the condition identical to those in Example 4, and the commercially available masking material was applied to the rest of the plate, leaving a circular part with a diameter of 20 mm from the center of one zinc-plated surface as illustrated in FIG. 15. Next, a zinc negative electrode was fabricated such that reaction space dividers illustrated in FIG. 32 were formed within this circular part with a diameter of 20 mm in the same way as in Example 2. For convenience in explaining the arrangement relation, the schematic diagram in FIG. 39 will be referred again. A zinc negative electrode 10 according to Example 6, which was fabricated as described above, and a pre-charged nickel positive electrode 60 (about 50 mm square with a thickness of 5 mm) were arranged opposite to one another within an acrylic container similarly to Example 1, and a resin plate (resin spacer) 80 was abutted on a back side of the zinc negative electrode 10 and screwed with a screw 70 so that the resin reaction space divider of the zinc negative electrode 10 according to Example 6 and the nickel positive electrode are in close contact with one another. As in Example 5, it was arranged such that the zinc negative electrode and the nickel positive electrode are transversely mounted as illustrated in the schematic diagram in FIG. 39. The used nickel positive electrode 60 is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, a liquid electrolyte 50 consisting of 6 mol/L of aqueous potassium hydroxide solution saturated with zinc oxide was added to the acrylic container to fabricate the zinc-nickel secondary battery.

<Evaluation>

The zinc-nickel secondary battery fabricated as described above was charged and discharged at a constant current. The condition in the charge and discharge test was identical to that in Example 4.

Figure 42:
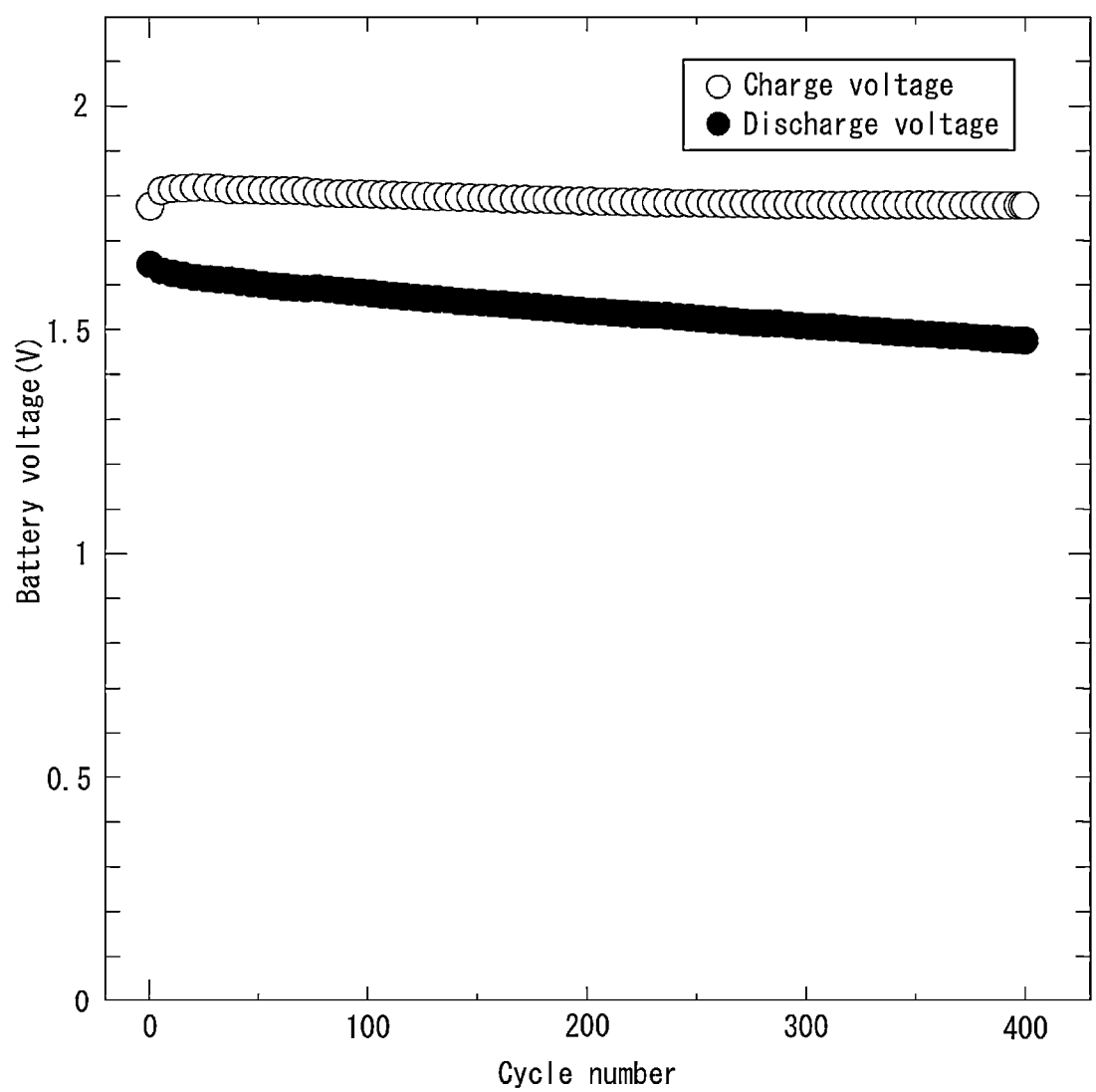
FIG. 42 is a diagram illustrating relation between discharge and charge voltages and a cycle number of a zinc-nickel secondary battery in Example 6.
Figure 43:
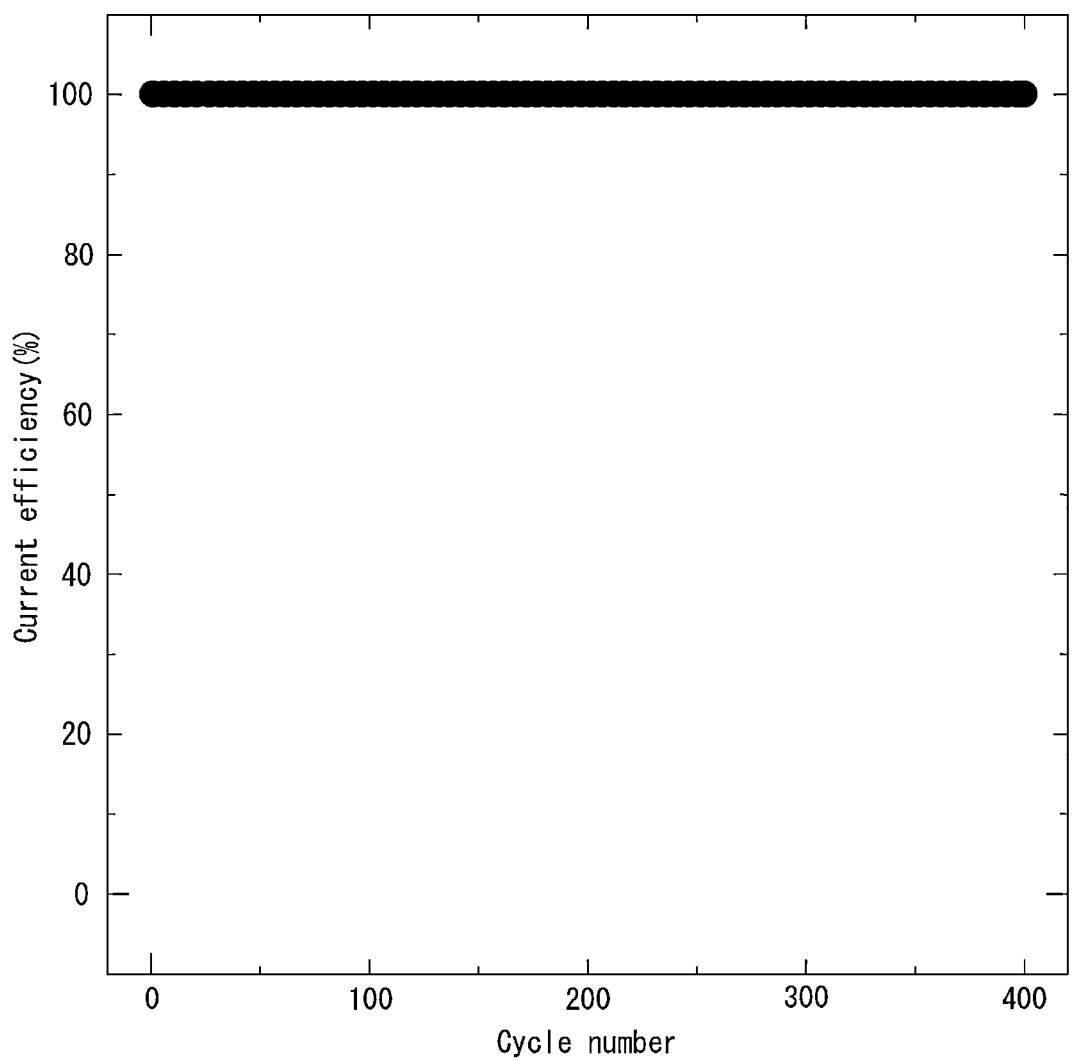
FIG. 43 is a diagram illustrating relation between a current efficiency and the cycle number of the zinc-nickel secondary battery in Example 6.

FIG. 42 and FIG. 43 illustrate respective relations of an average discharge voltage, an average charge voltage and a current efficiency to a charge and discharge cycle number obtained in Example 6. The definition and meaning of the current efficiency are identical to those described in Example 1. As illustrated in FIG. 42 and FIG. 43, it was found that, in the zinc-nickel secondary battery using the zinc negative electrode in Example 6, in the 400th cycle in the middle of the data acquisition, the average charge voltage was almost identical to the initial voltage, and the average discharge voltage was only slightly lower than the initial voltage, with no rapid decrease in discharge voltage or increase in charge voltage indicating a dendrite short circuit, and the charge and discharge can be stably performed for 400 cycles or more. It was also found that the current efficiency was maintained at 100% from the beginning to the 400th cycle, there was no decrease in capacity due to the active material inhomogeneity and the dendrite short circuit, and the battery capacity can be maintained at a high current efficiency. The result in Example 6 indicates merely the result in the middle of the data acquisition, and it does not indicate that the charge and discharge became impossible after 400 cycles.

Figure 44:
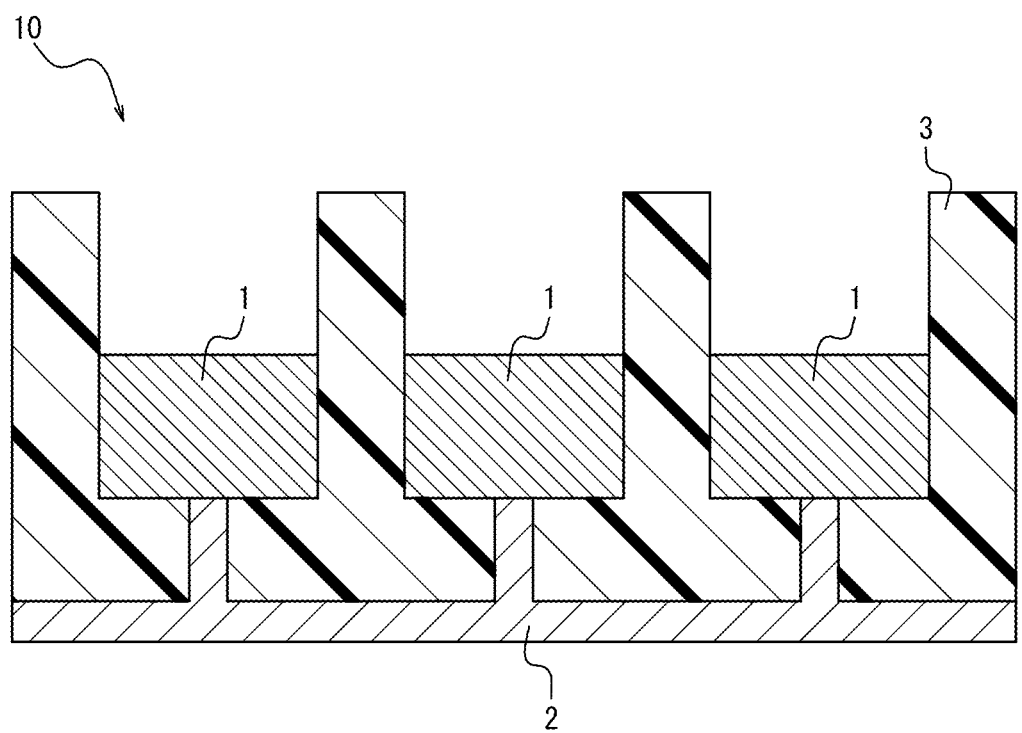
FIG. 44 is a configuration diagram illustrating one example of a metal negative electrode applicable to this disclosure.

The metal negative electrode according to this disclosure is not limited to the one formed such that the electroplating with the metal, which is the active material, is applied onto the current collector and it is integrated with the reaction space divider using adhesiveness by the solidified masking material as described in Example 1 to Example 6. For example, the metal negative electrode according to this disclosure may have a structure as illustrated in FIG. 44. A metal negative electrode 10 in FIG. 44 has a structure in which the electrolyte holder portion of a reaction space divider 3 is partially filled with a negative-electrode active material (active material portion 1) and the negative-electrode active material is electrically connected to a current collector 2 through a current collector having a projection corresponding to a hollow portion formed immediately below the active material portion 1 of the reaction space divider 3. The metal negative electrode having such structure has a cross-sectional shape as in FIG. 44 and can be fabricated, for example, by fabricating a reaction space divider having a surface structure as in FIG. 3 with resin, fabricating a current collector having a projection corresponding to a hollow portion in the reaction space divider as illustrated in FIG. 44 with metal, and after integrating them, filling or electroplating the reaction space divider with metal, which is the negative-electrode active material.

Figure 39:
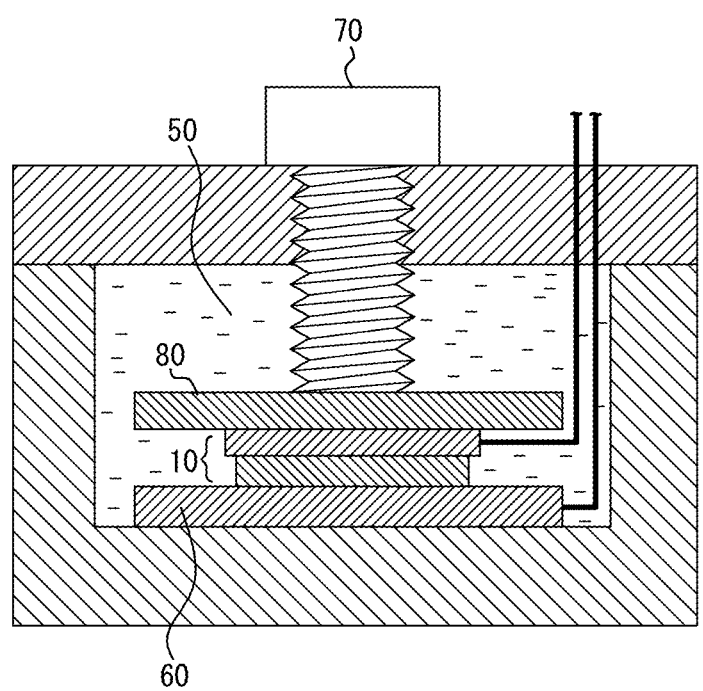
FIG. 39 is a configuration diagram of a cell of a zinc-nickel secondary battery used in Example 5.

Examples in the specification described the examples using copper as the current collector and zinc as the active material portion. In addition to this, a zinc negative electrode integrated with the reaction space divider of this disclosure is fabricated using a zinc plate as the current collector and the one formed with zinc by electroplating as the active material portion, and then the charge and discharge cycle test was performed. However, in this charge and discharge test result, there were significant differences in the charge and discharge available cycle characteristics even among the zinc negative electrodes with the identical specification of reaction space divider. As a result of observing the zinc negative electrodes after the charge and discharge test, it became clear that not only the zinc in the active material portion but also the zinc used as the current collector was sometimes involved in the charge and discharge reaction. That is, it should be added that it was found that such combination of the zinc current collector and the zinc active material portion cannot predict or demonstrate the action and the effect of this disclosure. However, this additional remark does not exclude the use of zinc as the material for the current collector of the zinc negative electrode of this disclosure. That is, in the implementation of this disclosure, the current collector and the active material portion may both consist of zinc or zinc alloy, or the current collector and the active material portion may be integrated and consist of zinc or zinc alloy. As such, there may be a structure in which zinc or zinc alloy having various shapes such as plate-like and foil-like shapes, which is formed in various methods such as electroplating and rolling, partially functions as the current collector and the rest of it functions as the active material portion. In the secondary battery of this disclosure, the metal negative electrode of this disclosure and the positive electrode may be longitudinally arranged or transversely arranged. For example, FIG. 2 and FIG. 39 are examples that the metal negative electrode and the positive electrode are transversely arranged, and FIG. 18 is an example that the metal negative electrode and the positive electrode are longitudinally arranged.

Further, Examples in the specification described the examples using only zinc as the active material portion of the zinc negative electrode, but as the negative-electrode active material, zinc oxide may be used instead of zinc and even a mixture of zinc and zinc oxide may be used. That is, zinc oxide is a material formed by the discharge, thus when the battery is fabricated in a discharged state, zinc oxide may be used as the negative-electrode active material. Thus, the metal negative electrode of this disclosure and the negative-electrode active material in the fabrication method do not necessarily have to be only metal, may also be an oxidation product of the metal, and further may be a mixture of the metal and the oxidation product of the metal in a suitable ratio. In other words, the metal is a reductant of the electrochemical reaction, and the oxidation product of the metal is an oxidant of the electrochemical reaction. Therefore, in a fabrication stage, the metal negative electrode of this disclosure and the active material portion in the fabrication method may be a reductant or an oxidant of the negative electrode reaction or may include a negative-electrode active material in which the reductant and the oxidant are mixed in a suitable ratio. Further, various auxiliary agents including the one generally referred to as a conductive agent or a binding agent may be mixed with the active material portion in addition to the reductant and the oxidant of the negative electrode reaction. For example, in the active material portion, the metal has good conductivity, but its oxidation product generally has poor conductivity. Accordingly, as the discharge progresses, the conductivity of the active material portion becomes lower. To suppress this, a conductive agent, which is conductive and does not have any adverse effect on the reaction of the negative electrode itself, may be mixed with the active material portion. Further, the metal and its oxidation product have different densities, thus the volume of the active material portion expands and contracts during charging and discharging of the metal negative electrode. A binding agent for form stabilization may be mixed with the active material portion for the purpose of suppressing cracking, falling off, loss, or shape change of the active material portion due to expansion or contraction so that the volume change does not cause a part of the active material to fall off the active material portion or poor conductivity to a part of the active material. For example, carbon is well known as one example of the conductive agent, and, for example, PTFE, PVA, SBR and PVDF are well known as examples of the binding agent, thus they can be used. However, the conductive agent and the binding agent applicable to this disclosure should not be limited to these. In addition to the conductive agent and the binding agent as described above, for example, there is a method of preparing slurry including the negative-electrode active material and fabricating the negative electrode using the slurry to fill the active material portion with the negative-electrode active material or form a specific shape, and an auxiliary agent added to adjust the viscosity of such slurry may be mixed with the active material portion after fabrication. Further, hydrogen generation is well known as a side reaction of the charge in the metal negative electrode that uses an alkaline aqueous solution as the liquid electrolyte, and a material that suppresses this hydrogen generation and self-discharge of the negative electrode may be mixed with the active material portion along with the negative-electrode active material. For example, bismuth may be mixed with the active material portion for such purpose, but the material should be not limited to this. The side reaction of the metal negative electrode varies depending on the type of metal or the type of electrolyte. Thus, a side reaction suppressing material that targets and suppresses not only the hydrogen generation but also other side reaction may be mixed with the active material portion.

Further, in Examples in the specification, the zinc-nickel secondary battery was fabricated in a charged state, but the method for fabricating the metal negative electrode of this disclosure and the secondary battery using the metal negative electrode of this disclosure are not necessarily limited to the fabrication in the charged state. Generally, the secondary battery is often fabricated in the discharged state, but, for example, in the specification, in the case of the zinc-nickel secondary batteries described in Examples, the negative electrode and the secondary battery using this negative electrode can be fabricated in the discharged state by using the active material portion whose principal component is zinc oxide as the negative electrode. The fabrication in the discharged state does not require the preparation of a pre-charged nickel positive electrode as well as the zinc negative electrode, and the battery can be used in a way that it starts to operate from the charge after completion. Further, as in Examples, after zinc is deposited by electroplating, the zinc can be partially or fully oxidized by energizing it or heat-treating it in air before or after integrating it with the reaction space divider, or simultaneously with the integration, thus obtaining the zinc negative electrode having the active material portion whose principal component is zinc oxide same as above. In this case, if the zinc is energized to turn into zinc oxide, the zinc negative electrode whose principal component is zinc oxide can be provided in a good conductivity state. On the other hand, in the case of the zinc-air secondary battery, a secondary battery is fabricated in the charged state by using zinc as the negative-electrode active material as illustrated in Examples in the specification. The charged state can be maintained until the start of use by preventing the positive electrode (air electrode) from coming into contact with oxygen by sealing the air side of the positive electrode (air electrode) with a tape until the battery is used. The zinc-air primary batteries currently available on the market, such as those for hearing aids, are also fabricated and sold in such state.

Further, the following will specifically describe this disclosure using Examples 7 to 10.

Example 7

Figure 45:
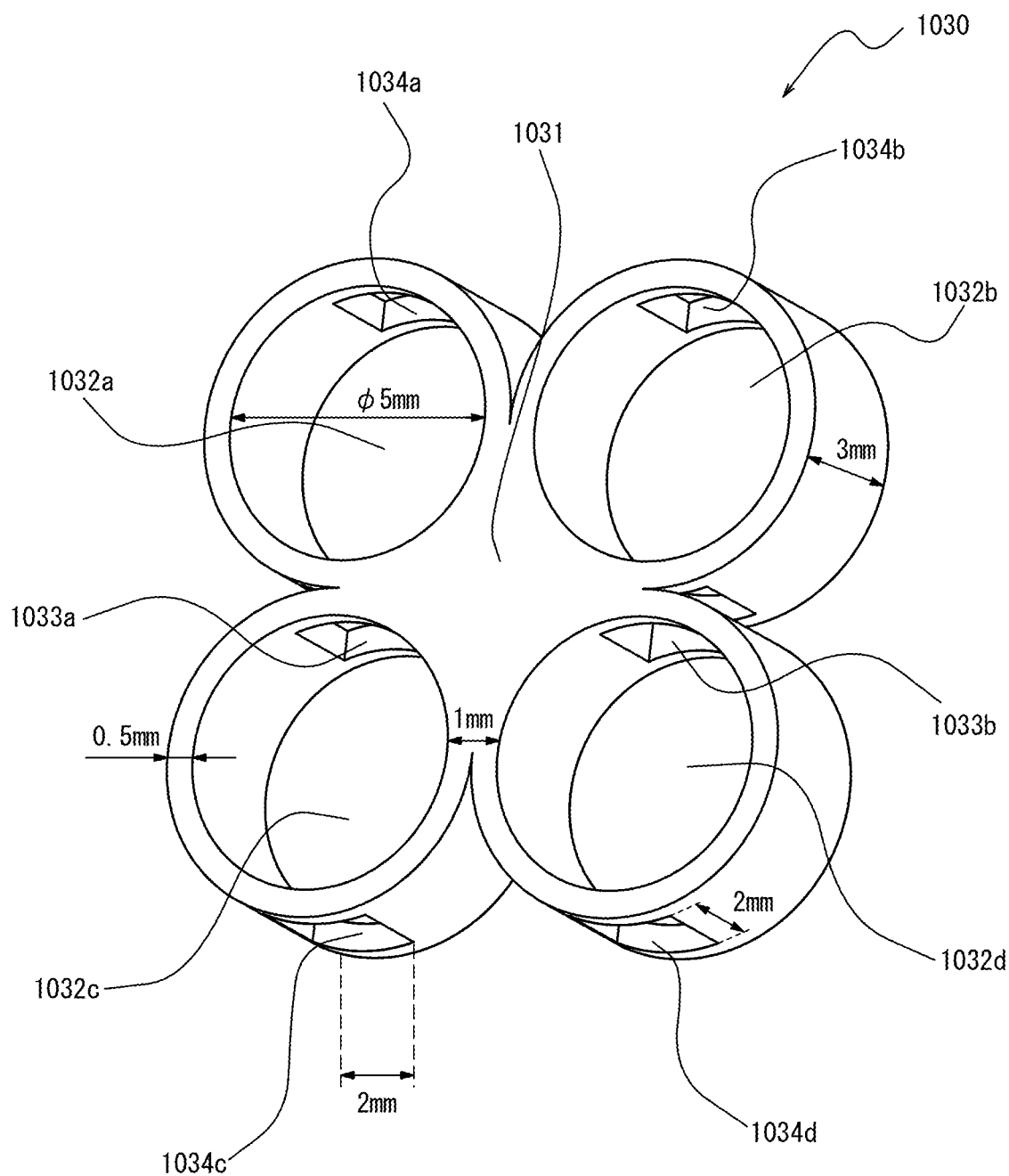
FIG. 45 is a shape diagram of a reaction space divider used for a zinc negative electrode in Example 7.

The copper plate illustrated in FIG. 15 was electroplated in the method and the condition identical to those in Example 4, and the commercially available masking material was applied to the rest of the plate, leaving a circular part with a diameter of 20 mm from the center of one zinc-plated surface as illustrated in FIG. 16. Next, within this circular part with a diameter of 20 mm, the commercially available masking material was applied to a part to which a reaction space divider illustrated in FIG. 45 is adhered. Further, by adhering the acrylic-based resin reaction space divider having a plurality of connection passages and opening passages as illustrated in FIG. 45 to the top of this masking material applied surface and by waiting for the masking material to be stuck, the zinc negative electrode according to Example 7, in which the zinc-plated copper plate and the reaction space divider have been integrated, was fabricated. In this zinc negative electrode, the contour of the exposed portion of the zinc plating matches the cylindrical contour in the reaction space divider. Referring to the signs in FIG. 45, this reaction space divider 1030 consists of a main body 1031 with outer shape dimensions (maximum width) of 12.0 mm in both length and width and 3 mm in thickness, electrolyte holder portions 1032a, 1032b, 1032c, 1032d with a diameter of 5 mm are formed in such a way that the closest distance between the top and bottom or left and right is 1 mm so that they are arranged in correspondence with the zinc exposed parts of the zinc-plated copper plate after the above masking, further, the electrolyte holder portions 1032a, 1032c and the electrolyte holder portions 1032b, 1032d at the top and bottom of FIG. 45 are connected to one another through connection passages 1033a, 1033b of 2 mm×2 mm, respectively, the electrolyte holder portions 1032a, 1032b on the upper side of FIG. 45 have opening passages 1034a, 1034b of 2 mm×2 mm, respectively, formed up to the edge of the main body 1031 toward the opposite side of the lower electrolyte holder portions 1032c, 1032d, and the lower electrolyte holder portions 1032c, 1032d have opening passages 1034c, 1034d of 2 mm×2 mm, respectively, formed up to the edge of the main body 1031 toward the opposite side of the upper electrolyte holder portions 1032a, 1032b.

For convenience in explaining the arrangement relation, the schematic diagram in FIG. 18 will be referred again. A zinc negative electrode 10 according to Example 7, which was fabricated as described above, and a pre-charged nickel positive electrode 60 (about 50 mm square with a thickness of 5 mm) were arranged opposite to one another within an acrylic container, and a resin plate (resin spacer) 80 was abutted on a back side of the zinc negative electrode 10 and screwed with a screw 70 so that the reaction space divider of the zinc negative electrode 10 according to Example 7 and the nickel positive electrode 60 are in close contact with one another. The used nickel positive electrode 60 is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, a liquid electrolyte 50 consisting of 6 mol/L of aqueous potassium hydroxide solution saturated with zinc oxide was added to the acrylic container to fabricate the zinc-nickel secondary battery.

<Evaluation>

The zinc-nickel secondary battery fabricated as described above was charged and discharged as follows. That is, the charging and discharging condition consisted of a pattern of 10 steps in which the following <1> to <10> were performed sequentially.

<1> 1 C (1 minute)
<2> 2 C (2 seconds)
<3> 1 C (1 minute)
<4> 4 C (2 seconds)
<5> 1 C (1 minute)
<6> 6 C (2 seconds)
<7> 1 C (1 minute)
<8> 8 C (2 seconds)
<9> 1 C (1 minute)
<10> 10 C (2 seconds)

Then, from a state of 100% SOC after the battery was fabricated, three consecutive patterns of discharge were performed first, followed by three patterns of charge. This was used as one cycle of the high-rate test. Next, the battery was discharged at 1 C until the SOC reached 90%, and then one cycle of high-rate test was performed. After this, the battery was discharged at 1 C until the SOC reached 80%, and then one cycle of the high-rate test was performed. Further, after the SOC reached 70%, 60%, 50%, and 40% by decreasing the SOC by 10%, one cycle of the high-rate test was performed each. A total of seven cycles of the high-rate test was performed according to the above, and the discharge voltage, the charge voltage, and the voltage at the pause time during the test were recorded. In the high-rate test, in addition to the designated energizing time (1 minute or 2 seconds), settings were made to switch to the next step when the voltage reached 1 V for discharge and 3 V for charge, but the voltage never actually reached these values.

Figure 46:
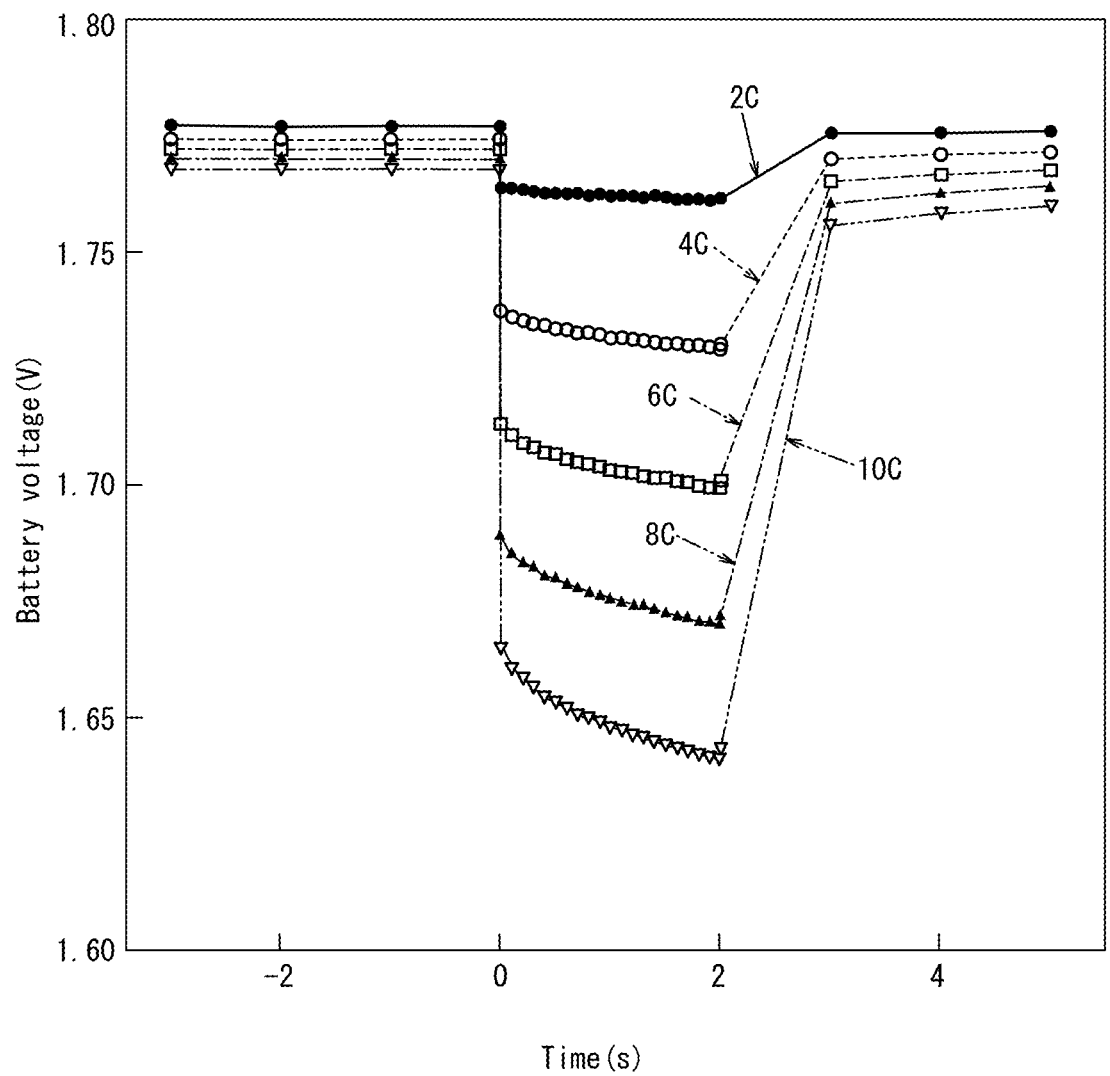
FIG. 46 is a diagram illustrating relation between a battery voltage and a discharge rate of a zinc-nickel secondary battery in Example 7.

FIG. 46 illustrates one example of temporal change of the discharge voltage obtained in the zinc-nickel secondary battery in Example 7. First, in FIG. 46, the horizontal axis is the time in seconds, and the vertical axis is the battery voltage during discharging in V (volts). For convenience, the horizontal axis is expressed such that the start point of the 2 seconds of discharge at each rate from 2 C to 10 C is 0 seconds. That is, before 0 seconds, the discharge is at 1 C, and after 2 seconds, the discharge is also at 1 C. In FIG. 46, the zinc-nickel secondary battery of this disclosure indicated a stable discharge voltage of 1.6 V or more even at extremely high discharge rates of up to 10 C. It was also found that after two seconds of high-rate discharge, the voltage could be almost restored to the voltage before the high-rate discharge after only one second. Such property is required for applications that require a large amount of instantaneous power, such as a hybrid vehicle, a plug-in hybrid vehicle, an electric vehicle, a power supply for preventing momentary stop, an emergency power supply and a power stabilization power supply. It was found that the metal negative electrode and the metal secondary battery of this disclosure have extremely excellent high-rate discharge property that are difficult to achieve with other secondary batteries.

Figure 47:
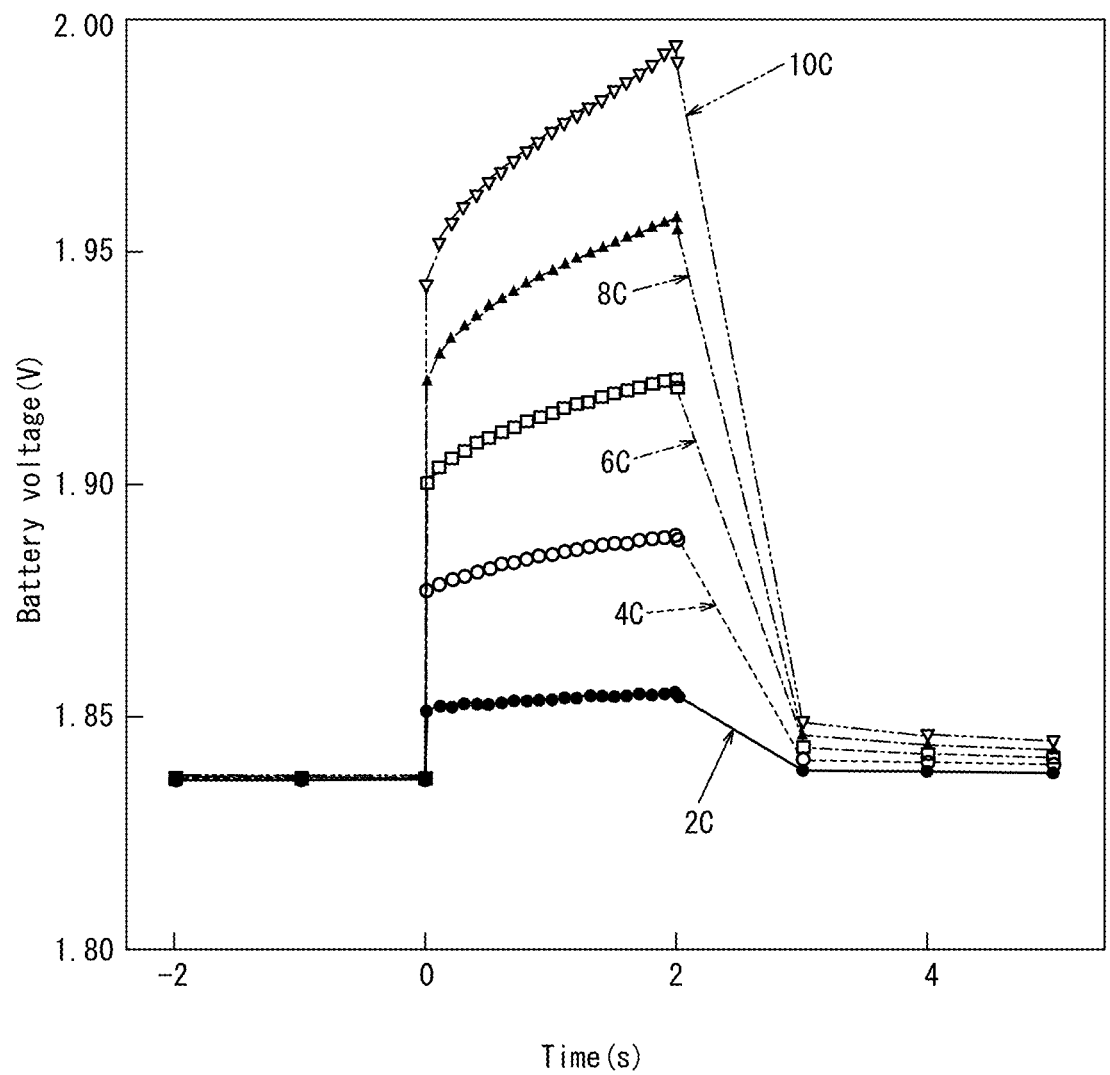
FIG. 47 is a diagram illustrating relation between the battery voltage and a charge rate of the zinc-nickel secondary battery in Example 7.

Further, FIG. 47 illustrates one example of temporal change of the charge voltage obtained in the zinc-nickel secondary battery in Example 7. In this drawing as in FIG. 46, the horizontal axis is the time in seconds, and the vertical axis is the battery voltage during charging in V (volts). For convenience, the horizontal axis is expressed such that the start point of the 2 seconds of charge at each rate from 2 C to 10 C is 0 seconds. That is, before 0 seconds, the charge is at 1 C, and after 2 seconds, the charge is also at 1 C. In FIG. 47, the zinc-nickel secondary battery of this disclosure indicated a stable charge voltage of 2 V or less even at extremely high charge rates of up to 10 C. It was also found that after two seconds of high-rate charge, the voltage could be almost restored to the voltage before the high-rate charge after only one second. Such property is required when fast charging is required or desirable in various applications such as a hybrid vehicle, a plug-in hybrid vehicle, an electric vehicle, a power supply for preventing momentary stop, an emergency power supply and a power stabilization power supply. It was found that the metal negative electrode and the metal secondary battery of this disclosure have extremely excellent high-rate charge property that are difficult to achieve with other secondary batteries.

Further, the C-rate was converted to the current density for the results of FIG. 46 and FIG. 47, and a linear relationship was obtained when the relation between the discharge voltage or the charge voltage and the current density was plotted, thus the battery resistance was determined from the slope. As a result, over a wide range of SOC, the battery resistance during discharging was 1.0 to 1.2 $\Omega cm^2$, and the resistance during charging was 1.2 to 1.4 $\Omega cm^2$, which were exceptionally low values. If the dendrite of zinc is generated or the inhomogeneity of the active material occurs, the battery resistance will increase because the active material that can be involved in the reaction decreases or the surface area of the active material decreases, resulting in a larger reaction resistance even at the identical current density. It was found that the zinc negative electrode of this disclosure has a small change in battery resistance even when the SOC becomes small, that is, when the depth of discharge becomes large, or when the SOC becomes large, that is, when the depth of charge becomes large; a small battery resistance due to homogenized reaction in the negative electrode; and a small change with charging and discharging.

Example 8

A zinc negative electrode fabricated in Example 8 has the identical design and dimensions of the reaction space divider to those in Example 5 and the identical transversely mounted structure, but the fabrication method is different as follows. That is, in Example 5, the zinc plating was first applied to the entire one side of the plating portion of the copper plate illustrated in FIG. 15, while Example 8 had a structure in which the zinc plating is applied only to parts corresponding to the reaction space dividers in FIG. 6. The amount of zinc plating per unit area was identical to that in Example 5. The method for fabricating the zinc-nickel secondary battery in Example 8 was described below.

After the copper plate (the plating portion: 30 mm×40 mm×0.2 mm, the lead portion: 5 mm×50 mm×0.2 mm) illustrated in FIG. 15 was subjected to pretreatment with a polishing paper and by oxalic acid etching, one surface and the side surfaces of the plating portion and both surfaces and the side surfaces of the lead portion were masked by a commercially available masking material for plating. Further, on one surface that was not masked of the plating portion, the commercially available masking material was applied except for the parts corresponding to the electrolyte holder portions 532*a*, 532*b*, 532*c*, 532*d* in the reaction space divider 530 having a structure illustrated in FIG. 6, that is, four squares of 4.43 mm square. The copper plate in this state was subjected to the zinc plating as in Example 4. After the zinc plating, by performing adhesion with the masking material to match the contour of the electrolyte holder portion and the contour of the zinc-plated part in FIG. 6 and by waiting for the masking material to be stuck, the zinc negative electrode of this disclosure, in which the zinc-plated copper plate and the acrylic-based resin reaction space divider 530 have been integrated, was fabricated.

Figure 48:
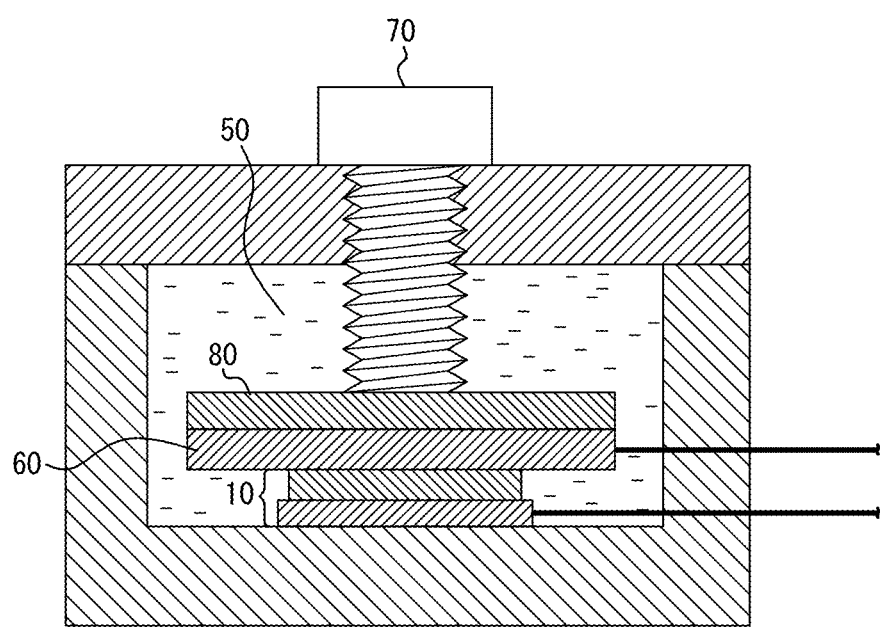
FIG. 48 is configuration diagram of a cell of a zinc-nickel secondary battery used in Example 8.

The zinc negative electrode according to Example 8, which was fabricated as described above, and a pre-charged nickel positive electrode (about 50 mm square with a thickness of 5 mm) were arranged opposite to one another within an acrylic container similarly to Example 5, and a resin plate was abutted on a back side of the nickel positive electrode and screwed with a screw so that the reaction space divider of the zinc negative electrode according to Example 8 and the nickel positive electrode are in close contact with one another. For convenience in explaining the arrangement relation, a schematic diagram in FIG. 48 will be referred. A zinc negative electrode 10 according to Example 8, which was fabricated as described above, and a pre-charged nickel positive electrode 60 (about 50 mm square with a thickness of 5 mm) were arranged opposite to one another within an acrylic container, and a resin plate (resin spacer) 80 was abutted on a back side of the nickel positive electrode 60 and screwed with a screw 70 so that the reaction space divider of the zinc negative electrode 10 according to Example 8 and the nickel positive electrode 60 are in close contact with one another. The used nickel positive electrode 60 is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, a liquid electrolyte 50 consisting of 6 mol/L of aqueous potassium hydroxide solution saturated with zinc oxide was added to the acrylic container to fabricate the zinc-nickel secondary battery.

<Evaluation>

Figure 49:
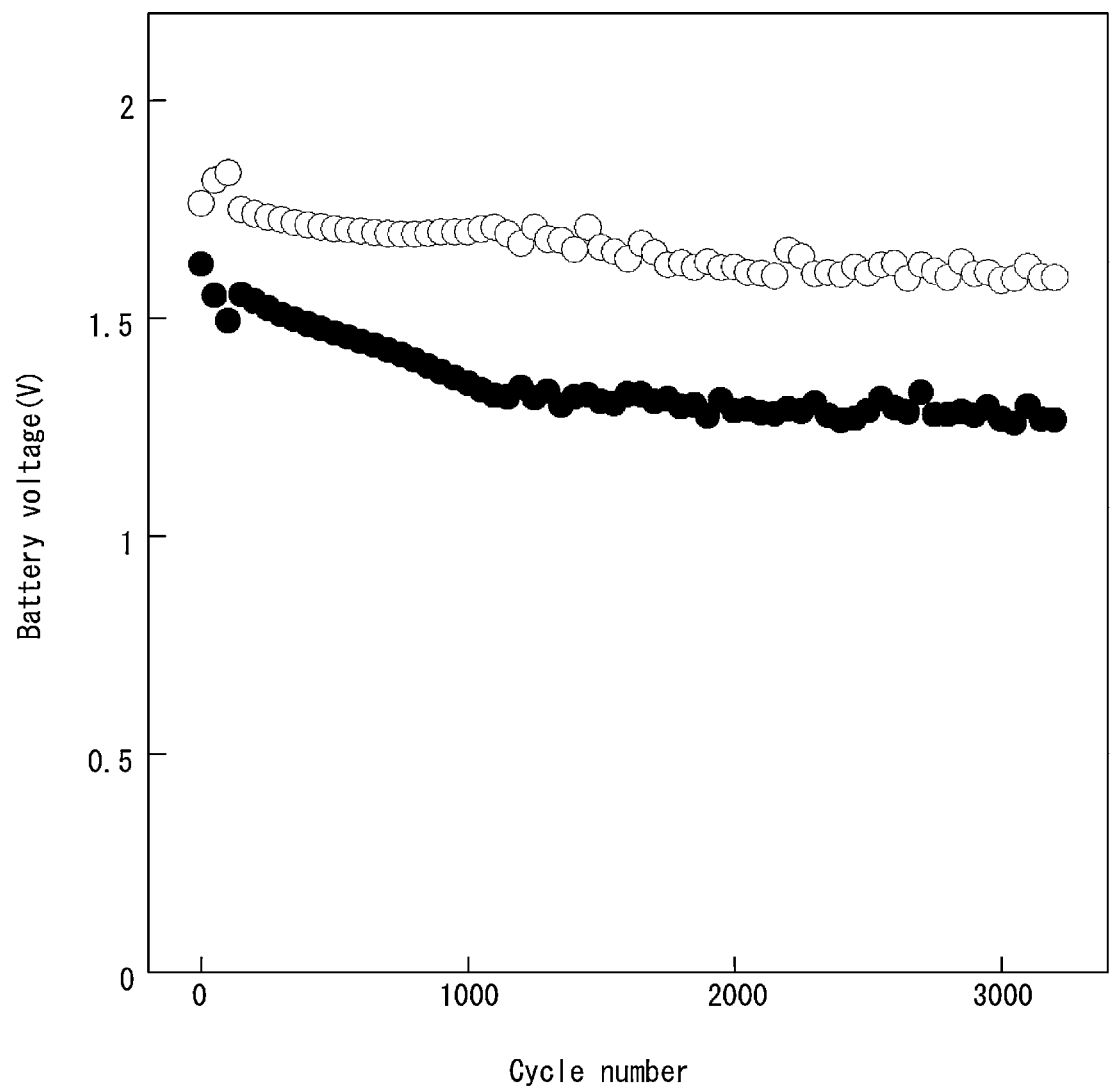
FIG. 49 is a diagram illustrating relation between discharge and charge voltages and a cycle number of the zinc-nickel secondary battery in Example 8.
Figure 50:
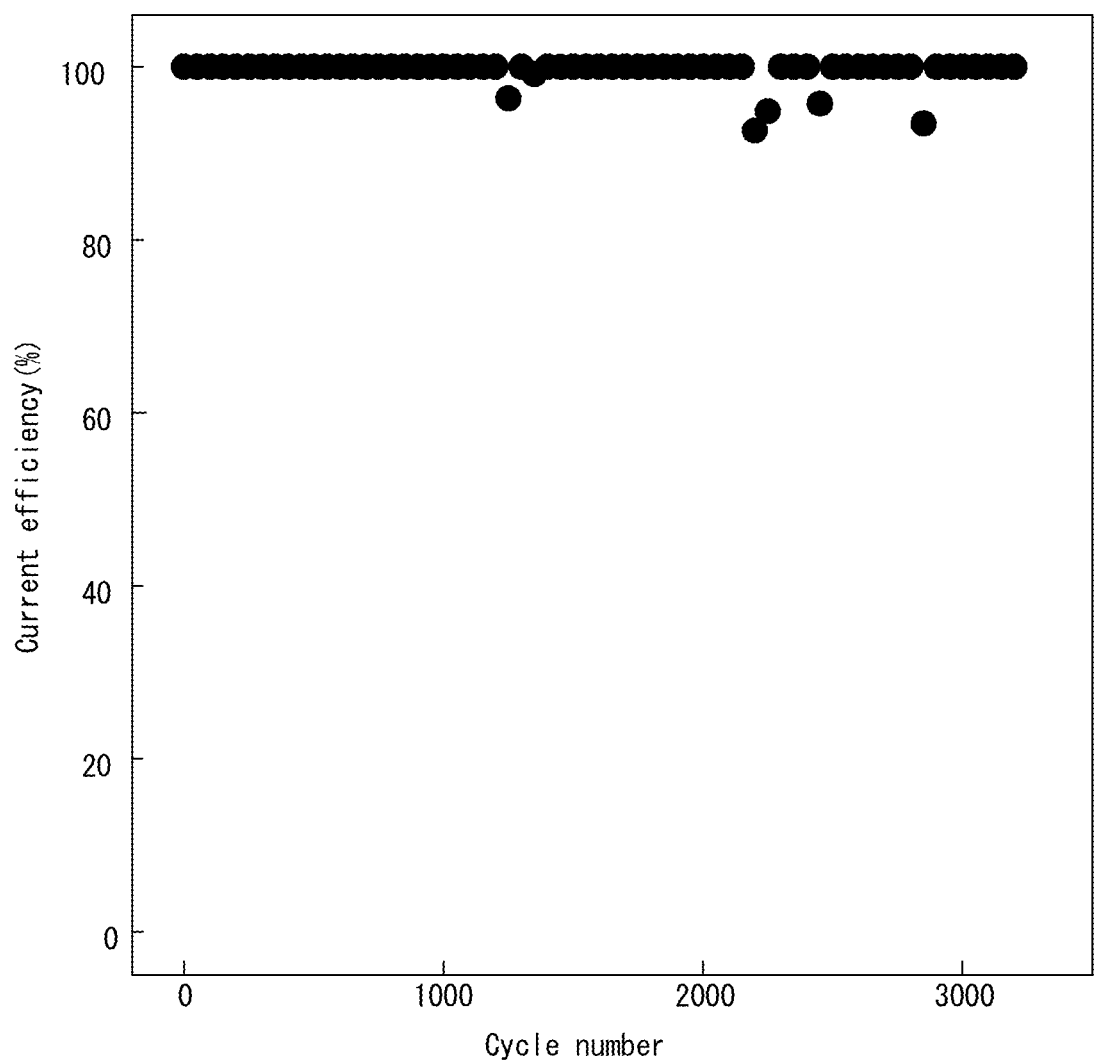
FIG. 50 is a diagram illustrating relation between a current efficiency and the cycle number of the zinc-nickel secondary battery in Example 8.

The zinc-nickel secondary battery fabricated as described above was charged and discharged at a constant current. The condition in the charge and discharge test was identical to that in Example 4. FIG. 49 and FIG. 50 illustrate respective relations of an average discharge voltage, an average charge voltage and a current efficiency to a charge and discharge cycle number obtained in Example 8. The definition and meaning of the current efficiency are identical to those described in Example 1. As illustrated in FIG. 49 and FIG. 50, it was found that, in the zinc-nickel secondary battery using the zinc negative electrode in Example 8, there was no rapid decrease in discharge voltage or increase in charge voltage indicating a dendrite short circuit, and the charge and discharge can be stably performed for 3200 cycles or more. It was also found that the current efficiency was maintained at 100% even beyond 3200 cycles, there was no decrease in capacity due to the active material inhomogeneity and the dendrite short circuit, and the battery capacity can be maintained at a high current efficiency. As an excellent charge and discharge property was obtained as above, the test for Example 8 was stopped after 3200 cycles.

Example 9

A zinc negative electrode fabricated in Example 9 has the identical design and dimensions of the reaction space divider to those in Example 6 and the identical transversely mounted structure, but the fabrication method is different as follows. That is, in Example 6, the zinc plating was first applied to the entire one side of the plating portion of the copper plate illustrated in FIG. 15, while Example 9 had a structure in which the zinc plating is applied only to parts corresponding to the reaction space dividers in FIG. 32. The amount of zinc plating per unit area was identical to that in Example 6. The method for fabricating the zinc-nickel secondary battery in Example 9 was described below.

After the copper plate (the plating portion: 30 mm×40 mm×0.2 mm, the lead portion: 5 mm×50 mm×0.2 mm) illustrated in FIG. 15 was subjected to pretreatment with a polishing paper and by oxalic acid etching, one surface and the side surfaces of the plating portion and both surfaces and the side surfaces of the lead portion were masked by a commercially available masking material for plating. Further, on one surface that was not masked of the plating portion, the commercially available masking material was applied except for the parts corresponding to the electrolyte holder portions in the reaction space divider having a structure illustrated in FIG. 32, that is, the parts corresponding to the total five through-holes of four circular through-holes with a diameter of 5 mm and one circular through-hole with a diameter of 4 mm positioned in the center of these four circular through-holes. The copper plate in this state was subjected to the zinc plating as in Example 4. After the zinc plating, by performing adhesion with the masking material to match the contour of the electrolyte holder portion and the contour of the zinc-plated part in FIG. 32 and by waiting for the masking material to be stuck, the zinc negative electrode of this disclosure, in which the zinc-plated copper plate and the reaction space divider illustrated in FIG. 32 has been integrated, was fabricated.

The zinc negative electrode according to Example 9, which was fabricated as described above, and a pre-charged nickel positive electrode (about 50 mm square with a thickness of 5 mm) were arranged opposite to one another within an acrylic container similarly to Example 8, and a resin plate was abutted on a back side of the nickel positive electrode and screwed with a screw so that the acrylic-based resin reaction space divider of the zinc negative electrode according to Example 9 and the nickel positive electrode are in close contact with one another. For convenience in explaining the arrangement relation, the schematic diagram in FIG. 48 will be referred again. A zinc negative electrode 10 according to Example 9, which was fabricated as described above, and a pre-charged nickel positive electrode 60 (about 50 mm square with a thickness of 5 mm) were arranged opposite to one another within an acrylic container, and a resin plate (resin spacer) 80 was abutted on a back side of the nickel positive electrode 60 and screwed with a screw 70 so that the reaction space divider of the zinc negative electrode 10 according to Example 9 and the nickel positive electrode 60 are in close contact with one another. The used nickel positive electrode 60 is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, a liquid electrolyte 50 consisting of 6 mol/L of aqueous potassium hydroxide solution saturated with zinc oxide was added to the acrylic container to fabricate the zinc-nickel secondary battery.

<Evaluation>

The zinc-nickel secondary battery fabricated as described above was charged and discharged at a constant current. The condition in the charge and discharge test was identical to that in Example 4.

Figure 51:
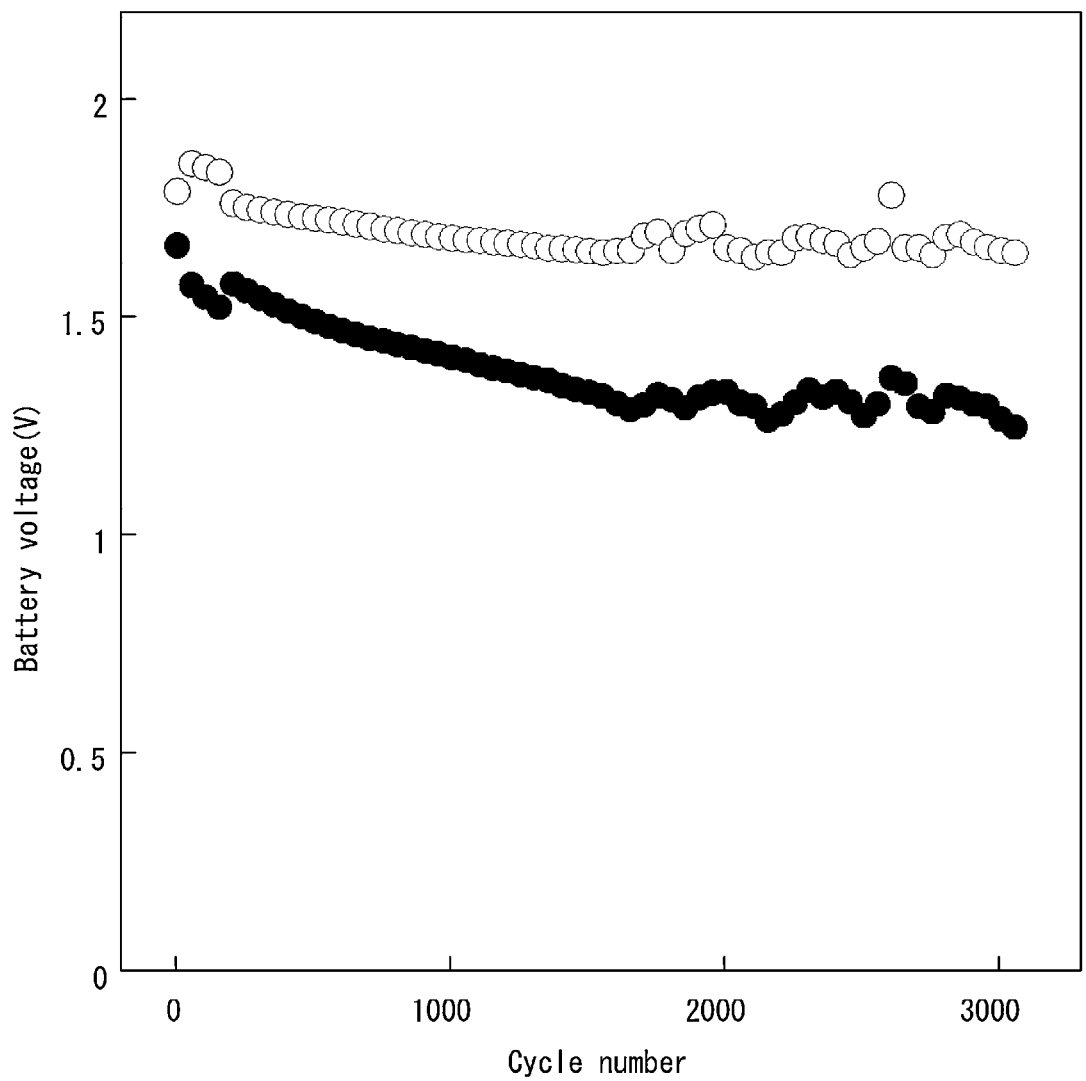
FIG. 51 is a diagram illustrating relation between discharge and charge voltages and a cycle number of a zinc-nickel secondary battery in Example 9.
Figure 52:
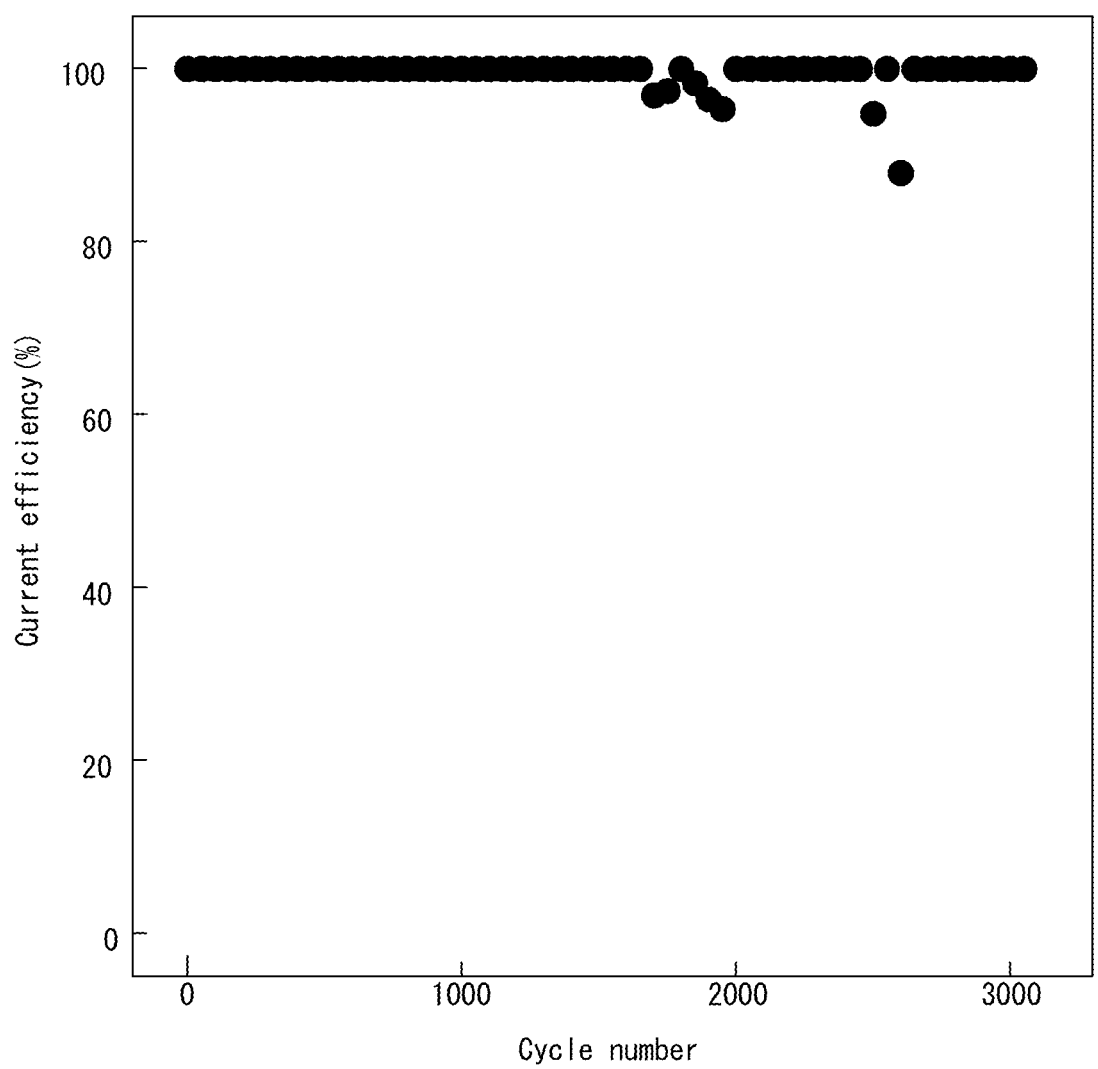
FIG. 52 is a diagram illustrating relation between a current efficiency and the cycle number of the zinc-nickel secondary battery in Example 9.

FIG. 51 and FIG. 52 illustrate respective relations of an average discharge voltage, an average charge voltage and a current efficiency to a charge and discharge cycle number obtained in Example 9. The definition and meaning of the current efficiency are identical to those described in Example 1. As illustrated in FIG. 51 and FIG. 52, it was found that, in the zinc-nickel secondary battery using the zinc negative electrode in Example 9, there was no rapid decrease in discharge voltage or increase in charge voltage indicating a dendrite short circuit, and the charge and discharge can be stably performed for 3000 cycles or more. It was also found that the current efficiency was maintained at 100% even beyond 3000 cycles, there was no decrease in capacity due to the active material inhomogeneity and the dendrite short circuit, and the battery capacity can be maintained at a high current efficiency. As an excellent charge and discharge property was obtained as above, the test for Example 9 was stopped after 3000 cycles.

Example 10

Example 10 is a reaction space divider having four through-holes with a diameter of 5 mm similarly to Example 4, but the thickness was 2 mm in Example 4, while the thickness was further reduced to 1 mm in Example 10. Along with this, the respective shapes of the connecting hole and the opening passage in the reaction space divider in Example 4 were changed to grooves.

After the copper plate (the plating portion: 30 mm×40 mm×0.2 mm, the lead portion: 5 mm×50 mm×0.2 mm) illustrated in FIG. 15 was subjected to pretreatment with a polishing paper and by oxalic acid etching, one surface and the side surfaces of the plating portion and both surfaces and the side surfaces of the lead portion were masked by a commercially available masking material for plating. Further, on one surface that was not masked of the plating portion, the commercially available masking material was applied except for the parts corresponding to the electrolyte holder portions in the reaction space divider having a structure illustrated in FIG. 53, that is, the parts corresponding to four circular through-holes with a diameter of 5 mm. The copper plate in this state was subjected to the zinc plating as in Example 4. After the zinc plating, by performing adhesion with the masking material to match the contour of the electrolyte holder portion and the contour of the zinc-plated part in FIG. 53 and by waiting for the masking material to be stuck, the zinc negative electrode of this disclosure, in which the zinc-plated copper plate and the reaction space divider illustrated in FIG. 53 have been integrated, was fabricated.

Figure 53:
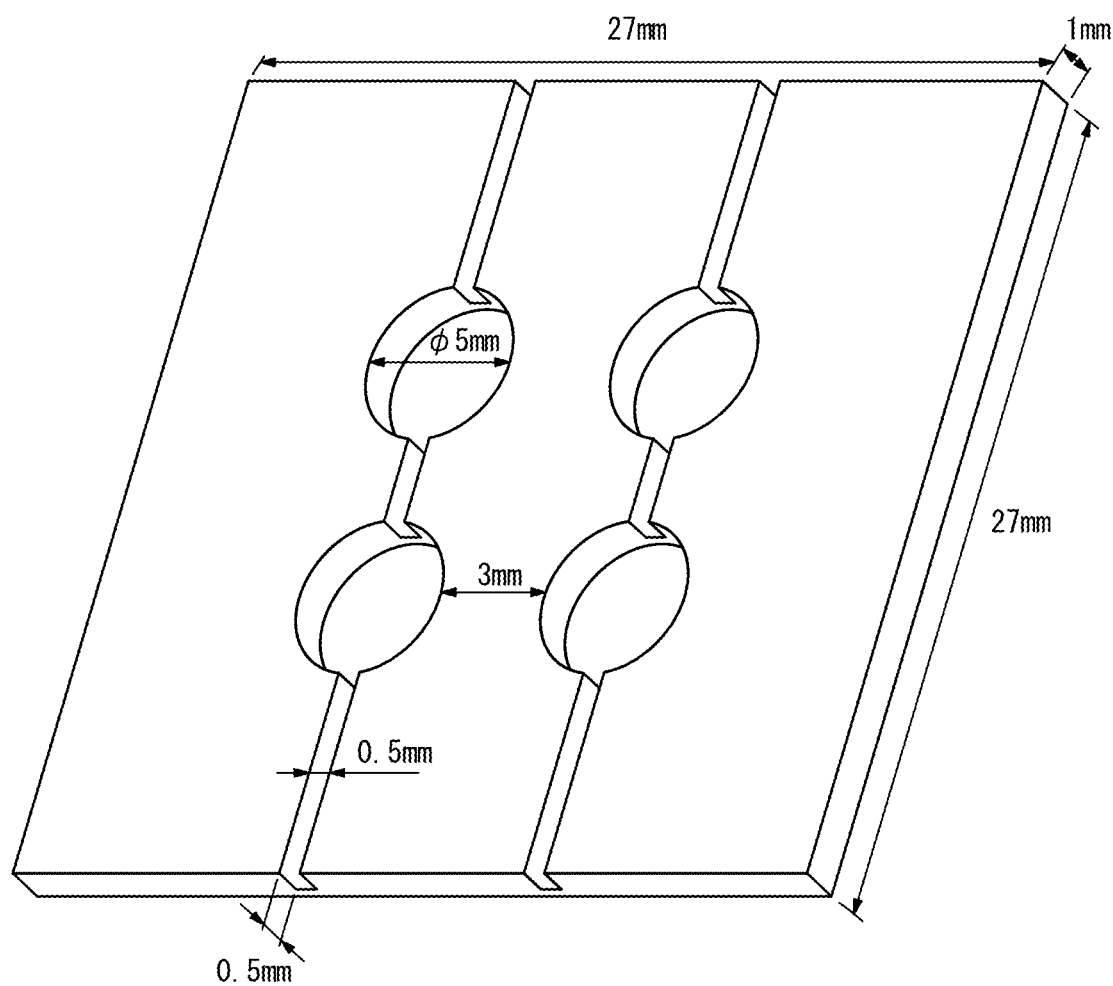
FIG. 53 is a shape diagram of a reaction space divider used for a zinc negative electrode in Example 10.

The reaction space divider illustrated in FIG. 53 has four electrolyte holder portions consisting of the circular through-holes with a diameter of 5 mm and has respective connection grooves on the right and left that communicate respective two upper and lower electrolyte holder portions one another. Further, the respective electrolyte holder portions are connected to the edge of the main body of the reaction space divider through the respective opening grooves, on a side opposite to the connection grooves. In more detail, these connection grooves and opening grooves are grooves of 0.5 mm wide and 0.5 mm deep formed on one surface of the reaction space divider on the side that abuts on the nickel positive electrode.

The zinc negative electrode according to Example 10, which was fabricated as described above, and a pre-charged nickel positive electrode (about 50 mm square with a thickness of 5 mm) were arranged opposite to one another within an acrylic container similarly to Example 8, and a resin plate was abutted on a back side of the nickel positive electrode and screwed with a screw so that the acrylic-based resin reaction space divider of the zinc negative electrode according to Example 10 and the nickel positive electrode are in close contact with one another. For convenience in explaining the arrangement relation, the schematic diagram in FIG. 48 will be referred again. A zinc negative electrode 10 according to Example 10, which was fabricated as described above, and a pre-charged nickel positive electrode 60 (about 50 mm square with a thickness of 5 mm) were arranged opposite to one another within an acrylic container, and a resin plate (resin spacer) 80 was abutted on a back side of the nickel positive electrode 60 and screwed with a screw 70 so that the reaction space divider of the zinc negative electrode 10 according to Example 10 and the nickel positive electrode 60 are in close contact with one another. As described above, the grooves formed on the reaction space divider form spaces with the nickel positive electrode 60 to be the connection passages and the opening passages. The used nickel positive electrode 60 is the one usually used for a nickel-metal-hydride secondary battery, and nickel hydroxide mainly becomes the principal component in a fully discharged condition, while nickel hydroxide is oxidized to be nickel oxyhydroxide, becoming the principal component in a fully charged condition. After this, a liquid electrolyte 50 consisting of 6 mol/L of aqueous potassium hydroxide solution saturated with zinc oxide was added to the acrylic container to fabricate the zinc-nickel secondary battery.

<Evaluation>

The zinc-nickel secondary battery fabricated as described above was charged and discharged at a constant current. The condition in the charge and discharge test was identical to that in Example 4.

Figure 54:
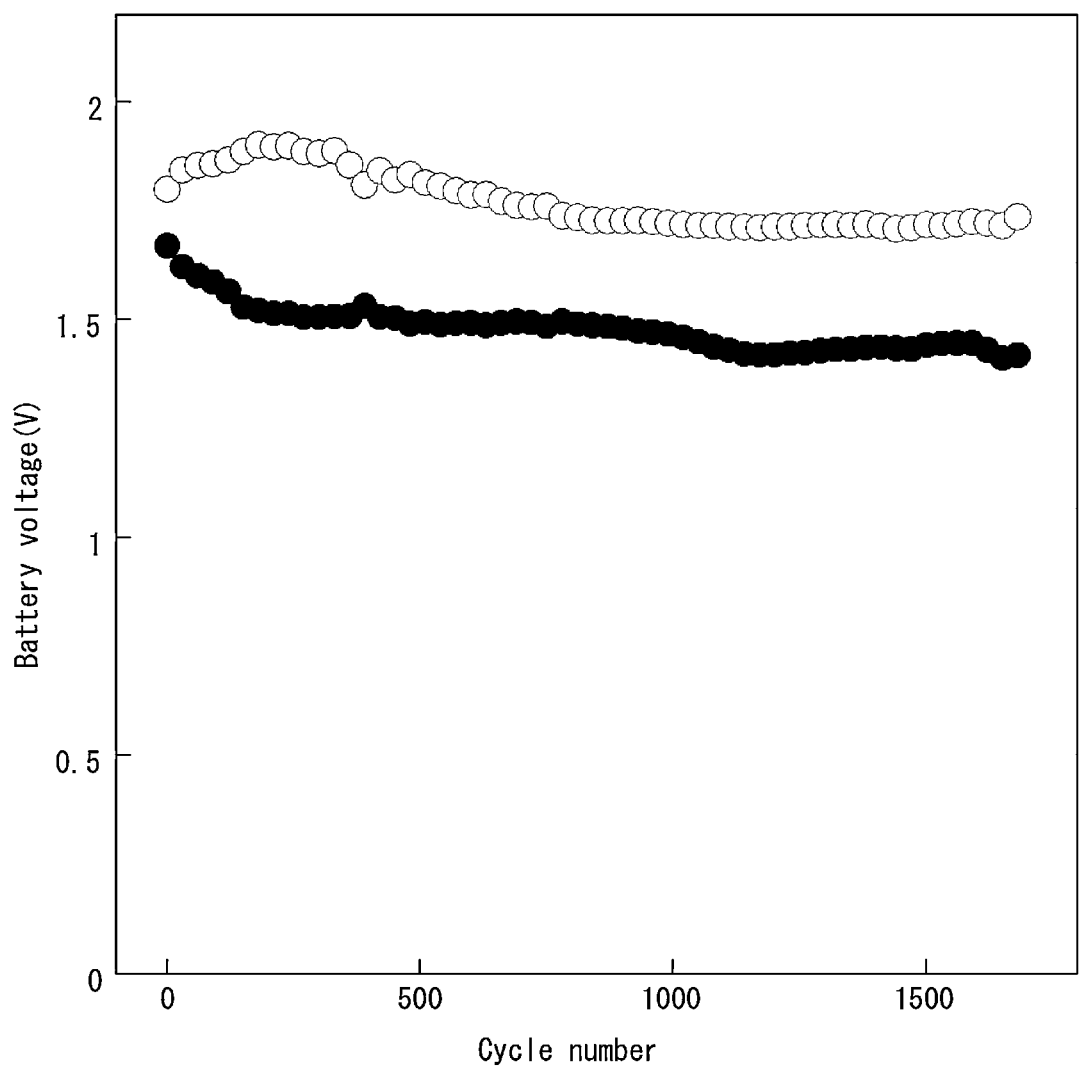
FIG. 54 is a diagram illustrating relation between discharge and charge voltages and a cycle number of a zinc-nickel secondary battery in Example 10.
Figure 55:
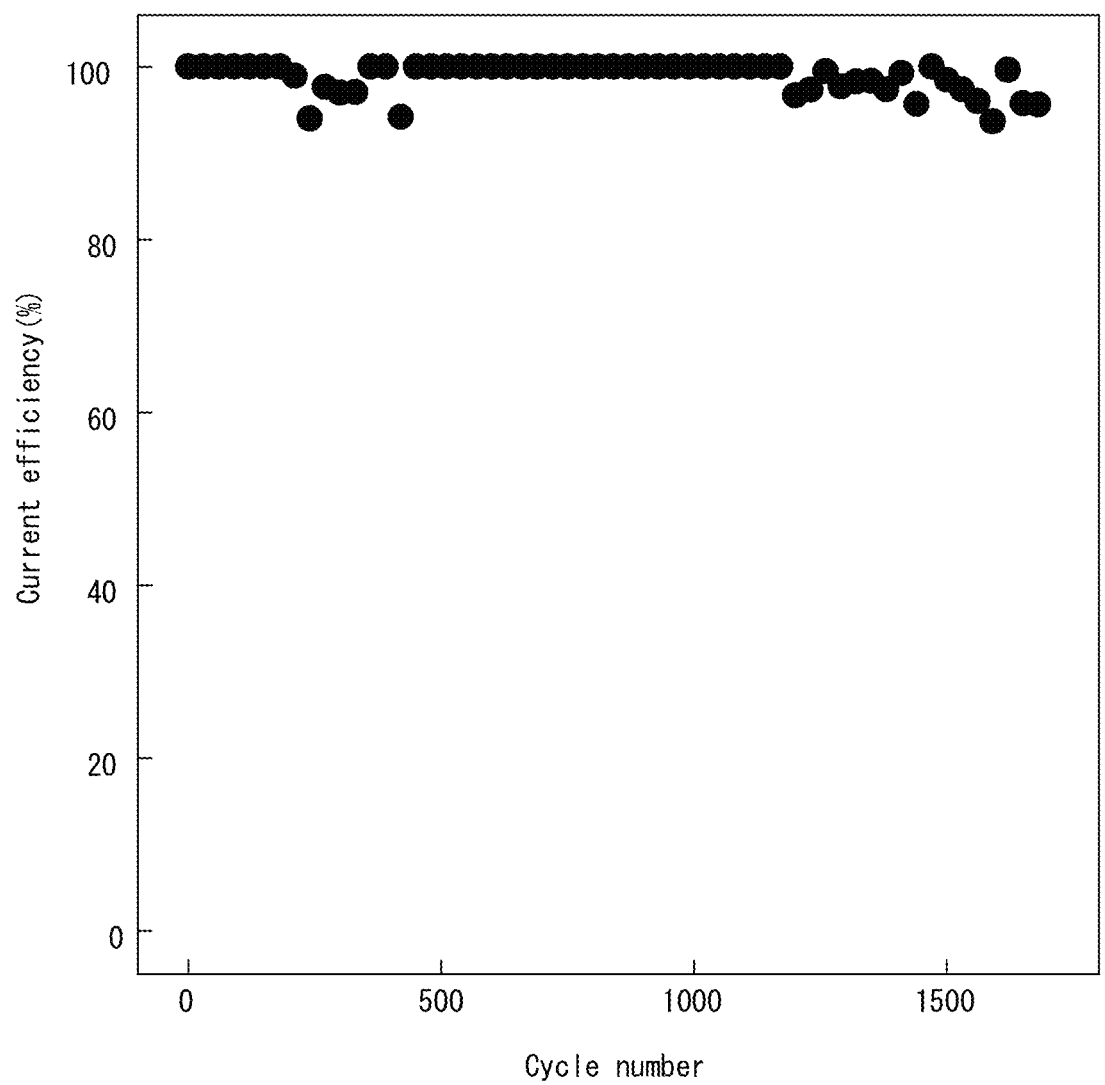
FIG. 55 is a diagram illustrating relation between a current efficiency and the cycle number of the zinc-nickel secondary battery in Example 10.

FIG. 54 and FIG. 55 illustrate respective relations of an average discharge voltage, an average charge voltage and a current efficiency to a charge and discharge cycle number obtained in Example 10. The definition and meaning of the current efficiency are identical to those described in Example 1. As illustrated in FIG. 54 and FIG. 55, it was found that, in the zinc-nickel secondary battery using the zinc negative electrode in Example 10, there was no rapid decrease in discharge voltage or increase in charge voltage indicating a dendrite short circuit, and the charge and discharge can be stably performed for 1600 cycles or more. It was also found that the current efficiency was maintained at 90% or more even beyond 1600 cycles, there was no decrease in capacity due to the active material inhomogeneity and the dendrite short circuit, and the battery capacity can be maintained at a high current efficiency. As an excellent charge and discharge property was obtained as above, the test for Example 10 was stopped after 1600 cycles.

INDUSTRIAL APPLICABILITY

The metal negative electrode of this disclosure can be used for a negative electrode consisting of a metallic element such as zinc, lithium, magnesium, sodium, potassium or calcium. The secondary battery of this disclosure can be used for, for example, a zinc-air secondary battery, a zinc-nickel secondary battery, a zinc-silver secondary battery, a lithium-air secondary battery, a lithium-sulfur secondary battery, a magnesium-air secondary battery, a sodium-sulfur secondary battery, a potassium secondary battery, a calcium secondary battery or a multivalent-ion secondary battery, which uses the above metal negative electrode.

REFERENCE SIGNS LIST

10 Metal negative electrode
50 Liquid electrolyte
60 Positive electrode
90 Secondary battery
1, 110 Active material portion
2, 120 Current collector
3, 130 Reaction space divider
131 Main body
132a, 132b Electrolyte holder portion
330 Reaction space divider
331 Main body
332a, 332b, 332c, 332d Electrolyte holder portion
333a, 333b Connection passage
334a, 334b, 334c, 334d Opening passage

The invention claimed is:

1. A metal negative electrode used for a secondary battery, comprising:
an active material portion that forms metal during charging and forms an oxidation product of the metal during discharging, the metal being used as a negative-electrode active material,
a current collector electrically connected to the active material portion, and
a non-electronically conductive reaction space divider integrally formed with the active material portion,
wherein the reaction space divider is a plate-like member having a plurality of through-holes, one side of each through-hole being opened, and the opposite side of each through-hole being occluded by the active material portion,
a space divided by an inner wall of each through-hole and a part of the active material portion that occludes the through-hole forms an electrolyte holder portion consisting of a space configured to hold a liquid electrolyte,
the active material portion is exposed within each through-hole, and
the metal is zinc or zinc alloy.

2. The metal negative electrode according to claim 1, wherein each of the electrolyte holder portions has a circular cross-sectional shape.

3. The metal negative electrode according to claim 1, wherein each of the electrolyte holder portions has a polygonal cross-sectional shape.

4. The metal negative electrode according to claim 1, wherein the reaction space divider has a connection passage that connects the electrolyte holder portions to one another.

5. The metal negative electrode according to claim 1, wherein the reaction space divider has an opening passage that connects the electrolyte holder portion to a side surface of the reaction space divider, with surfaces on which through-holes are provided as upper and lower surfaces.

6. The metal negative electrode according to claim 1, wherein the reaction space divider consists of a plastics material.

7. The metal negative electrode according to claim 1, wherein at least one of the electrolyte holder portions has a different maximum span length from maximum span lengths of the other electrolyte holder portions.

8. The metal negative electrode according to claim 1, wherein the electrolyte holder portion has a maximum span length of less than 20 mm.

9. The metal negative electrode according to claim 1, wherein the electrolyte holder portion has a maximum span length of 5 mm or less.

10. A method for fabricating the metal negative electrode according to claim 1, comprising:
a step of directly connecting the reaction space divider onto the current collector, and
a step of filling each through-hole with the active material portion to integrally form the reaction space divider and the active material portion, and electrically connecting the active material portion to the current collector.

11. The method for fabricating the metal negative electrode according to claim 10, comprising
an oxidation step of converting a part of or the whole of the metal of the metal negative electrode into the oxidation product of the metal.

12. The method for fabricating the metal negative electrode according to claim 10,
wherein the metal is zinc, and the oxidation product of the metal is zinc oxide.

13. A method for fabricating the metal negative electrode according to claim 1, comprising
a step of electrically connecting the current collector to the active material portion, and
a step of integrally forming the active material portion and the reaction space divider to expose the active material portion within the through-hole.

14. A secondary battery comprising the metal negative electrode according to claim 1.

15. The secondary battery according to claim 14, comprising a positive electrode and a liquid electrolyte,
wherein the one side of each through-hole is occluded by the positive electrode, and the electrolyte holder portion holds the liquid electrolyte between the positive electrode and the active material portion.

16. The secondary battery according to claim 14, being any one of a zinc-air secondary battery, a zinc-nickel secondary battery, and a zinc-silver secondary battery.

* * * * *